US009977294B2

(12) United States Patent
Kim et al.

(10) Patent No.: US 9,977,294 B2
(45) Date of Patent: *May 22, 2018

(54) LIQUID CRYSTAL DISPLAY DEVICE

(71) Applicant: INDUSTRY-UNIVERSITY COOPERATION FOUNDATION HANYANG UNIVERSITY, Seoul (KR)

(72) Inventors: Jae-Hoon Kim, Seoul (KR); You-Jin Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 515 days.

This patent is subject to a terminal disclaimer.

(21) Appl. No.: 14/411,458

(22) PCT Filed: Jun. 25, 2013

(86) PCT No.: PCT/KR2013/005609
§ 371 (c)(1),
(2) Date: Aug. 21, 2015

(87) PCT Pub. No.: WO2014/003417
PCT Pub. Date: Jan. 3, 2014

(65) Prior Publication Data
US 2015/0370135 A1    Dec. 24, 2015

(30) Foreign Application Priority Data

Jun. 25, 2012  (KR) .......................... 10-2012-0067984
Oct. 12, 2012  (KR) .......................... 10-2012-0113530
(Continued)

(51) Int. Cl.
G02F 1/1343    (2006.01)
G02F 1/141     (2006.01)
(Continued)

(52) U.S. Cl.
CPC ...... *G02F 1/134309* (2013.01); *C09K 19/586* (2013.01); *G02F 1/137* (2013.01);
(Continued)

(58) Field of Classification Search
CPC ......... G02F 1/133707; G02F 1/134309; G02F 1/1337; G02F 1/134363; G02F 1/137;
(Continued)

(56) References Cited

U.S. PATENT DOCUMENTS 4,871,472 A    10/1989  Krause et al.
5,332,521 A     7/1994  Yuasa et al.
(Continued)

FOREIGN PATENT DOCUMENTS

CN    1290920 A     4/2001
CN    1690825 A    11/2005
(Continued)

OTHER PUBLICATIONS

Office Action from Taiwanese Patent Office for Appliation No. 102122322, dated Dec. 9, 2016.
(Continued)

*Primary Examiner* — Jessica M Merlin

(57) ABSTRACT

Provided are a liquid crystal display device and a method for driving same. The liquid crystal display device comprises the liquid crystal display device in a PVA mode, an LVA mode, an FFS mode, and in an IPS mode. The liquid crystal display device comprises 1 to 50 wt % of an achiral smectic liquid crystal, and a remainder of a nematic liquid crystal. The liquid crystal device comprises 3 to 50 wt % of a smectic liquid crystal and a remainder of the nematic liquid crystal, wherein the smectic liquid crystal comprises a liquid crystal layer, comprising 70 to 97 wt % of an achiral smectic liquid crystal, and 3 to 30 et % of a chiral smectic liquid crystal.

27 Claims, 75 Drawing Sheets

(30) Foreign Application Priority Data

| Oct. 12, 2012 | (KR) | 10-2012-0113534 |
|---|---|---|
| Oct. 12, 2012 | (KR) | 10-2012-0113539 |
| Mar. 14, 2013 | (KR) | 10-2013-0027246 |
| Apr. 15, 2013 | (KR) | 10-2013-0041184 |
| Apr. 15, 2013 | (KR) | 10-2013-0041187 |
| May 15, 2013 | (KR) | 10-2013-0055189 |
| May 15, 2013 | (KR) | 10-2013-0055196 |

(51) Int. Cl.
*G02F 1/1337* (2006.01)
*C09K 19/58* (2006.01)
*G02F 1/137* (2006.01)

(52) U.S. Cl.
CPC ........ *G02F 1/1337* (2013.01); *G02F 1/13781* (2013.01); *G02F 1/133707* (2013.01); *G02F 1/134363* (2013.01); *G02F 1/141* (2013.01); *G02F 2001/13712* (2013.01); *G02F 2001/133726* (2013.01); *G02F 2001/133742* (2013.01); *G02F 2001/134318* (2013.01); *G02F 2001/134372* (2013.01)

(58) Field of Classification Search
CPC ................. G02F 1/13781; G02F 1/141; G02F 2001/133726; G02F 2001/133742; G02F 2001/134318; G02F 2001/134372; G02F 2001/13712; C09K 19/586
See application file for complete search history.

(56) References Cited

U.S. PATENT DOCUMENTS

| 6,056,893 | A | 5/2000 | Reiffenrath et al. |
|---|---|---|---|
| 6,738,120 | B1 | 5/2004 | Song et al. |
| 7,872,722 | B2 | 1/2011 | Kimura |
| 9,670,410 | B2* | 6/2017 | Kim .................. C09K 19/0225 |
| 2005/0140867 | A1 | 6/2005 | Choi |
| 2005/0162607 | A1 | 7/2005 | Miyachi et al. |
| 2005/0213019 | A1 | 9/2005 | Choi et al. |
| 2006/0110550 | A1 | 5/2006 | Moriya |
| 2006/0238696 | A1 | 10/2006 | Wen et al. |
| 2007/0200093 | A1 | 8/2007 | West et al. |
| 2007/0268436 | A1* | 11/2007 | Kim ................. G02F 1/133707 349/129 |
| 2009/0103011 | A1 | 4/2009 | Bernatz et al. |
| 2010/0231845 | A1 | 9/2010 | Seong et al. |
| 2011/0051059 | A1* | 3/2011 | Kang .................. C08F 220/06 349/110 |
| 2011/0063558 | A1 | 3/2011 | Ishihara et al. |
| 2011/0095229 | A1 | 4/2011 | Lee et al. |
| 2011/0140039 | A1 | 6/2011 | Wu et al. |
| 2011/0141417 | A1 | 6/2011 | Kim |
| 2011/0221990 | A1* | 9/2011 | Lee .................. G02F 1/133707 349/41 |
| 2011/0233463 | A1 | 9/2011 | Haase et al. |
| 2012/0032994 | A1 | 2/2012 | Coles et al. |
| 2012/0326083 | A1 | 12/2012 | Wand |
| 2015/0137036 | A1* | 5/2015 | Kim .................. C09K 19/0225 252/299.01 |
| 2015/0198855 | A1 | 7/2015 | Kim et al. |

FOREIGN PATENT DOCUMENTS

| CN | 102096244 A | 6/2011 |
|---|---|---|
| CN | 102257100 A | 11/2011 |
| JP | 2510314 B1 | 4/1996 |
| JP | 09-033957 A | 2/1997 |
| JP | 2001-296520 A | 10/2001 |
| JP | 2001296520 A * | 10/2001 |
| JP | 2006-171715 A | 6/2006 |
| JP | 2008-518899 A | 6/2008 |
| KR | 10-1997-0076049 A | 12/1997 |
| KR | 10-1998-0702063 A | 7/1998 |
| KR | 10-1999-0027489 A | 4/1999 |
| KR | 10-2000-0004396 A | 1/2000 |
| KR | 10-2004-0093173 A | 11/2004 |
| KR | 10-2006-0056873 A | 5/2006 |
| KR | 10-2007-0107319 A | 11/2007 |
| KR | 10-2005-0073340 A | 7/2008 |
| KR | 10-2012-0010127 A | 2/2012 |
| WO | WO 96/24880 | 8/1996 |
| WO | WO 03/081326 A1 | 10/2003 |
| WO | WO 2006/048620 A2 | 5/2006 |

OTHER PUBLICATIONS

Office Action for U.S. Appl. No. 14/411,367, dated Jul. 29, 2016.
International Search Report for PCT/KR2013/005573 filed Jun. 25, 2013.
International Search Report for PCT/KR2013/005604 filed Jun. 25, 2013.
International Search Report for PCT/KR2013/005607 filed Jun. 25, 2013.
Office Action for U.S. Appl. No. 14/411,367, dated Nov. 6, 2015.
Office Action for U.S. Appl. No. 14/411,455, dated Mar. 30, 2016.
Office Action for U.S. Appl. No. 14/411,369, dated Dec. 18, 2015.
International Search Report for PCT/KR2013/005609 filed Jun. 25, 2013.

\* cited by examiner

FIG. 3A
FIG. 3B
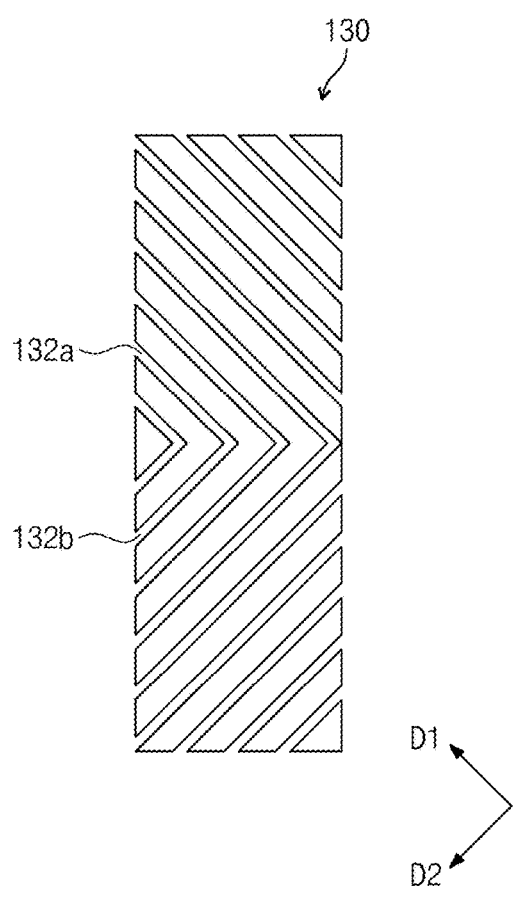
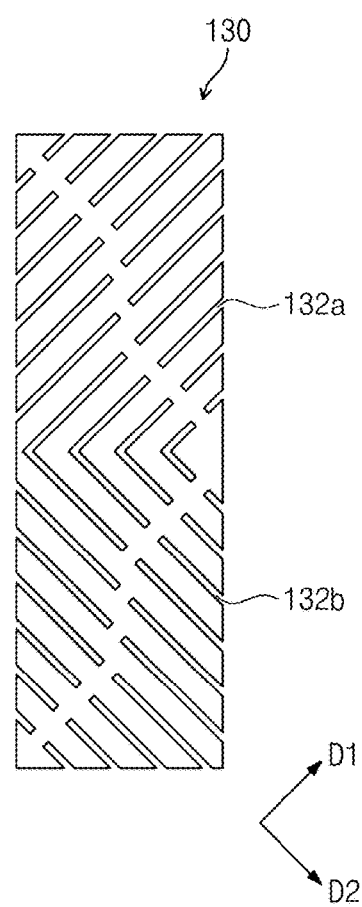

LIQUID CRYSTAL DISPLAY DEVICE

TECHNICAL FIELD

The present invention disclosed herein relates to a liquid crystal display device, and more particularly, to a liquid crystal display device including a liquid crystal layer containing a nematic liquid crystal and a smectic liquid crystal.

CROSS-REFERENCE TO RELATED APPLICATIONS

This U.S. non-provisional patent application claims priority under 35 U.S.C. § 119 of Korean Patent Application Nos. 10-2012-0067984, filed on Jun. 25, 2012, 10-2012-0113539, filed on Oct. 12, 2012, 10-2012-0113534, filed on Oct. 12, 2012, 10-2012-0113530, filed on Oct. 12, 2012, 10-2013-0027246, filed on Mar. 14, 2013, 10-2013-0041184, filed on Apr. 15, 2013, 10-2013-0041187, filed on Apr. 15, 2013, 10-2013-0055189, filed on May 15, 2013 and 10-2013-0055196, filed on May 15, 2013, the entire contents of which are hereby incorporated by reference.

BACKGROUND ART

Liquid crystal display devices that are one type of widely used flat panel display devices at present have been actively studied to attain high definition, high luminance and a large size. As a part of the research, the structures of electrodes in the liquid crystal display device are diversified and complicated to realize the high definition, the high luminance and the large size. In the case when a driving voltage is applied to the electrodes, the alignment of liquid crystal molecules in a liquid crystal layer may be changed by an applied electric field. The alignment of the liquid crystal molecules is non-uniform and unstable due to the electrodes. The non-uniform and unstable alignment of the liquid crystal molecules may deteriorate the luminance of the liquid crystal display device.

DISCLOSURE OF THE INVENTION

Technical Problem

The present invention provides a liquid crystal display device having improved luminance.

The technical limitation of the present invention is not limited to the above-described limitations, and other unmentioned limitations will be clearly understood from the following description by a person skilled in the art.

Technical Solution

Embodiments of the present invention provide liquid crystal display devices. The liquid crystal display devices include a first substrate; a second substrate separated from and opposing the first substrate; a liquid crystal layer between the first and second substrates; a first electrode between the first substrate and the liquid crystal layer and including a first slit; and a second electrode between the liquid crystal layer and the second substrate and including a second slit, wherein the liquid crystal layer includes from about 1 to about 50 wt % of an achiral smectic liquid crystal; and a remainder of a nematic liquid crystal.

In other embodiments of the present invention, liquid crystal display devices are provided. The liquid crystal display devices include a first substrate; a second substrate separated from and opposing the first substrate; a liquid crystal layer between the first and second substrates; a first electrode between the first substrate and the liquid crystal layer and including a first slit; and a second electrode between the liquid crystal layer and the second substrate and including a second slit, wherein the liquid crystal layer includes from about 3 to about 50 wt % of a smectic liquid crystal; and a remainder of a nematic liquid crystal, and the smectic liquid crystal includes from about 70 to about 97 wt % of an achiral smectic liquid crystal; and from about 3 to about 30 wt % of a chiral smectic liquid crystal.

In still other embodiments of the present invention, liquid crystal display devices are provided. The liquid crystal display devices include a first electrode and a second electrode separated from and opposing to each other; and a liquid crystal layer filling up a space between the first and second electrodes and including a plurality of liquid crystal molecules having a first alignment direction perpendicular to the surface of the first or second electrode when no potential difference is present between the first and second electrodes, wherein the liquid crystal layer includes from about 1 to about 50 wt % of an achiral smectic liquid crystal; and a remainder of a nematic liquid crystal, the plurality of liquid crystal molecules performs changing operation to have a second alignment direction substantially in parallel to an extended direction of the first or second electrode when potential difference is generated between the first and second electrodes, the changing operation of the liquid crystal molecules includes a first alignment step and a second alignment step in order, the liquid crystal molecules change to have a third alignment direction different from the first or second alignment direction in the first alignment step, and the liquid crystal molecules of the third alignment direction change to have the second alignment direction in the second alignment step.

In even other embodiments of the present invention, liquid crystal display devices are provided. The liquid crystal display devices include a first electrode and a second electrode separated from and opposing to each other; and a liquid crystal layer filling up a space between the first and second electrodes and including a plurality of liquid crystal molecules having a first alignment direction perpendicular to the surface of the first or second electrode when no potential difference is present between the first and second electrodes, wherein the liquid crystal layer includes from about 3 to about 50 wt % of a smectic liquid crystal; and a remainder of a nematic liquid crystal, and the smectic liquid crystal includes from about 70 to about 97 wt % of an achiral smectic liquid crystal; and from about 3 to about 30 wt % of a chiral smectic liquid crystal, the liquid crystal molecules in the liquid crystal layer filling up a space between the first and second electrodes perform changing operation to have a second alignment direction substantially in parallel to an extended direction of the first or second electrode when potential difference is generated between the first and second electrodes, the changing operation of the liquid crystal molecules includes a first alignment step and a second alignment step in order, the liquid crystal molecules change to have a third alignment direction different from the first or second alignment direction in the first alignment step, and the liquid crystal molecules of the third alignment direction change to have the second alignment direction in the second alignment step.

In yet other embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a plate shape; and a pixel electrode between the common electrode and the liquid crystal layer and having a pattern for defining an opening part, wherein the liquid crystal layer includes from about 1 to about 50 wt % of an achiral smectic liquid crystal; and a remainder of a nematic liquid crystal.

In further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a plate shape; and a pixel electrode between the common electrode and the liquid crystal layer and having a pattern for defining an opening part, wherein the liquid crystal layer includes from about 3 to about 50 wt % of a smectic liquid crystal; and a remainder of a nematic liquid crystal, and the smectic liquid crystal includes from about 70 to about 97 wt % of an achiral smectic liquid crystal; and from about 3 to about 30 wt % of a chiral smectic liquid crystal.

In still further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a first pattern; and a pixel electrode between the first substrate and the liquid crystal layer and having a second pattern not overlapping with the first pattern, wherein the liquid crystal layer includes from about 1 to about 50 wt % of an achiral smectic liquid crystal; and a remainder of a nematic liquid crystal.

In even further embodiments of the present invention, liquid crystal display devices are provided. The liquid crystal display devices include a first substrate; a second substrate separated from and opposing the first substrate; a liquid crystal layer between the first and second substrates; a common electrode between the first substrate and the liquid crystal layer and having a first pattern; and a pixel electrode between the first substrate and the liquid crystal layer and having a second pattern not overlapping with the first pattern, wherein the liquid crystal layer includes from about 3 to about 50 wt % of a smectic liquid crystal; and a remainder of a nematic liquid crystal, wherein the smectic liquid crystal includes from about 70 to about 97 wt % of an achiral smectic liquid crystal; and from about 3 to about 30 wt % of a chiral smectic liquid crystal.

Advantageous Effects

According to an embodiment of the present invention, a liquid crystal display device may include a liquid crystal layer containing a nematic liquid crystal and an achiral smectic liquid crystal. In addition, the liquid crystal layer according to an embodiment of the present invention may further include a chiral liquid crystal. In the liquid crystal display device including the liquid crystal layer, the alignment uniformity and the stability of the liquid crystal molecules in the liquid crystal layer may be improved, and the transmittance of the liquid crystal display device may be increased.

BRIEF DESCRIPTION OF THE DRAWINGS

The accompanying drawings are included to provide a complete understanding and assistance of the present invention, and reference numerals are illustrated hereinafter.

FIGS. 3A to 3I are plan views for explaining the structures of first electrodes or second electrodes according to exemplary embodiments of the present invention;

MODE FOR CARRYING OUT THE INVENTION

Figure 1:
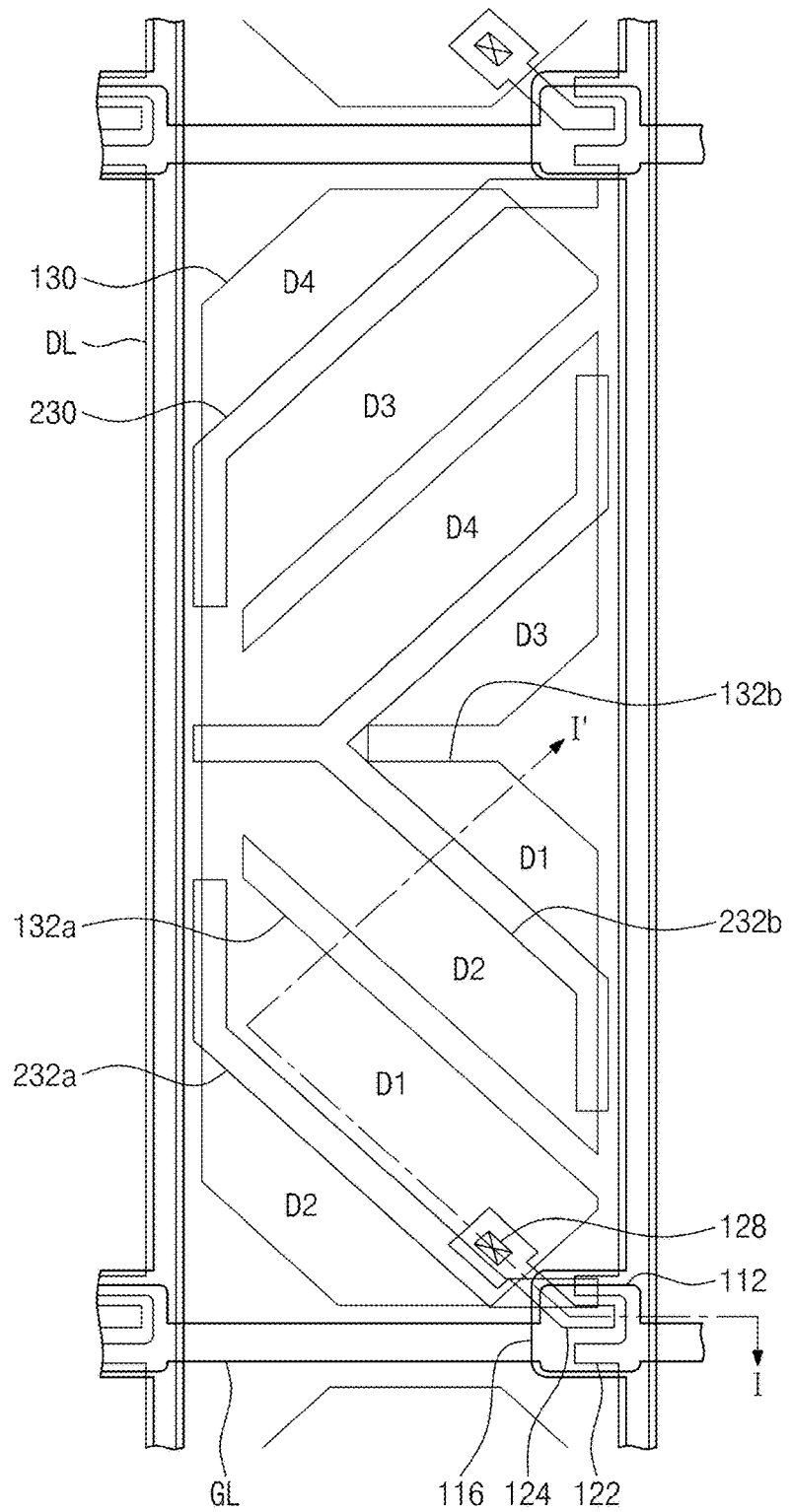
FIG. 1 is a plan view for explaining a liquid crystal display device according to an embodiment of the present invention.

Preferred embodiments of the present invention will be described below in more detail with reference to the accompanying drawings for the sufficient understanding of the configuration and effects of the present invention. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. A person skilled in the art will understand an appropriate environment for performing the concept of the present invention.

The terminology used herein is for the purpose of describing particular example embodiments only and is not intended to limit the present inventive concept. As used herein, the singular forms are intended to include the plural forms as well, unless the context clearly indicates otherwise. It will be further understood that the terms "comprises" and/or "comprising," when used in this specification, specify the presence of stated features, steps, operations, and/or devices, but do not preclude the presence or addition of one or more other features, steps, operations, and/or devices thereof.

It will also be understood that when a layer (or film) is referred to as being 'on' another layer (or film) or substrate, it can be directly on the other layer (or film) or substrate, or a third layer (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (or film). Thus, a first layer discussed below could be termed a second layer. Example embodiments embodied and described herein may include complementary example embodiments thereof. Like reference numerals refer to like elements throughout.

Unless otherwise defined, all terms used herein have the same meaning as commonly understood by one of ordinary skill in the art to which this inventive concept belongs.

Hereinafter, it will be described about exemplary embodiments of the present invention in conjunction with the accompanying drawings.

[[Liquid Crystal Display Device in PVA Mode]]

Figure 2:
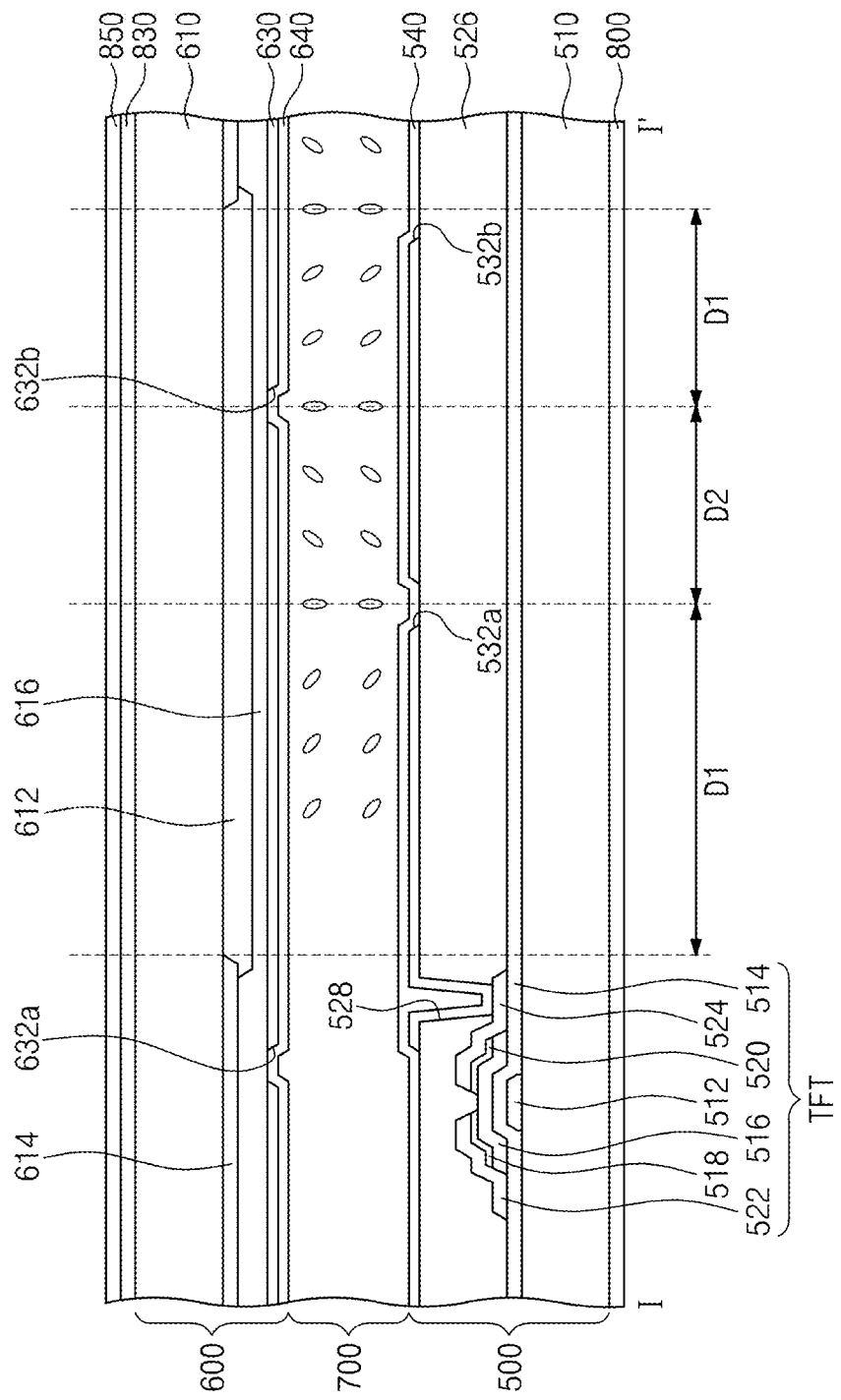
FIG. 2 is a cross-sectional view for explaining a liquid crystal display device according to an embodiment of the present invention.

FIGS. 1 and 2 are a plan view and a cross-sectional view for explaining a liquid crystal display device according to an embodiment of the present invention.

Referring to FIGS. 1 and 2, a liquid crystal display device may include a first display plate 100, a second display plate 200 separated from and opposing the first display plate 100, and a liquid crystal layer 300 disposed between the first and second display plates 100 and 200. In addition, the liquid crystal display device may further include a first polarization plate 400 and a second polarization plate 450 having a transmission axis perpendicular to the transmission axis of the first polarization plate 400.

The first display plate 100 may include a first substrate 110, a thin film transistor TFT and a first electrode 130. The first substrate 110 may include a transparent insulating material such as glass.

The thin film transistor may be disposed at one side of the first substrate 110. The thin film transistor TFT may include a gate electrode 112, a gate insulating layer 114, a semiconductor 116, a source electrode 122 and a drain electrode 124 stacked one by one. The gate electrode 112 may be a single layer or a multilayer including a metal or a metal alloy, and the gate insulating layer 114 may include silicon oxide, silicon nitride or silicon oxynitride. The intrinsic semiconductor 116 may include amorphous silicon. The source electrode 122 and the drain electrode 124 may be separately disposed to face to each other on the intrinsic semiconductor 116. In the intrinsic semiconductor 116 between the source electrode 122 and the drain electrode 124, the channel of the thin film transistor TFT may be formed. The source electrode 122 may be electrically connected to a data line DL and may receive a data voltage from the data line DL. The drain electrode 124 may be electrically connected to the first electrode 130.

According to an aspect, the thin film transistor TFT may further include ohmic contact members 118 and 120 disposed between the intrinsic semiconductor 116 and the source and drain electrodes 122 and 124. The ohmic contact members 118 and 120 may include silicide, n+ hydrogenated amorphous silicon heavily doped with n-type impurities, or the like.

On the thin film transistor TFT, a first insulation layer 126 having a first contact hole 128 may be formed. The first insulation layer 126 may include an inorganic insulation material such as silicon oxide, silicon nitride, silicon oxynitride, etc. or an organic insulation material such as a resin, etc. The contact hole 128 may expose the top surface of the drain electrode 124.

On the first insulation layer 126, a first electrode 130 may be formed. The first electrode 130 may be a pixel electrode. The first electrode 130 may make an electrical connection with the drain electrode via the contact hole. The first electrode 130 may be applied with a data voltage from the drain electrode. The first electrode 130 may include a transparent conductive material such as indium tin oxide (ITO) or indium zinc oxide (IZO).

According to an embodiment of the present invention, the first electrode 130 may include a domain division element, for example, first slits 132a and 132b. The first slits 132a and 132b correspond to removed parts of the first electrode 130, and the first electrode 130 may have a pattern. When a voltage is applied to the first electrode 130 and the second electrode 230, an electric field is generated between the first and second electrodes 130 and 230, and the electric field may not be formed in a vertical direction with respect to the surface of the first substrate 110 but may be formed in a slanted direction having both a vertical component and a horizontal component due to the first slits 132a and 132b. According to another embodiment of the present invention, the domain division element may be formed on the first electrode 130 and may have an extruded shape in a direction from the first electrode 130 to the liquid crystal layer 300.

According to the structures of the first slits 132a and 132b, the first electrode 130 may have diverse structures. The first slits 132a and 132b of the first electrode 130 will be explained in detail below.

According to another embodiment of the present invention, the first display plate 100 may further include a first alignment layer 140 between the first electrode 130 and the liquid crystal layer 300. The first alignment layer 140 may pre-tilt liquid crystal molecules in the liquid crystal layer 300 in one direction. According to an embodiment, the first alignment layer 140 may include at least one selected from the group consisting of polyamic acid, polyimide, lecithin, nylon and polyvinyl alcohol (PVA). According to another embodiment, the first alignment layer 140 may further include a reactive mesogen material.

The first polarization plate 400 may be disposed on the other side of the first substrate 110. The other side of the first substrate 110 may be a side corresponding to the one side.

The second display plate 200 may include a second substrate 210 and a second electrode 230. The second substrate 210 may include a transparent insulation material such as glass.

The second electrode 230 may be disposed on one side of the second substrate 210, and the one side of the second substrate 210 may be a side opposing the first display plate 100. The second electrode 230 may be a common electrode. The second electrode 230 may include a transparent material such as ITO, IZO, etc.

According to an embodiment of the present invention, the second electrode 230 may include a domain division element, for example, second slits 232a and 232b. The second slits 232a and 232b correspond to removed parts of the second electrode 230, and the second electrode 230 may have a pattern. When a voltage is applied to the first electrode 130 and the second electrode 230, an electric field may be generated between the first and second electrodes 130 and 230, and the electric field may not be formed in a vertical direction with respect to the surface of the second substrate 210 but may be formed in a slanted direction having both a vertical component and a horizontal component due to the second slits 232a and 232b. According to another embodiment of the present invention, the domain division element may be formed on the second electrode 230 and may have an extruded shape in a direction from the second electrode 230 to the liquid crystal layer 300.

According to the structures of the second slits 232a and 232b, the second electrode 230 may have diverse structures. The second slits 232a and 232b of the second electrode 230 will be explained in detail below.

According to exemplary embodiments of the present invention, the liquid crystal display device may be a liquid crystal display device in a patterned vertical alignment (PVA) mode. Thus, the first electrode 130 having the first slits 132a and 132b and the second electrode 230 having the second slits 232a and 232b may face to each other, however the first slits 132a and 132b and the second slits 232a and 232b may not face to each other. For example, the first electrode 130 having the first slits 132a and 132b and the second electrode 230 having the second slits 232a and 232b may have substantially the same structure, and the first and second electrodes 130 and 230 may be disposed so that the first slits 132a and 132b and the second slits 232a and 232b may not face to each other. Alternatively, the first and second electrodes 130 and 230 may have different structures, and the first slits 132a and 132b of the first electrode 130 and the second slits 232a and 232b of the second electrode 230 may not face to each other. In addition, the first slits 132a and 132b and the second slits 232a and 232b may not be substantially overlapped and may be separated when seen from plane. The first slits 132a and 132b and the second slits 232a and 232b may be alternately formed when seen from plane.

According to exemplary embodiments of the present invention, slanted electric field may be formed between the first and second electrodes 130 and 230 when a voltage is applied due to the first slits 132a and 132b and the second slits 232a and 232b of the first and second electrodes 130 and 230 as described above. Therefore, multi-domains D1 to D4 may be formed in one pixel. Referring to FIG. 1, liquid crystal molecules may be aligned in four directions, and four domains D1 to D4 may be formed in one pixel. However, the domain number formed in one pixel will not be limited thereto in the present invention.

According to an embodiment, the second display plate 200 may further include a color filter 212. The color filter 212 may be disposed between the second substrate 210 and the second electrode 230. In addition, a shielding member 214 may be disposed on one side of the second substrate 210, and the color filter 212 may be formed in each area defined by the shielding member 214. The color filter 212 may be passivated by the second insulation layer 216. In this embodiment, the color filter 212 is explained to be disposed on the second display plate 200; however the color filter 212 may be disposed on the first display plate 100. However, the position of the color filter 212 is not limited in the present invention.

According to another embodiment of the present invention, the second display plate 200 may further include a second alignment layer 240 between the second electrode 230 and the liquid crystal layer 300. The second alignment layer 240 may pre-tilt the liquid crystal molecules in the liquid crystal layer 300 in one direction. According to an embodiment, the second alignment layer 240 may include at least one selected from the group consisting of polyamic acid, polyimide, lecithin, nylon and PVA. According to another embodiment, the second alignment layer 240 may further include a reactive mesogen material.

The second polarization plate 450 may be disposed on the other side of the second substrate 210. The other side of the second substrate 210 may be a side corresponding to the one side. The second polarization plate 450 may penetrate linearly polarized light vibrating in a vertical direction among lights penetrated through the first polarization plate 400.

The liquid crystal layer 300 may fill up a space between the first and second display plates 100 and 200. According to an embodiment, the liquid crystal layer 300 may include a nematic liquid crystal and an achiral smectic liquid crystal. According to another embodiment, the liquid crystal layer 300 may include a nematic liquid crystal and a smectic liquid crystal. The liquid crystal layer 300 will be explained in detail hereinafter.

According to an embodiment of the present invention, the liquid crystal display device may further include an optical compensation film 430. The optical compensation film 430 may be disposed between the second polarization plate 450 and the second substrate 210. When the liquid crystal molecules maintain a vertically aligned state, the polarization axes of the first polarization plate 400 and the second polarization plate 450 may cross at right angles when observed from a front side, and light leakage may not be generated, however polarization angles formed by the polarization axes of the first and second polarization plates 400 and 450 may increase, and light leakage may be generated when seen from a side. To compensate the light leakage, the optical compensation film 430 such as a biaxial film or a uniaxial film may be disposed.

As described above, since the liquid crystal layer 300 of the liquid crystal display device in the PVA mode includes a ferroelectric liquid crystal together with the nematic liquid crystal, the alignment of the liquid crystal layer may become uniform, and the stability of the alignment may be improved. Thus, the luminance of the liquid crystal display device including the liquid crystal layer 300 may be improved. In addition, since at least one of the first and second alignment layers 140 and 240 further includes the reactive mesogen material, the alignment rate and the alignment angle of the liquid crystal molecules in the liquid crystal layer 300 may be increased, thereby improving optical properties.

Hereinafter, the structures of the first and second electrodes 130 and 230 will be explained in detail.

The structures of the electrode will be explained with the first electrode 130 as a typical embodiment; however the second electrode 230 may have one of the following structures of the electrode. As described above, if the first slits 132a and 132b and the second slits 232a and 232b are not face to each other, the strictures of the first and second electrodes may be the same or different, and the structure thereof may be changed diversely.

FIGS. 3A to 3I are plan views for explaining the structures of the first and second electrodes 130 and 230 according to exemplary embodiments of the present invention.

Referring to FIG. 3A, the first electrode 130 may have a Chevron pattern. The first slits 132a and 132b of the first electrode 130 may have a V-shape and may have a connected structure of a first line 132a extended in a first direction D1 and a second line 132b extended in a second direction D2 crossing the first direction D1.

Referring to FIG. 3B, the first electrode 130 may have a modified Chevron pattern. The structure of the first slits 132a and 132b may be similar to that illustrated in FIG. 3A, however may have a structure in which the middle part of the first line 132a is cut by the first electrode 130 and the middle part of the second line 132b is cut by the first electrode 130.

Figure 3C:
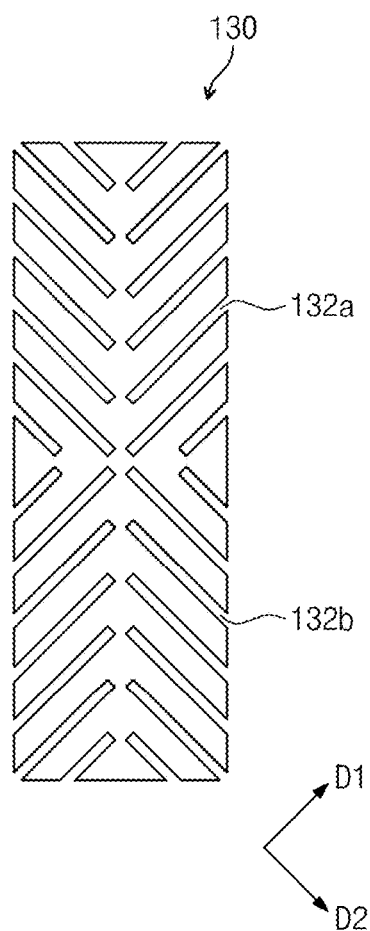

Referring to FIG. 3C, the first electrode 130 may have an X-shape pattern. The structure of the first slits 132a and 132b may include a first line 132a extended in a first direction D1 and a second line 132b extended in a second direction D2 crossing the first direction D1. Different from FIG. 3A, the first and second lines 132a and 132b are not connected to each other.

Figure 3D:
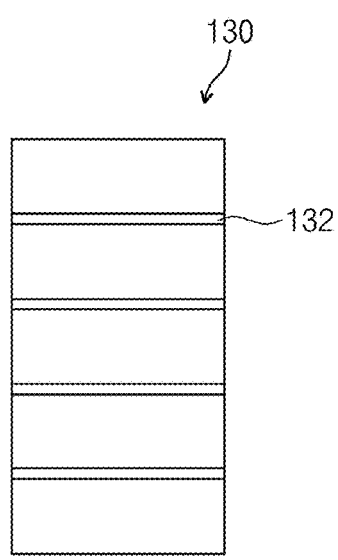

Referring to FIG. 3D, the first electrode 130 may have a stripe pattern. The structure of the first slit 132 may have a shape including lines extended in one direction and provided repeatedly and in parallel to each other.

Figure 3E:
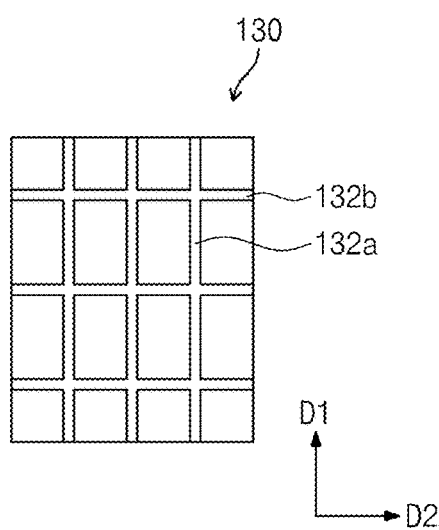

Referring to FIG. 3E, the first electrode 130 may have a lattice pattern. The structure of the first slits 132a and 132b may be a connected structure of a first line 132a extended in a first direction D1 and a second line 132b extended in a second direction D2 perpendicular to the first direction D1.

Figure 3F:
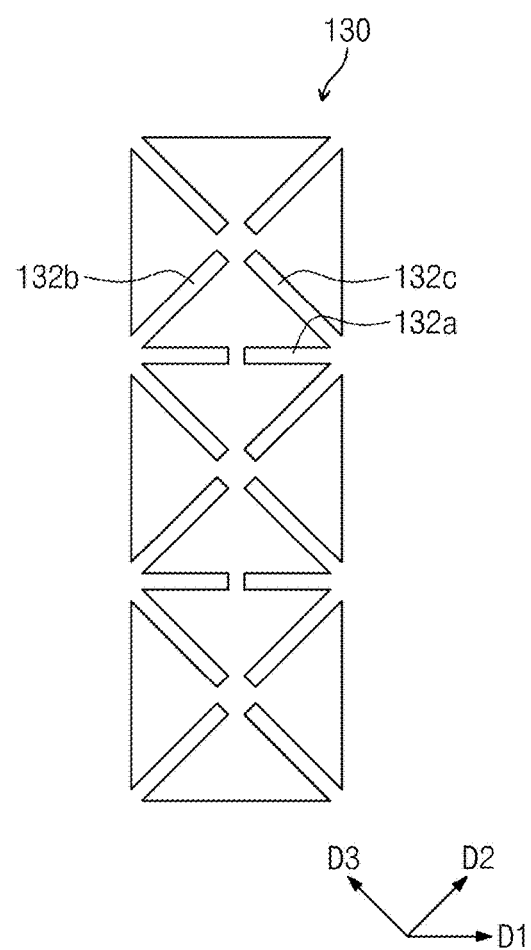

Referring to FIG. 3F, the first electrode 130 may include square patterns, and each square pattern may include four triangles divided by the diagonals of the square pattern. The structure of first slits 132a, 132b and 132c may divide the square pattern and may divide the four triangles in the square pattern. More particularly, the first slits 132a, 132b and 132c may include a first line 132a extended in a first direction D1, a second line 132b extended in a second direction D2 different from the first direction D1 and a third line 132c extended in a third direction D3 crossing the second direction D2. The first and second lines 132a and 132b may make connection to each other, and the first and third lines 132a and 132c may make connection to each other.

Figure 3G:
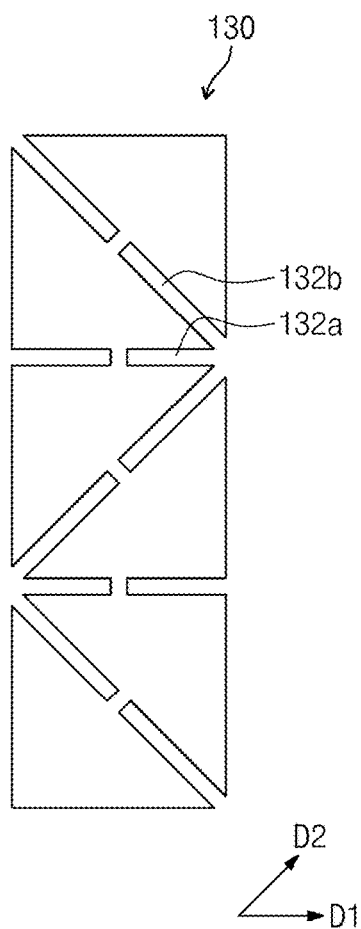

Referring to FIG. 3G, the first electrode 130 may include square patterns, and each square pattern may include two triangles divided by the diagonal of the square pattern. The structure of first slits 132a and 132b may divide the square pattern and the two triangles in the square pattern. More particularly, the first slit may include a first line 132a extended in a first direction D1 and a second line 132b extended in a second direction D2 different from the first direction D1. The first and second lines 132a and 132b may be connected to each other.

Figure 3H:
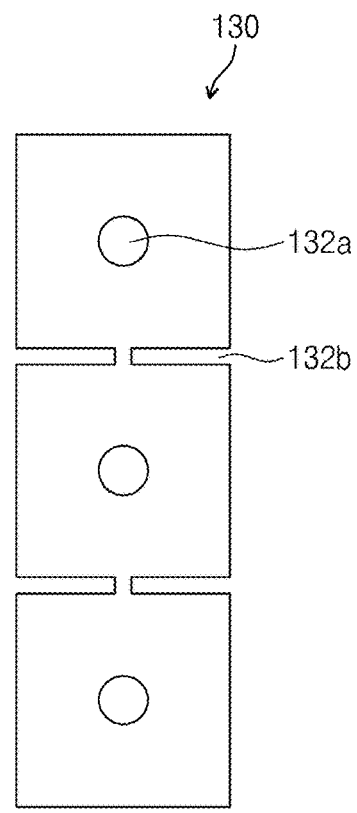

Referring to FIG. 3H, the first electrode 130 may have square patterns and a circular first slit 132a in the square pattern. The first slit 132a in the square pattern is illustrated as a circle in FIG. 3H; however the first slit 132a may include a polygon. In addition, the first slit may further include a structure 132b dividing the square patterns.

Figure 3I:
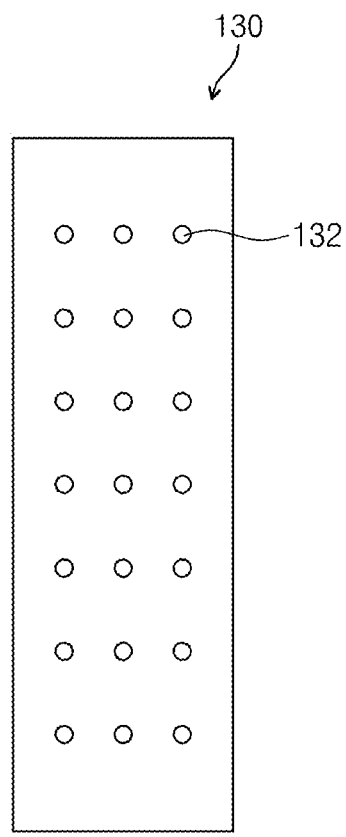

Referring to FIG. 3I, the first electrode 130 may include a plurality of first slits 132 having a circular shape. The first slits 132 may be separated by the same distance and may be disposed in rows and columns. The first slits 132 in FIG. 3I are illustrated as circles, however the first slits 132 may have a polygon.

Hereinafter, the liquid crystal layer will be explained in detail.

First Embodiment of Liquid Crystal Layer

A liquid crystal layer according to exemplary embodiments of the present invention may include a nematic liquid crystal and an achiral smectic liquid crystal.

The liquid crystal layer may include from about 1 wt % to about 50 wt % of the achiral smectic liquid crystal and from about 50 wt % to about 99 wt % of the nematic liquid crystal. When the achiral smectic liquid crystal is less than or equal to about 1 wt % of the total amount of the liquid crystal layer, the liquid crystal alignment of the liquid crystal layer may become unstable. In addition, when the amount of the achiral smectic liquid crystal exceeds about 50 wt % of the total amount of the liquid crystal layer, the viscosity of the liquid crystal layer may increase, and the response time of a display apparatus including the liquid crystal layer may be decreased. More preferably, the liquid crystal layer may include from about 1 wt % to about 35 wt % of the achiral smectic liquid crystal.

According to an embodiment, the amount of the achiral smectic liquid crystal in the liquid crystal layer may be determined by the viscosity of the achiral smectic liquid crystal. When the viscosity of the achiral smectic liquid crystal is low, the amount of the achiral smectic liquid crystal in the liquid crystal layer may be greater than or equal to about 50 wt %. Meanwhile, in the case that the viscosity of the achiral smectic liquid crystal is high, the amount thereof may preferably be maintained to less than or equal to about 35 wt % in consideration of the total viscosity of the liquid crystal layer.

According to an embodiment, the nematic liquid crystal may include a negative nematic liquid crystal. According to another embodiment, the nematic liquid crystal may include a negative nematic liquid crystal and a positive nematic liquid crystal. The positive nematic liquid crystal may be about 10 wt % of the nematic liquid crystal.

Hereinafter, exemplary materials of the nematic liquid crystal and the achiral smectic liquid crystal will be explained. However, the nematic liquid crystal and the achiral smectic liquid crystal of the present invention will not be limited to the following exemplary materials.

First, the properties of the nematic liquid crystal will be explained in brief, and exemplary materials of the negative nematic liquid crystal and the positive nematic liquid crystal will be classified.

The nematic liquid crystal is called a liquid crystal in which the longitudinal axes of thin and long liquid crystal molecules are directed in a certain direction even though the positions thereof are random. Each molecule of the nematic liquid crystal may freely move in the longitudinal axis direction thereof, and the molecules of the nematic liquid crystal may have small viscosity and may be liable to flow. Since the directions of the upper portion and the lower portion of the nematic molecules are substantially the same, the polarity may be offset, and ferroelectric properties are not exhibited in general. The physical properties are very different in the axis direction of the nematic liquid crystal and the perpendicular direction thereof. Thus, the nematic liquid crystal is a material having an optical anisotropy. When the difference ($\Delta\in$) of the dielectric anisotropy of which axis direction is in parallel and the dielectric anisotropy of which axis direction is perpendicular is less than 0, the nematic liquid crystal is called the negative nematic liquid crystal, while being called the positive nematic liquid crystal when the difference is greater than 0.

Negative Nematic Liquid Crystal

According to an embodiment, the negative nematic liquid crystal may include nematic liquid crystal molecules having negative dielectric anisotropy. In an aspect, the nematic liquid crystal molecules having negative dielectric anisotropy may be a single kind. In another aspect, the nematic liquid crystal molecules having negative dielectric anisotropy may be a mixture of different kinds. For example, the nematic liquid crystal molecules having negative dielectric anisotropy may include liquid crystal molecules having first dielectric anisotropy and liquid crystal molecules having second dielectric anisotropy. In this case, the second dielectric anisotropy and the first dielectric anisotropy may be different. At least one of the first dielectric anisotropy and the second dielectric anisotropy may have dielectric anisotropy of negative anisotropy. The nematic liquid crystal molecules including the liquid crystal molecules having the first dielectric anisotropy and the liquid crystal molecules having the second dielectric anisotropy may be satisfied only when the total dielectric anisotropy thereof have the negative dielectric anisotropy.

According to another embodiment, the negative nematic liquid crystal may include nematic liquid crystal molecules having negative dielectric anisotropy and base liquid crystal molecules. The base liquid crystal molecules may include at least one selected from the group consisting of liquid crystal molecules having negative dielectric anisotropy, liquid crystal molecules having positive dielectric anisotropy, neutral liquid crystal molecules, chiral liquid crystal molecules and achiral liquid crystal molecules. In an aspect, the negative nematic liquid crystal may include nematic liquid crystal molecules having one kind of the liquid crystal molecules having diverse dielectric anisotropies and the base liquid crystal molecules. In another aspect, the negative nematic liquid crystal may include liquid crystal molecules having various kinds of liquid crystal molecules having negative dielectric anisotropy and the base liquid crystal molecules.

Hereinafter, exemplary materials of the negative nematic liquid crystal will be explained. The following materials may be used alone or as a mixture.

The negative nematic liquid crystal may include a halogen group, a cyanide group or an isocyanate group nematic liquid crystal. The negative nematic liquid crystal may use the halogen group, the cyanide group or the isocyanate group nematic liquid crystal alone or as a mixture thereof. As described above, the negative nematic liquid crystal may further include the base liquid crystal molecules.

The halogen group negative nematic liquid crystal may include a fluorine group, a chlorine group, a bromine group material, etc. and may have a monocyclic structure or a polycyclic structure.

The halogen group negative nematic liquid crystal of a dicyclic structure may be represented by the following Formulae 1 and 2.

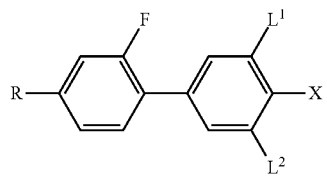

Formula 1

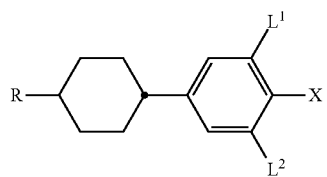

Formula 2

In Formulae 1 and 2, R may be alkyl or alkoxy having 1 to 15 carbon atoms (where hydrogen may be substituted with CN, $CF_3$ or halogen, and a $—CH_2—$ group may be substituted with $—CH=CH—$, $—O—$, $—CO—$, $—COO—$, $—OOC—$, $—O—OC—O—$ or $—S—$), X is independently halogen, halogenated alkyl, halogenated alkoxy, halogenated alkenyl or halogenated oxy having 1 to 15 carbon atoms, and $L^1$ and $L^2$ are independently hydrogen or halogen.

The halogen group negative nematic liquid crystal having a tricyclic structure may be represented by the following Formulae 3 to 6.

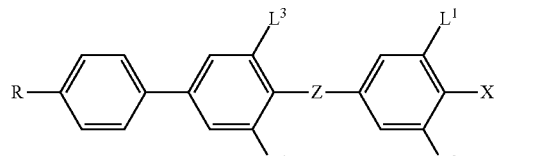

Formula 3

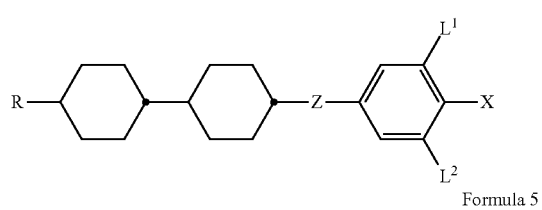

Formula 4

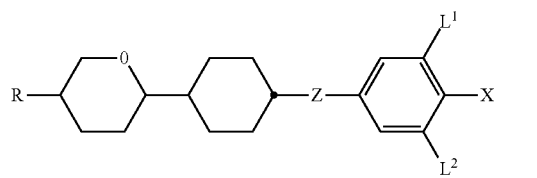

Formula 5

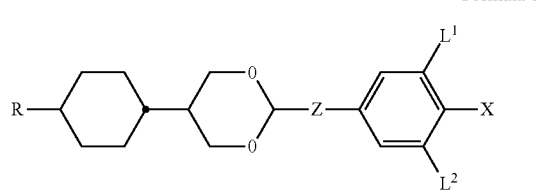

Formula 6

In Formulae 3 to 6, R, $L^1$ and $L^2$ are the same as defined in the above Formulae 1 and 2, $L^3$ and $L^4$ are independently hydrogen or halogen, Z is a single bond, $—CF_2O—$, $—OCF_2—$, $—COO—$, $—O—CO—$, $—CH_2CH_2—$, $—CH=CH—$, $—C\equiv C—$, $—CH_2O—$, $—(CH_2)_4—$, $CF=CF—$, $—CH=CF—$ or $—CF=CH—$.

The halogen group negative nematic liquid crystal having a tetracyclic structure may be represented by the following Formulae 7 to 9.

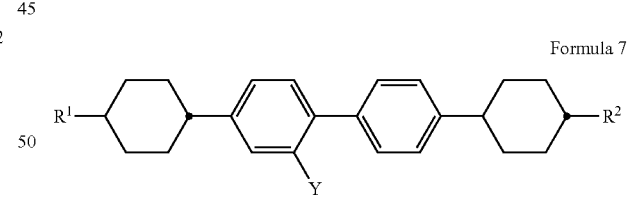

Formula 7

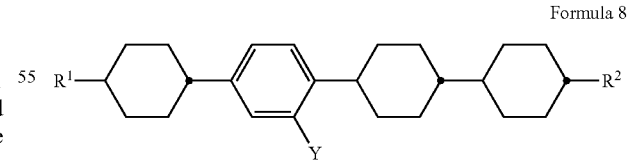

Formula 8

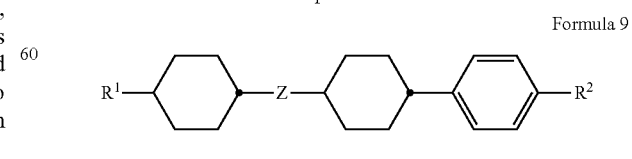

Formula 9

In Formulae 7 to 9, Y represents hydrogen or halogen, $R^1$ represents alkyl or alkenyl having 1 to 15 carbon atoms, $R^2$ represents alkyl, alkenyl or alkoxy having 1 to 15 carbon atoms (In $R^1$ and $R^2$, hydrogen may be substituted with CN, $CF_3$ or a halogen atom, and $CH_2$ may be substituted with —O—, —S—, —C≡C—, —CH=CH—, —OC—O— or —O—CO—), Z is a single bond, —$CF_2$O—, —$OCF_2$—, —COO—, —O—CO—, —$CH_2CH_2$—, —CH=CH—, —C≡C—, —$CH_2$O—, —$(CH_2)_4$—, CF=CF—, —CH=CF— or —CF=CH—.

The halogen group negative nematic liquid crystal includes a fluorinated indane derivative and may be represented by the following Formula 10.

Formula 10

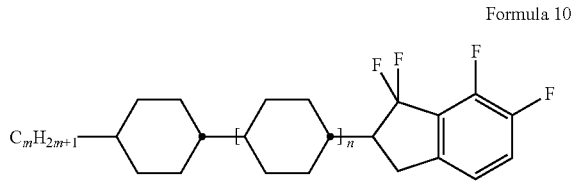

In the above Formula, m represents an integer, and n is 0 or 1.

The cyanide group negative nematic liquid crystal may be represented by the following Formulae 11 to 13.

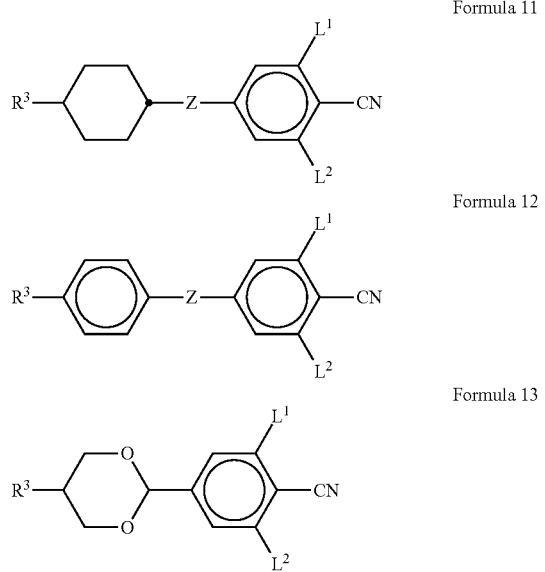

Formula 11

Formula 12

Formula 13

In Formulae 11 to 13, $R^3$ is an alkyl group having 1 to 15 carbon atoms (where hydrogen may be unsubstituted or at least monosubstituted with CN, $CF_3$ or halogen, and a $CH_2$ group may be substituted with —O—, —S—, —C≡C—, —CH=CH—, —OC—O— or —O—CO—), $L^1$ and $L^2$ are independently hydrogen or halogen, and Z is a single bond, —$CF_2$O—, —$OCF_2$—, —COO—, —O—CO—, —$CH_2CH_2$—, —CH=CH—, —C≡C—, —$CH_2$O—, —$(CH_2)_4$—, CF=CF—, —CH=CF— or —CF=CH—.

The negative nematic liquid crystal may be a single material or a mixture. According to exemplary embodiments, the negative nematic liquid crystal mixture may include:

(a) a liquid crystal component A including at least one compound having dielectric anisotropy of less than about −1.5;

(b) a liquid crystal component B including at least one compound having dielectric anisotropy from about −1.5 to about +1.5; and (c) a chiral component C.

The liquid crystal component A may include at least one compound of the following Formulae 14 to 17.

Formula 14

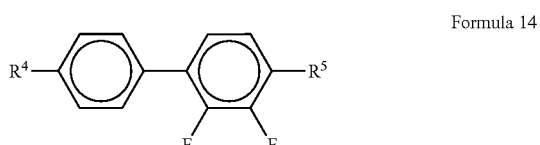

Formula 15

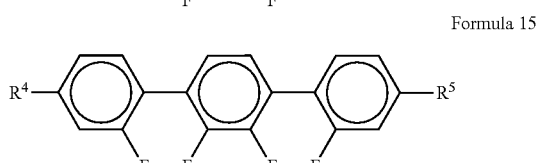

Formula 16

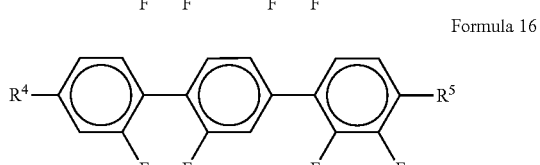

Formula 17

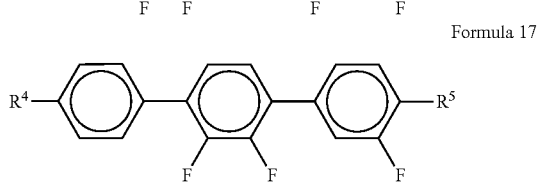

The liquid crystal component B may include at least one compound of the following Formulae 18 to 20. The liquid crystal component B may be the above-described first base liquid crystal molecules.

Formula 18

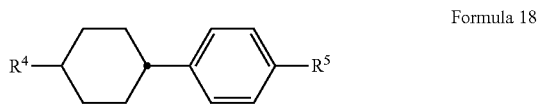

Formula 19

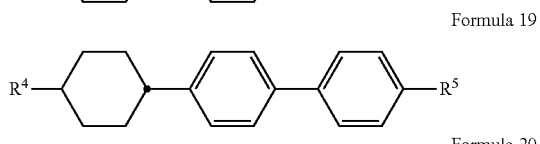

Formula 20

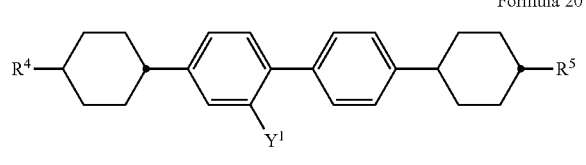

In Formulae 18 to 20, $R^4$ and $R^5$ are independently alkyl, alkoxy, alkoxyalkyl, alkenyl or alkenyloxy having 1 to 15 carbon atoms (where hydrogen may be substituted with CN, $CF_3$ or halogen, and a —$CH_2$— group may be substituted with —CH=CH—, —O—, —CO—, —COO—, —OOC—, —O—OC—O— or —S—), and $Y^1$ represents hydrogen or halogen.

Examples of the chiral component C may include a plurality of chiral dopants as follows. The selection of the chiral dopant is not significant per se.

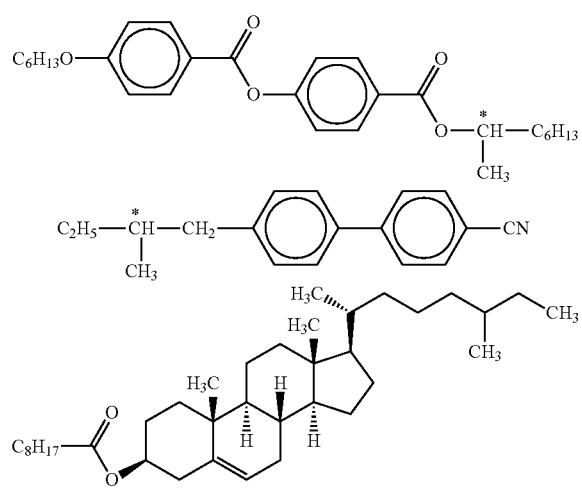

Positive Nematic Liquid Crystal

According to an embodiment, the positive nematic liquid crystal may include nematic liquid crystal molecules having positive dielectric anisotropy. In an aspect, the nematic liquid crystal molecules having positive dielectric anisotropy may be a single kind. In another aspect, the nematic liquid crystal molecules having positive dielectric anisotropy may be a mixture of different kinds. For example, the nematic liquid crystal molecules having positive dielectric anisotropy may include liquid crystal molecules having first dielectric anisotropy and liquid crystal molecules having second dielectric anisotropy. In this case, the second dielectric anisotropy and the first dielectric anisotropy may be different. At least one of the first dielectric anisotropy and the second dielectric anisotropy may have dielectric anisotropy of positive anisotropy. The nematic liquid crystal molecules including the liquid crystal molecules having the first dielectric anisotropy and the liquid crystal molecules having the second dielectric anisotropy may be satisfied only when the total dielectric anisotropy thereof has the positive dielectric anisotropy.

According to another embodiment, the positive nematic liquid crystal may include the nematic liquid crystal molecules having positive dielectric anisotropy and base liquid crystal molecules. The base liquid crystal molecules may include at least one selected from the group consisting of liquid crystal molecules having negative dielectric anisotropy, liquid crystal molecules having positive dielectric anisotropy, neutral liquid crystal molecules, chiral liquid crystal molecules and achiral liquid crystal molecules. In an aspect, the positive nematic liquid crystal may include nematic liquid crystal molecules having one kind of positive dielectric anisotropy and base molecules. In another aspect, the positive nematic liquid crystal may include liquid crystal molecules having various kinds of liquid crystal molecules having positive dielectric anisotropy and the base liquid crystal molecules.

Hereinafter, exemplary materials of the positive nematic liquid crystal will be explained. The following materials may be used alone or as a mixture.

The positive nematic liquid crystal may include a cyanide group, an isocyanate group or a halogen group positive nematic liquid crystal. The positive nematic liquid crystal may use the cyanide group, the isocyanate group or the halogen group positive nematic liquid crystal alone or as a mixture thereof. As described above, the positive nematic liquid crystal may further include second base liquid crystal molecules.

The cyanide group positive nematic liquid crystal may have a dicyclic structure or a tricyclic structure.

The cyanide group nematic liquid crystal of the dicyclic structure may be represented by the following Formula 21.

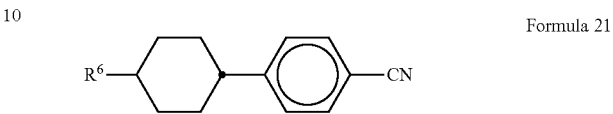

Formula 21

In Formula 21, $R^6$ is alkenyl having 1 to 15 carbon atoms (where hydrogen may be substituted with CN, $CF_3$ or halogen, and a —$CH_2$— group may be optionally substituted with —CH=CH—, —O—, —CO—, —COO—, —OOC—, —O—OC—O— or —S—). Particular examples of Formula 21 are illustrated as follows.

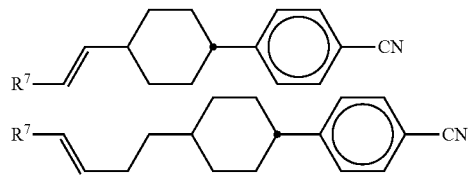

In Formula 21, $R^7$ is H, $CH_3$, $C_2H_5$ or n-$C_3H_7$.

The positive nematic liquid crystal having the tricyclic structure may be represented by the following Formula 22.

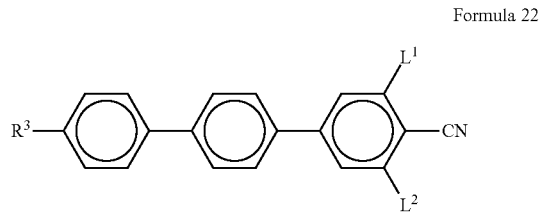

Formula 22

As defined in the above Formulae 11 to 13, $R^3$ may be an alkyl group having at most 15 carbon atoms unsubstituted or at least monosubstituted with CN, $CF_3$ or halogen, where at least one $CH_2$ of the alkyl group may be substituted with —O—, —S—, —C≡C—, —CH=CH—, —OC—O— or —O—CO—, and $L^1$ and $L^2$ are independently hydrogen or halogen.

The isocyanate group positive nematic liquid crystal may be represented by the following Formula 23.

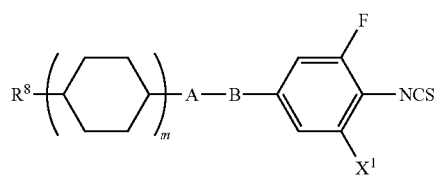

In Formula 23, $R^8$ is $C_nH_{2n+1}O$, $C_nH_{2n+1}$, or $C_nH_{2n-1}$, where n is 1 to 15, A is

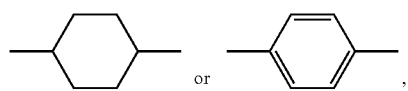

B is —CH$_2$—CH$_2$— or —C≡C—, X$^1$ is hydrogen or halogen, and m is 1, 2, 3 or 4. Particular examples of Formula 23 are illustrated as follows.

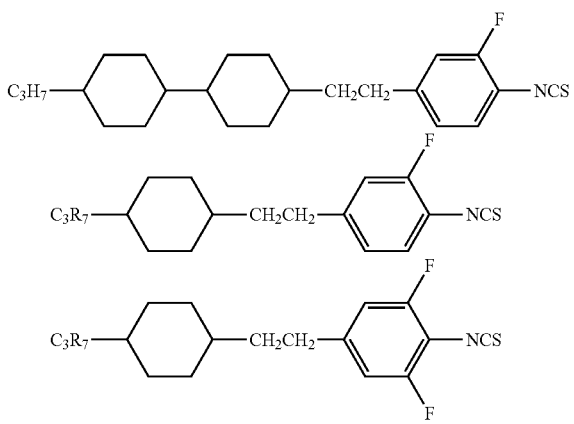

The halogen group positive nematic liquid crystal may include a fluorine group or a chlorine group material, and may have a monocyclic structure or a polycyclic structure. The fluorine group positive nematic liquid crystal may be represented by the following Formulae 24 to 27.

Formula 24

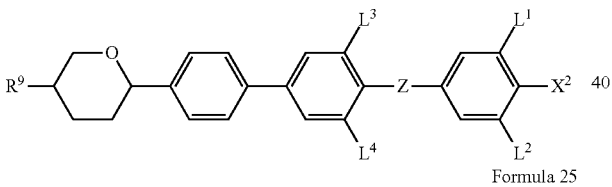

Formula 25

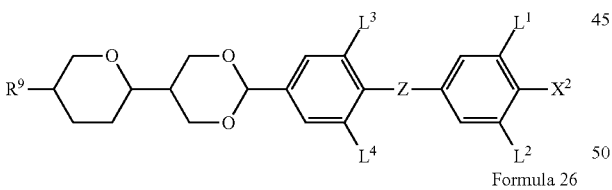

Formula 26

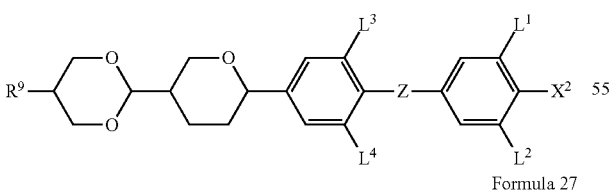

Formula 27

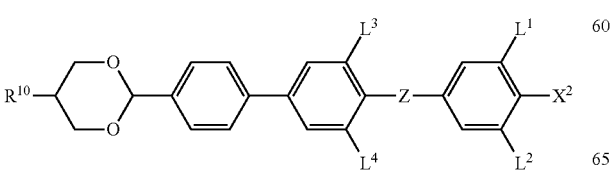

In Formulae 24 to 27, R$^9$ and R$^{10}$ are alkyl, alkoxy, fluorinated alkyl, fluorinated alkoxy, alkenyl, alkenyloxy, alkoxyalkyl or fluorinated alkenyl having 1 to 15 carbon atoms, L$^{21}$, L$^{22}$, L$^{23}$ and L$^{24}$ are independently hydrogen or fluorine, and Z represents a single bond, —CF$_2$O—, —OCF$_2$—, —COO—, —O—CO—, —CH$_2$CH$_2$—, —CH=CH—, —C≡C—, —CH$_2$O—, —(CH$_2$)$_4$—, CF=CF—, —CH=CF— or —CF=CH—.

The halogen group positive nematic liquid crystal of the dicyclic structure may be represented by the following Formula 28.

Formula 28

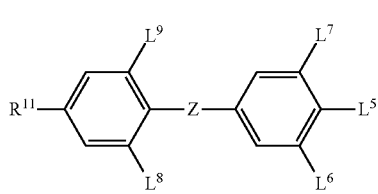

In Formula 28, R$^{11}$ represents hydrogen, halogen, or alkenyl, alkenyloxy, alkynyl or alkynoxy having 1 to 15 carbon atoms, where at least one of —CH$_2$— groups in R$^{11}$ may be substituted with —O—, C=O or —S—, L$^5$ is halogen, or fluorinated alkyl, fluorinated alkoxy, fluorinated alkenyl, alkenyloxy or oxyalkyl having 1 to 15 carbon atoms, —OCF$_3$, —OCHFCF$_3$ or SF$_5$, L$^6$, L$^7$, L$^8$ and L$^9$ are independently hydrogen (H) or halogen, and Z is a single bond, —CF$_2$O—, —OCF$_2$—, —COO—, —O—CO—, —CH$_2$CH$_2$—, —CH=CH—, —C≡C—, —CH$_2$O—, —(CH$_2$)$_4$—, CF=CF—, —CH=CF— or —CF=CH—. Particular examples of Formula 28 are illustrated as follows.

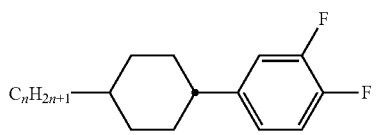

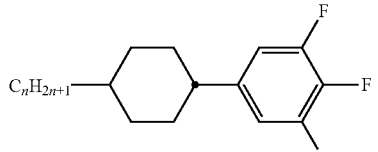

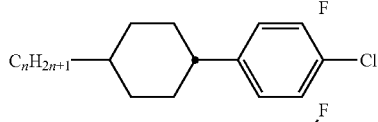

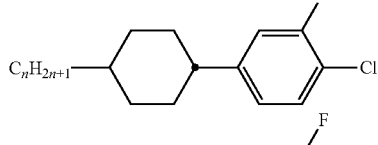

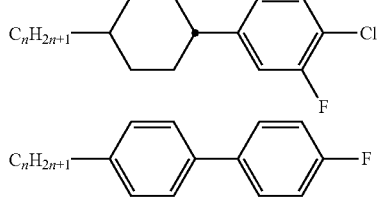

-continued

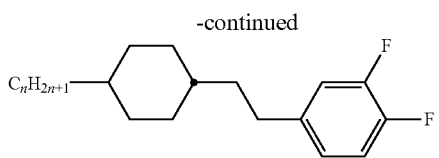

In the above Formulae, n is 1 to 15.

The halogen group positive nematic liquid crystal of the tricyclic structure may be represented by the following Formulae 29 to 33.

Formula 29

Formula 30

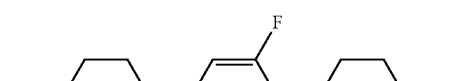

Formula 31

Formula 32

Formula 33

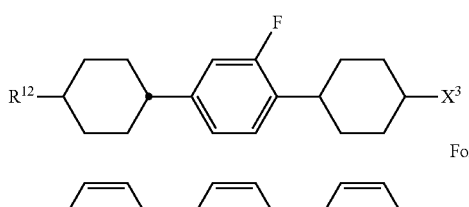

In Formulae 29 to 33, $R^{12}$ is alkyl or alkenyl having 1 to 15 carbon atoms (where the alkyl or the alkenyl may be unsubstituted or at least monosubstituted with CN, $CF_3$ or halogen, at least one of —$CH_2$— groups may be substituted with —O—), $X^3$ is —F, —Cl, —$OCF_3$, —$OCHF_2$, —$OCH_2F$ or —$CF_3$. Particular examples of Formula 29 are illustrated as follows.

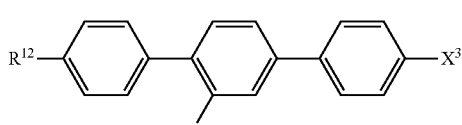

Here, $R^{12}$ is the same as defined above.

The halogen group positive nematic liquid crystal of the tetracyclic structure may be represented by the following Formulae 34 to 36.

Formula 34

Formula 35

Formula 36

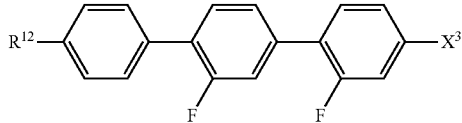

In Formulae 34 to 36, $R^{13}$ is independently alkyl, alkoxy or alkenyl having 1 to 15 carbon atoms (where the alkyl, the alkoxy or the alkenyl may be substituted with CN, $CF_3$ or halogen, and a —$CH_2$— group may be substituted with —CH=CH—, —O—, —CO—, —COO—, —OOC—, —O—OC—O— or —S—), and Z may be a single bond, —$CF_2$O—, —$OCF_2$—, —COO—, —O—CO—, —$CH_2CH_2$—, —CH=CH—, —C≡C—, —$CH_2$O—, —$(CH_2)_4$—, CF=CF—, —CH=CF— or —CF=CH—.

The positive nematic liquid crystal including three substituted fluorine groups or cyanide groups may be represented by the following Formula 37.

Formula 37

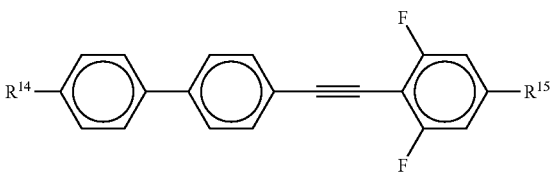

In Formula 37, at least one of two $R^{14}$ and $R^{15}$ may be an alkenyl group having at most 15 carbon atoms and unsubstituted or at least monosubstituted with CN, $CF_3$ or halogen, and the remainder thereof may be an alkyl group having at most 15 carbon atoms and unsubstituted or at least monosubstituted with CN, $CF_3$ or halogen, where at least one of $CH_2$ groups in $R^{14}$ and $R^{15}$ may be replaced with —O—, —S—, C≡C—, —OCO—, or —O—CO—. Particular examples of Formula 37 are illustrated as follows.

n and m are 1 to 10, and preferably, 1 to 5, and o and p are independently the same or different and 0 to 10, and preferably, 0 to 5, where the sum of o+p may preferably be less than or equal to 7.

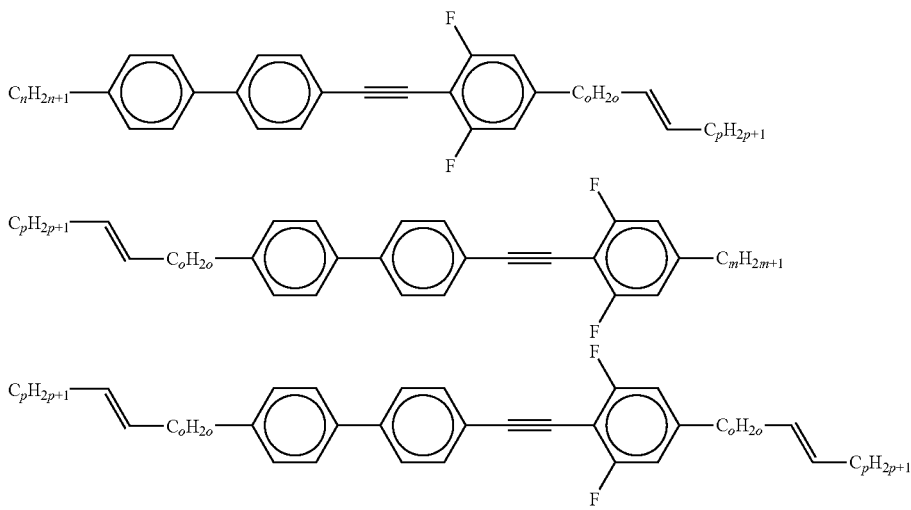

The positive nematic liquid crystal may be a single material or a mixture. The mixture of the positive nematic liquid crystal according to an embodiment may include:

a) a liquid crystal component A including at least one compound having dielectric anisotropy of greater than about +1.5;

b) a liquid crystal component including at least one compound having dielectric anisotropy from about −1.5 to about +1.5; and c) a chiral component C in case of need.

Liquid crystal component A may include at least one compound of the above Formula 37. Liquid crystal component B may include at least one compound represented by the following Formula 38. The above liquid crystal component B may be the above-described second base liquid crystal molecules.

Component C may include a plurality of chiral dopants and may use a plurality of commercially available dopants such as cholesteryl nonanoate (CN), R-811, S-811, S-1011, S-2011 (Merck KGaA in Darmstat, Germany) and CB15 (BDH in Poole, England). The selection of the dopant itself is not significant.

Formula 38

$R^{16}$ and $R^{17}$ are independently the same or different and may be an alkyl group having at most 15 carbon atoms unsubstituted or at least monosubstituted with CN, $CF_3$ or halogen, where at least one of $CH_2$ in the alkyl group may be replaced with —O—, —S—, —C≡C—, —C=C—, —OC—O—, or —OCO—, and a 1,4-phenylene ring may be independently monosubstituted or polysubstituted with fluorine.

Achiral Smectic Liquid Crystal

A smectic liquid crystal is found at a lower temperature than a nematic liquid crystal, and liquid crystal molecules thereof having a rod shape form a layered structure and are aligned in parallel to each other. The position of the liquid crystal molecules has no order when seen from plane, however the liquid crystal molecules have positional order when seen from a perpendicular direction of the plane. The bonding between molecular layers is relatively weak, and molecular layers are easily slipped to each other. Thus, the smectic liquid crystal exhibits the properties of a two-dimensional fluid. However, the viscosity is very high when compared to a common liquid.

An achiral smectic liquid crystal may have diverse structures according to the alignment of the liquid crystal. In an embodiment, a smectic A liquid crystal is aligned in a vertical direction to a molecular plane. In other embodiments, a smectic C liquid crystal is aligned while forming a certain angle with the molecular plane. In other embodiments, a smectic B liquid crystal is aligned in a perpendicular direction to the molecular plane, however, aligned as a hexagonal network in the plane. The kind of the smectic liquid crystal is diverse and is not limited to the above-described materials in the present invention.

According to an embodiment, the achiral smectic liquid crystal may include achiral smectic liquid crystal molecules. In an aspect, the achiral smectic liquid crystal molecules may be a single kind. In another aspect, the achiral smectic liquid crystal molecules may be a mixture of different kinds. For example, the achiral smectic liquid crystal molecules may include first achiral smectic liquid crystal molecules and second achiral smectic liquid crystal molecules. In this case, the second achiral smectic liquid crystal molecules may be different from the first achiral smectic liquid crystal molecules.

According to another embodiment, the achiral smectic liquid crystal may include achiral smectic liquid crystal molecules and base liquid crystal molecules. The base liquid crystal molecules may include at least one selected from liquid crystal molecules having negative dielectric anisotropy, liquid crystal molecules having positive dielectric anisotropy and neutral liquid crystal molecules. In an aspect, the achiral smectic liquid crystal may include one kind of achiral smectic liquid crystal molecules and base molecules. In another aspect, the achiral smectic liquid crystal may include different achiral smectic liquid crystals and base molecules.

Hereinafter, exemplary materials of the achiral smectic liquid crystal will be explained. The following materials may be used alone or as a mixture thereof. The achiral smectic liquid crystal may include the smectic A liquid crystal, the smectic B liquid crystal, the smectic liquid crystal C, etc.

The smectic A liquid crystal may be represented by the following Formulae 39 to 41.

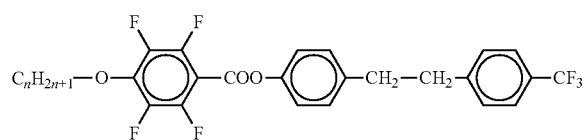

Formula 39

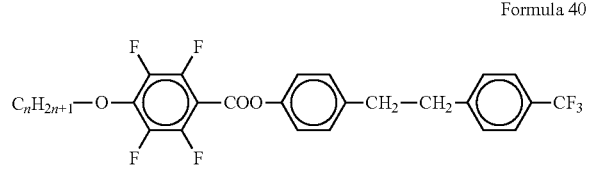

Formula 40

Here, 1≤n≤15.

$$CH_2=C(CH_3)COO(CH_2)_5PhCOOPhPhCF_3 \quad \text{Formula 41}$$

Here, Ph is a 1,4-phenylene group.

The smectic B liquid crystal may include 4-hexyl-4'-[2-(4-isothiocyanatophenyl)ethyl]-1-1'-biphenyl at a temperature range from about 60.3 to about 98.5° C. In addition, the smectic B liquid crystal may include at least one selected from the group consisting of 1-[5-(4-hexylphenyl)pyramidyl-2]-2-(4-hexyloxyphenyl) ethane, $PhPhCHNPhCHCHCOOCH_2CH(CH_3)_2$, $C_6H_{13}OPhCHNPhPh$, $C_8H_{17}OPhPhCOOPhOC_5H_9$, $C_8H_{17}PhPhCOOPhC_8H_{17}$, $C_8H_{17}OPhPhCOOPhOC_7H_{17}$, $C_5H_{11}OPhCHNPhPh$ and $C_{16}H_{33}OPhCHNPhPh$.

The smectic C liquid crystal may be represented by the following Formulae 42 to 44.

Formula 42

Here, each of A and B is a benzene ring or a cyclohexane ring, m and n are 0 or 1, and each of $R_1$ and $R_2$ is an alkyl group, an alkoxy group or an alkanoyloxy group having 1 to 18 carbon atoms.

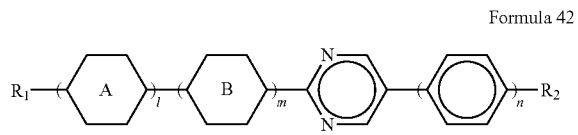

Formula 43

Here, each of $R_3$ and $R_4$ is an alkyl group having 1 to 18 carbon atoms.

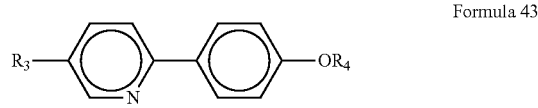

Formula 44

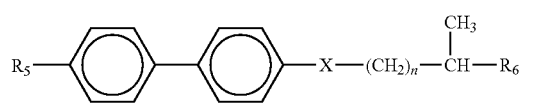

Here, X is a cobalt bond or —O—, n is 0 to 10, $R_5$ is an alkyl group or an alkoxy group having 1 to 18 carbon atoms, and $R_6$ is an alkyl group having 2 to 18 carbon atoms.

According to an embodiment, the liquid crystal layer includes the nematic liquid crystal and the achiral smectic liquid crystal, and the alignment of the liquid crystal layer may become uniform, and the stability of the alignment may be improved.

According to another embodiment of the present invention, the liquid crystal layer may further include a chiral liquid crystal. The liquid crystal layer may include a chiral liquid crystal, an achiral liquid crystal and a nematic liquid crystal. In the liquid crystal layer, the total amount of the chiral liquid crystal and the achiral liquid crystal may be from about 1 wt % to about 50 wt %. In an embodiment, the chiral liquid crystal may be from about 0.01 wt % to about 10 wt % in the liquid crystal layer.

In an aspect, the chiral liquid crystal may include chiral liquid crystal molecules. In an embodiment, the chiral liquid crystal molecules may be one kind. In another embodiment, the chiral liquid crystal molecules may be different from each other. For example, the chiral liquid crystal molecules may include chiral liquid crystal molecules having spontaneous polarization and chiral liquid crystal molecules having no spontaneous polarization. In addition, the chiral liquid crystal molecules may include chiral liquid crystal molecules having different spontaneous polarization properties.

In another aspect, the chiral liquid crystal may function as a ferroelectric material together with the achiral smectic liquid crystal. The ferroelectric liquid crystal has spontaneous polarization even though an electric field is not applied and is a kind of insulating dielectric material, however, the dielectric polarity thereof is not proportional to an electric field different from a general dielectric material, and the ferroelectric liquid crystal exhibits ideality by which the relation between polarity and electric field has electrical hysteresis. The ferroelectric liquid crystal typically has the physical properties of the spontaneous polarization and polarization reversal phenomenon of the spontaneous polarization by an electric field.

Hereinafter, examples of the chiral liquid crystal will be illustrated and explained. However, the chiral liquid crystal of the present invention is not limited to the following materials.

The chiral liquid crystal may include a fluorine chiral end liquid crystal, a chiral allyl ester liquid crystal, a center core polyring chiral liquid crystal, a chiral smectic liquid crystal, etc. In addition, the chiral liquid crystal may be a banana shape liquid crystal.

The fluorine chiral end liquid crystal may be represented by the following Formula 45.

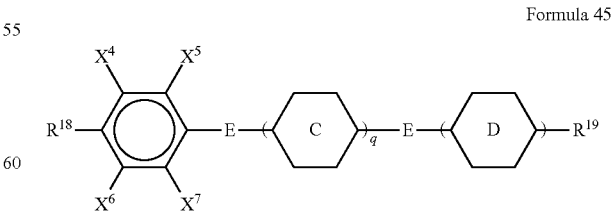

Formula 45

Here, $X^4$, $X^5$, $X^6$ and $X^7$ are independently $CF_3$, $CF_2H$, $CFH_2$, halogen, alkyl or alkoxy, C and D are independently selected from phenyl, mono-fluorophenyl di-fluorophenyl and cyclohexyl, E is independently selected from a single bond, COO, OOC, and C≡C, at least one of E is a single bond, q is 0 or 1, and $R^{18}$ is the terminal group of the following Formula 40.

Formula 46

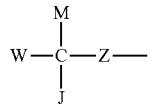

In Formula 46, Z is O, $(CH_2)_1O$, or $(CH_2)_2O$, J and M are independently selected from hydrogen and alkyl having 1 to 15 carbon atoms, W is a linear or branched alkyl chain having 1 to 15 carbon atoms, J, M and W are different from each other, and $R^{19}$ is selected from alkenyl, alkenyloxy, alkynyl or alkynoxy having 1 to 15 carbon atoms.

The chiral allyl ester liquid crystal may be represented by Formula 47.

Formula 47

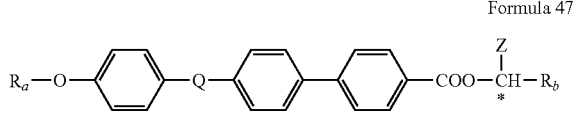

In Formula 47, $R_a$ and $R_b$ are independently alkyl having 1 to 20 carbon atoms, Q is —C(=O)O— or —OC(=O)—, Z represents fluorine-containing alkyl or an alkyl group substituted with halogen, and * represents chiral carbon. Particular examples of Formula 41 may include 4'-n-(octyleoxyphenyl4'-(1,1,1-trigluoro-2-octyloxycarbonyl)biphenyl-4-carboxylate of the following Formula.

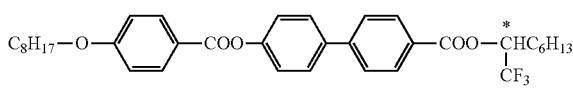

The center core polyring chiral liquid crystal may be represented by Formulae 48 to 51.

Formula 48

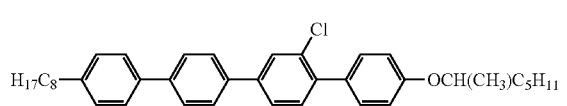

Formula 48 represents S-4-(trans-4-heptylcyclohexyl)-3'-chloro-4"-(1-methylheptyloxy)terphenyl.

Formula 49

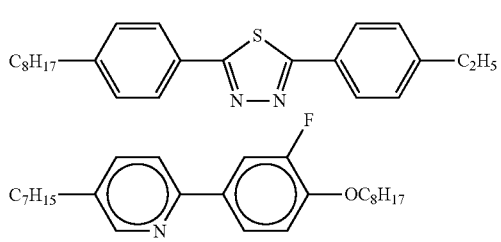

Formula 49 represents R-4-octhyl-3"-chloro-4'"-(1-methylhexyloxy)quarterphenyl.

Formula 50

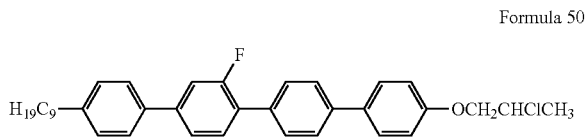

Formula 50 represents S-4-nonyl-3'-fluoro-4'"-(2-chloropropyloxy)quarterphenyl

Formula 51

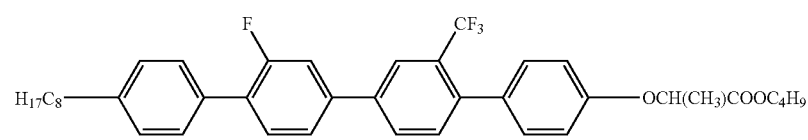

Formula 51 represents S-2-(4-octyl-2'-fluoro-3"-trifluoromethyl-4'"-quarterphenyloxy)-propionate.

The chiral liquid crystal may be represented by at least one of the following Formulae 52 and 53.

Formula 52

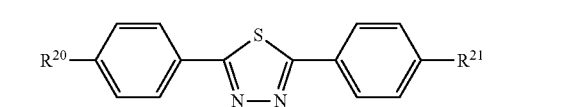

Formula 53

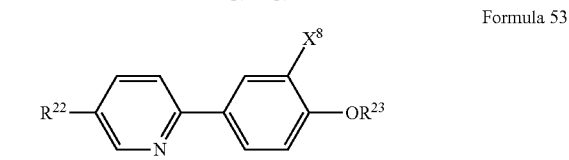

In Formulae 52 and 53, $R^{20}$ and $R^{21}$ are different and a linear alkyl group having 1 to 9 carbon atoms, $R^{22}$ and $R^{23}$ are the same or different and a linear alkyl group having 1 to 18 carbon atoms (in $R^{20}$ to $R^{23}$, hydrogen may be substituted with CN, $CF_3$ or halogen, and a —$CH_2$— group may be optionally substituted with —CH=CH—, —O—, —CO—, —COO—, —OOC—, —O—OC—O— or —S—), and X represents hydrogen or halogen. Particular examples of the above Formulae 52 and 53 are illustrated as follows.

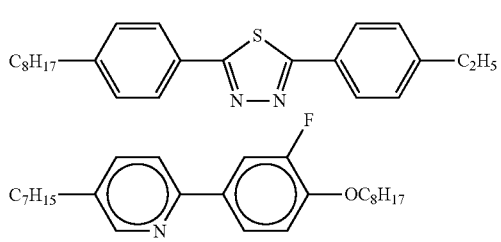

The chiral smectic liquid crystal may be represented by Formula 54.

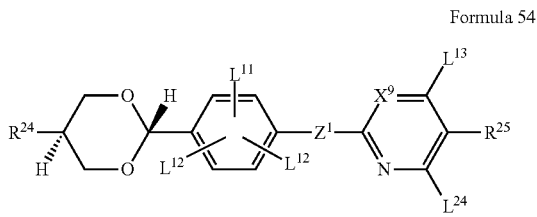

Formula 54

In Formula 54, $R^{24}$ is chiral or achiral alkyl or alkenyl having 1 to 24 carbon atoms, $R^{25}$ is chiral or achiral alkoxy, alkenyloxy, alkylcarbonyloxy (alkyl-COO—) or alkenylcarbonyloxy (alkenyl-COO—) having 1 to 20 carbon atoms (in $R^{24}$ and $R^{25}$, hydrogen may be substituted with CN, $CF_3$ or halogen, and a —CH2- group may be substituted with —CH=CH—, —O—, —CO—, —COO—, —OOC—, —O—OC—O— or —S—), $Z^1$ is a single bond, —COO— or —OOC—, —$CH_2CH_2$—, —CH=CH—, —C≡C—, —$OCH_2$— or —$CH_2O$—, $L^{10}$ to $L^{14}$ are hydrogen, halogen, cyano, nitro, or alkyl or alkenyl having 1 to 20 carbon atoms (where a —$CH_2$— group may be substituted with —CH=CH—, —O—, —CO—, —COO—, —OOC—, —O—OC—O— or —S—), and $X^9$ is —CH— or nitrogen. Particular example of the above Formula 54 is illustrated as follows.

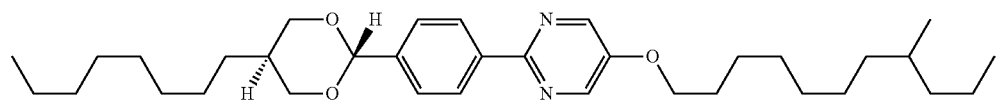 [SMILES: CCCCCCCC[C@H]1CO[C@H](c2ccc(-c3ncc(OCCCCCCCC(C)CCC)cn3)cc2)OC1]

The banana shape chiral liquid crystal may be represented by the following Formula 55.

Formula 55

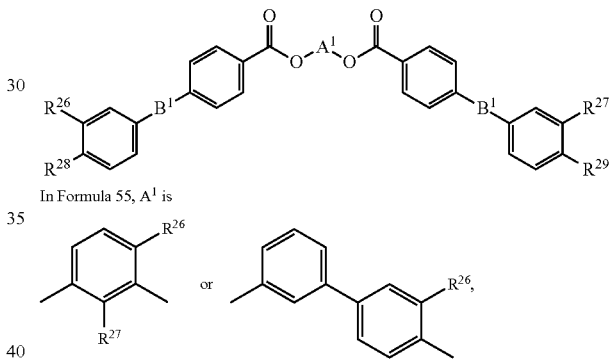

In Formula 55, $A^1$ is $B^1$ is

—N=CH— or

—OOC—, $R^{26}$ and $R^{27}$ are independently hydrogen or halogen, and $R^{28}$ and $R^{29}$ are independently alkyl or alkoxy having 8 to 16 carbon atoms. Particular examples of the above Formula 49 are illustrated as follows.

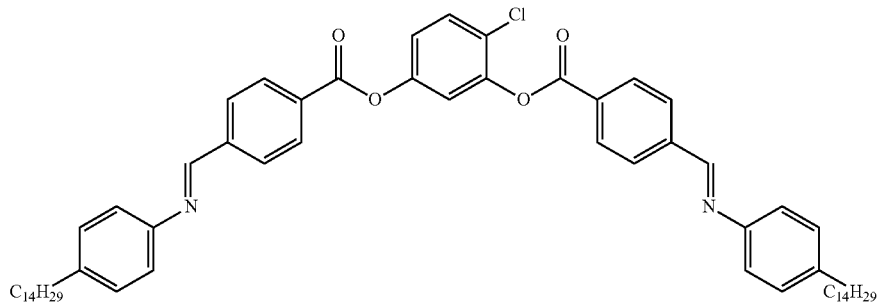

-continued

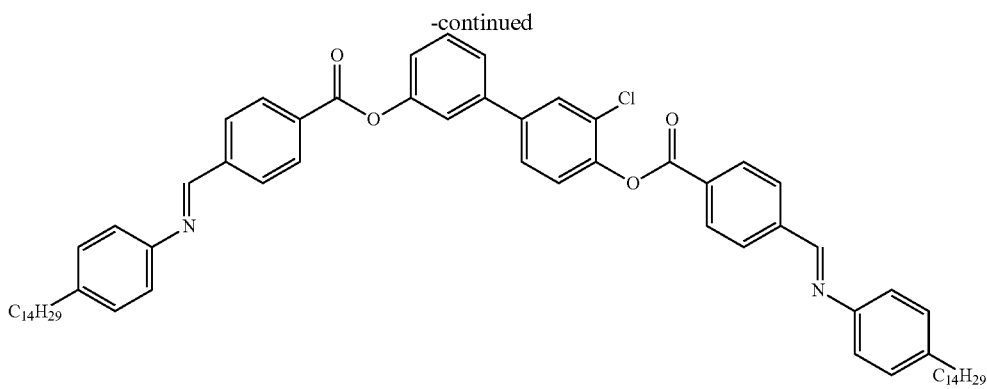

The chiral liquid crystal may be a single material of the chiral liquid crystal or a mixture including the chiral liquid crystal.

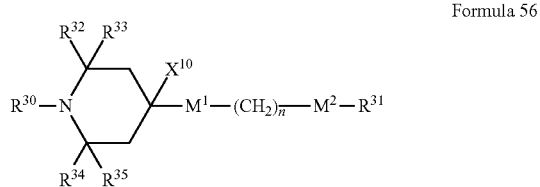

Formula 56

In Formula 56, $X^{10}$ is hydrogen (H), $R^{30}$ is hydrogen or alkyl having 1 to 15 carbon atoms, $R^{31}$ is hydrogen, halogen, or an alkyl group or an alkenyl group having 1 to 20 carbon atoms (where one or two of —$CH_2$— groups may be replaced with —O—, —C(=O)O— or —Si(CH$_3$)$_2$—, and at least one hydrogen of the alkyl or the alkenyl group may be replaced with fluorine or CH$_3$), and each of $R^{32}$, $R^{33}$, $R^{34}$ and $R^{35}$ is CH$_3$.

According to this embodiment, since the liquid crystal layer includes the nematic liquid crystal and the achiral smectic liquid crystal, the alignment of the liquid crystal layer may become uniform, and the stability of the alignment may be improved. In addition, since the liquid crystal layer includes the chiral liquid crystal, ferroelectric properties may be exhibited together with the achiral smectic liquid crystal, and the alignment of the liquid crystal layer may become uniform, and the stability of alignment may be improved further.

According to another embodiment of the present invention, the liquid crystal layer may further include a reactive mesogen material. The liquid crystal layer may include from about 0.01 wt % to about 3 wt % of the reactive mesogen material, from about 1 wt % to about 50 wt % of the achiral smectic liquid crystal and a remainder of the nematic liquid crystal.

The reactive mesogen material means a polymerizable mesogenic compound. The "mesogenic compound" or "mesogenic material" may include a material or a compound containing at least one mesogenic group of a rod shape, a plate shape or a disc shape, i.e. a group capable of inducing liquid crystalline behavior. The reactive mesogen material may be polymerized by light such as ultraviolet, etc. and may be a material being aligned according to the alignment state of an adjacent material.

Examples of the reactive mesogen material may include compounds represented by the following Formula.

P1-A1-(Z1-A2)$n$-P2,

Here, P1 and P2 are at least one of acrylate, methacrylate, vinyl, vinyloxy and epoxy group, A1 and A2 are at least one of 1,4-phenylene and naphthalene-2,6-diyl groups, Z1 is at least one of COO—, OCO— and a single bond, and n is one of 0, 1 and 2.

More particularly, compounds represented by one of the following Formulae may be illustrated.

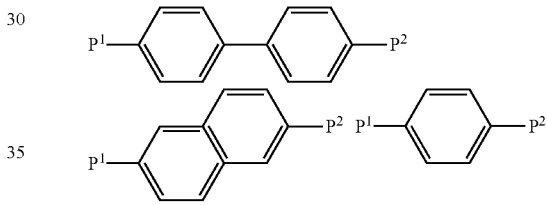

Here, P1 and P2 may include at least one selected from the group consisting of an acrylate group, a methacrylate group, a vinyl group, a vinyloxy group and an epoxy group.

According to this embodiment, since the liquid crystal layer includes the nematic liquid crystal and the achiral smectic liquid crystal, the alignment of the liquid crystal layer may become uniform and the stability of alignment may be improved. In addition, since the liquid crystal layer includes the reactive mesogen material, the aligning rate and the aligning angle of the liquid crystal layer may be increased, thereby improving optical properties.

According to another embodiment of the present invention, the liquid crystal layer may include the achiral liquid crystal, the nematic liquid crystal, the chiral liquid crystal and the reactive mesogen material. In the liquid crystal layer, the total amount of the achiral smectic liquid crystal and the chiral liquid crystal may be from about 1 wt % to about 50 wt %. The chiral liquid crystal in the liquid crystal layer may be from about 0.01 wt % to about 10 wt %. The reactive mesogen material in the liquid crystal layer may be from about 0.01 wt % to about 3 wt %.

Detailed explanation of the achiral liquid crystal, the nematic liquid crystal, the chiral liquid crystal and the reactive mesogen material will refer to the above-description.

According to this embodiment, since the liquid crystal layer includes the achiral liquid crystal, the nematic liquid crystal and the chiral smectic liquid crystal, the alignment of the liquid crystal layer may become uniform and the stability of alignment may be improved. In addition, since the liquid crystal layer includes the reactive mesogen material, the aligning rate and the aligning angle of the liquid crystal layer may be increased, thereby improving optical properties.

Second Embodiment of Liquid Crystal Layer

A liquid crystal layer according to this embodiment may include a nematic liquid crystal and a smectic liquid crystal. The liquid crystal layer may include from about 50 wt % to about 97 wt % of the nematic liquid crystal and from about 3 wt % to about 50 wt % of the smectic liquid crystal. When the smectic liquid crystal is less than or equal to about 3 wt % of the liquid crystal layer, the liquid crystal alignment of the liquid crystal layer may become unstable. In addition, when the amount of the smectic liquid crystal exceeds about 50 wt % of the total amount of the liquid crystal layer, the viscosity of the liquid crystal layer may increase, and the response time of a display apparatus including the liquid crystal layer may be decreased. More preferably, the liquid crystal layer may include from about 3 wt % to about 35 wt % of the smectic liquid crystal.

The amount of the smectic liquid crystal in the liquid crystal layer may be determined by the viscosity of the smectic liquid crystal. In the case that the viscosity of the smectic liquid crystal is low, the amount of the smectic liquid crystal in the liquid crystal layer may be greater than or equal to about 50 wt %. Meanwhile, in the case that the viscosity of the smectic liquid crystal is high, the amount may preferably be maintained to less than or equal to about 30 wt % in consideration of the total viscosity of the liquid crystal layer.

According to an embodiment of the present invention, the smectic liquid crystal may include an achiral smectic liquid crystal and a chiral smectic liquid crystal. The smectic liquid crystal may include from about 70 wt % to about 97 wt % of the achiral smectic liquid crystal and from about 3 wt % to about 30 wt % of the chiral smectic liquid crystal.

The chiral smectic liquid crystal may have spontaneous polarization properties. The spontaneous polarization means electrical polarization phenomenon of a material in a natural state when an electric field is not applied. The chiral smectic liquid crystal will be described in detail hereinafter.

According to an embodiment, the nematic liquid crystal may include a negative nematic liquid crystal. According to another embodiment, the nematic liquid crystal may include a negative nematic liquid crystal and a positive nematic liquid crystal. The positive nematic liquid crystal may be about 10 wt % of the nematic liquid crystal.

The configuration elements, the structure and the examples of the nematic liquid crystal and the achiral smectic liquid crystal of the smectic liquid crystal explained in this embodiment are substantially the same as those described above, and detailed description thereof will be omitted.

Hereinafter, the chiral smectic liquid crystal will be explained in more detail.

The chiral smectic liquid crystal may include chiral smectic liquid crystal molecules. According to an aspect, the chiral smectic liquid crystal molecules may be one kind. In another aspect, the chiral smectic liquid crystal molecules may be different kinds. For example, the chiral smectic liquid crystal molecules may include first chiral smectic liquid crystal molecules and second chiral smectic liquid crystal molecules. The first and second chiral smectic liquid crystal molecules may be different from each other.

According to another embodiment, the chiral smectic liquid crystal may include the chiral smectic liquid crystal molecules and base liquid crystal molecules. The base liquid crystal molecules may include at least one selected from the group consisting of liquid crystal molecules having negative dielectric anisotropy, liquid crystal molecules having positive dielectric anisotropy, neutral liquid crystal molecules, and achiral liquid crystal molecules.

According to another embodiment, the chiral smectic liquid crystal together with the achiral liquid crystal molecules may make the liquid crystal layer exhibit ferroelectric properties.

The chiral smectic liquid crystal includes a chiral smectic C liquid crystal and other chiral smectic liquid crystals.

The chiral smectic C may be represented by Formulae 57 to 60.

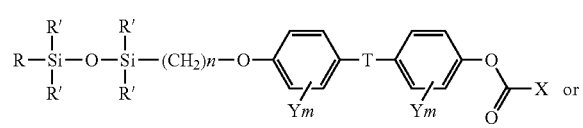

Formula 57

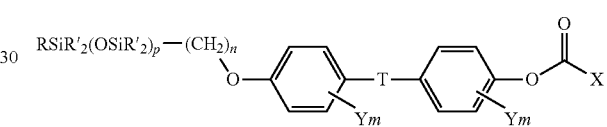

Formula 58

In Formulae 57 and 58, R is an alkyl group having 1 to 10 carbon atoms, or

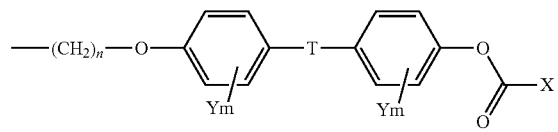

group, R' is an alkyl group having 1 to 4 carbon atoms, T is

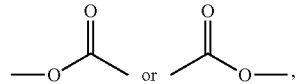

X is an alkyl group or a halogen substituted alkyl group having at least one chiral center, Y is a fluorine atom, m has 0, 1 or 2, p has 2, 3 or 4, and n has 10, 11 or 12.

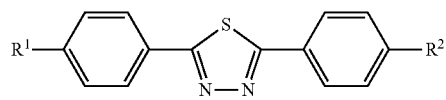

Formula 59

In Formula 59, $R^1$ and $R^2$ are a linear alkyl group having 1 to 9 carbon atoms and are different from each other.

Formula 60

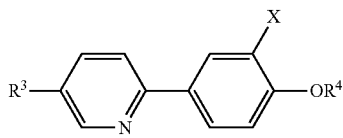

In Formula 60, $R^3$ and $R^4$ are an alkyl group including 1 to 18 carbon atoms and are the same or different, and X is hydrogen or fluorine.

Formula 61

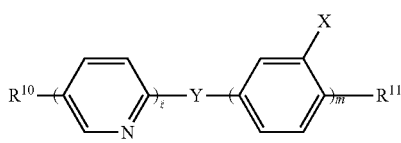

In Formula 61, 1 is 1 or 2, Y is —COO—, —CH=N—, —CH$_2$O—, —OCO—, —N=CH—, —OCH2- or a single bond, $R^{10}$ is an alkyl group or an alkoxy group having 1 to 18 carbon atoms, $R^{11}$ is (S)-2-methylbutyl, (S)-2-methylbutoxy, (S)-2-methylbutoxycarbonyl, (S)-1-methylheptyloxy, (R)-1-methylheptyloxy, (S)-1-methylheptyloxycarbonyl or (R)-1-methylheptyloxycarbonyl.

Formula 62

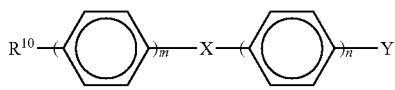

In Formula 62, n is 1 or 2, R is an alkyl group or an alkoxy group having 1 to 18 carbon atoms, Y is an alkyl, alkoxy, alkoxycarbonyl, alkanoyl or alkanoyloxy group including asymmetric carbon, and X includes

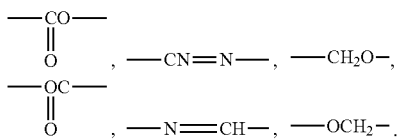

In Formula 62, Y may be one of

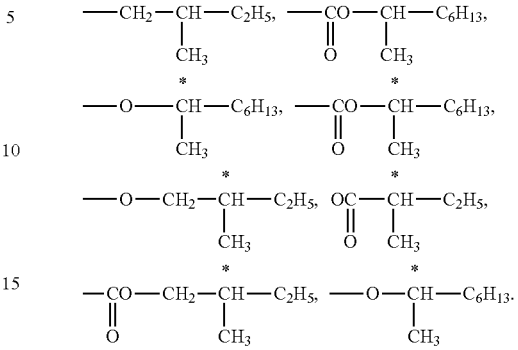

According to this embodiment, since the liquid crystal layer includes the nematic liquid crystal, the achiral smectic liquid crystal and the chiral smectic liquid crystal, the alignment of the liquid crystal layer may become uniform and the stability of the alignment may be improved.

According to another embodiment, the liquid crystal layer may further include a plurality of chiral dopants. The chiral dopant may be included in the liquid crystal layer in an amount ratio of less than or equal to about 10 wt %. According to an aspect, the chiral dopant may have no spontaneous polarization. According to another aspect, the chiral dopant may have smaller spontaneous polarization than the chiral smectic liquid crystal.

According to an embodiment, the chiral dopant may include a plurality of chiral dopants. According to an aspect, the chiral dopants may be one kind. According to another aspect, the chiral dopants may be different kinds.

According to another embodiment, the chiral dopant together with the smectic liquid crystal may exhibit ferroelectric properties.

Hereinafter, examples of the chiral dopant will be illustrated and explained. The following materials may be used alone or as a mixture. In addition, the chiral dopant of the present invention is not limited to the following materials.

The chiral dopant may be at least one selected from Formulae 63 to 70.

Formula 63

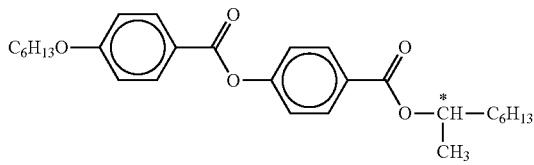

Formula 64

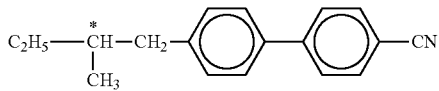

Formula 65

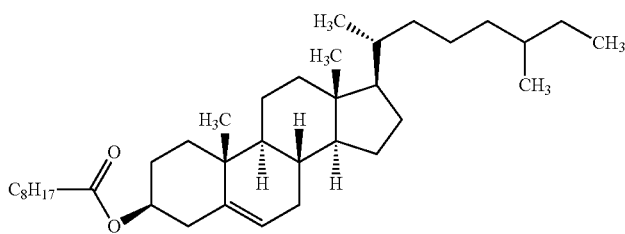

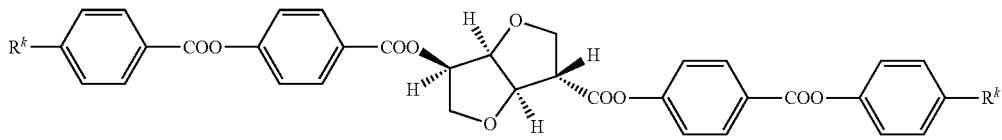

Formula 66

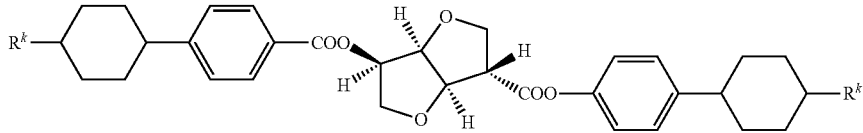

Formula 67

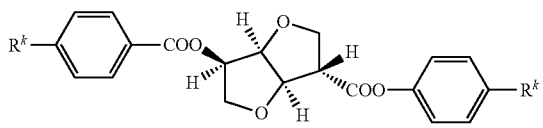

Formula 68

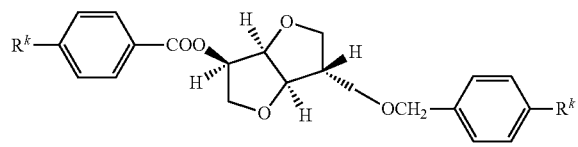

Formula 69

Formula 70

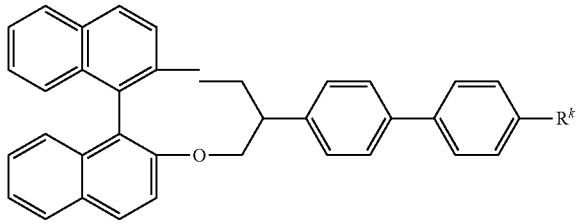

In Formulae 66 to 70, $R^k$ is an alkyl group having 3 to 10 carbon atoms, and in the alkyl group, —$CH_2$— adjacent to a ring may be replaced with —O—, and an optional —$CH_2$— may be substituted with —CH—CH—.

As the chiral dopant, a plurality of commercially available dopants such as cholesteryl nonanoate (CN), R-811, S-811, S-1011, S-1011, S-2011 (Merck KGaA in Darmstat, Germany) and CB15 (BDH in Poole, England) may be used.

According to this embodiment, since the liquid crystal layer includes the nematic liquid crystal, the achiral smectic liquid crystal and the chiral smectic liquid crystal, the alignment of the liquid crystal layer may become uniform and the stability of the alignment may be improved. In addition, since the liquid crystal layer includes the chiral dopant, ferroelectric properties may be exhibited together with the smectic liquid crystal, and the alignment of the liquid crystal layer may become uniform, and the stability of alignment may be improved further.

According to another embodiment of the present invention, the liquid crystal layer may further include a reactive mesogen material. The liquid crystal layer may include from about 0.01 wt % to about 3 wt % of the reactive mesogen material. Detailed description of the reactive mesogen material will be omitted.

According to this embodiment, since the liquid crystal layer includes the nematic liquid crystal, the achiral smectic liquid crystal and the chiral smectic liquid crystal, the alignment of the liquid crystal layer may become uniform and the stability of the alignment may be improved. In addition, since the liquid crystal layer includes the reactive mesogen material, the aligning rate and the aligning angle of the liquid crystal layer may be increased, thereby improving optical properties.

According to another embodiment of the present invention, the liquid crystal layer may include a nematic liquid crystal, a smectic liquid crystal, a chiral dopant and a reactive mesogen material. The liquid crystal layer may include from about 3 wt % to about 50 wt % of the smectic liquid crystal, at most about 10 wt % of the chiral dopant and from about 0.01 wt % to about 3 wt % of the reactive mesogen material. Detailed description of the nematic liquid crystal, the smectic liquid crystal, the chiral dopant and the reactive mesogen material will be omitted.

According to this embodiment, since the liquid crystal layer includes the nematic liquid crystal, the achiral smectic liquid crystal, the chiral smectic liquid crystal and the chiral dopant, the alignment of the liquid crystal layer may become uniform and the stability of the alignment may be improved. In addition, since the liquid crystal layer includes the reactive mesogen material, the aligning rate and the aligning angle of the liquid crystal layer may be increased, thereby improving optical properties.

(Manufacturing Method of Liquid Crystal Layer)

According to an embodiment of the present invention, a liquid crystal layer may be manufactured by mixing a nematic liquid crystal and an achiral smectic liquid crystal. The liquid crystal layer may be manufactured by mixing from about 50 wt % to about 99 wt % of the nematic liquid crystal and from about 1 wt % to about 50 wt % of the achiral smectic liquid crystal.

According to an aspect, the liquid crystal layer may further include a chiral liquid crystal. The liquid crystal layer may be manufactured by mixing less than or equal to about 10 wt % of the chiral liquid crystal, from about 1 wt % to about 50 wt % of the achiral smectic liquid crystal and a remainder of the nematic liquid crystal.

According to another aspect, the liquid crystal layer may further include a reactive mesogen material. The liquid crystal layer may be manufactured by mixing from about 0.01 wt % to about 3 wt % of the reactive mesogen material, from about 1 wt % to about 50 wt % of the achiral smectic liquid crystal and a remainder of the nematic liquid crystal.

According to a further another aspect, the liquid crystal layer may include a nematic liquid crystal, an achiral smectic liquid crystal, a chiral liquid crystal and a reactive mesogen material. The liquid crystal layer may be manufactured by mixing from about 0.01 wt % to about 3 wt % of the reactive mesogen material, at most about 10 wt % of the chiral liquid crystal, from about 1 wt % to about 50 wt % of the achiral smectic liquid crystal and a remainder of the nematic liquid crystal.

According to another embodiment of the present invention, the liquid crystal layer may be manufactured by mixing a nematic liquid crystal and a smectic liquid crystal. The liquid crystal layer may be manufactured by mixing from about 50 wt % to about 97 wt % of the nematic liquid crystal and from about 3 wt % to about 50 wt % of the smectic liquid crystal. The smectic liquid crystal may include an achiral smectic liquid crystal and a chiral smectic liquid crystal. The smectic liquid crystal may include from about 70 wt % to about 97 wt % of the achiral smectic liquid crystal and from about 3 wt % to about 30 wt % of the chiral smectic liquid crystal.

According to an aspect, the liquid crystal layer may further include a chiral dopant. The liquid crystal layer may be manufactured by mixing less than or equal to about 10 wt % of the chiral dopant, from about 3 wt % to about 50 wt % of the smectic liquid crystal and a remainder of the nematic liquid crystal.

According to another aspect, the liquid crystal layer may further include a reactive mesogen material. The liquid crystal layer may be formed by mixing from about 0.01 wt % to about 3 wt % of the reactive mesogen material, from about 3 wt % to about 50 wt % of the smectic liquid crystal and a remainder of the nematic liquid crystal.

According to a further another aspect, the liquid crystal layer may include a nematic liquid crystal, a smectic liquid crystal, a chiral dopant and a reactive mesogen material. The liquid crystal layer may be manufactured by mixing less than or equal to about 10 wt % of the chiral dopant, from about 0.01 wt % to about 3 wt % of the reactive mesogen material, from about 3 wt % to about 50 wt % of the smectic liquid crystal and a remainder of the nematic liquid crystal.

During performing a mixing process, the process temperature may be the temperature at which isotropic properties of a material included at the greatest amount in the liquid crystal layer are shown. According to exemplary embodiments of the present invention, the process of the mixing may be performed in a temperature range from about 90° C. to about 100° C. The temperature range may be a temperature range at which the nematic liquid crystal exhibits isotropic properties. In this embodiment, the mixing of the liquid crystal layer is performed at from about 90° C. to about 100° C., however the mixing temperature of the liquid crystal layer is not specifically limited in the present invention.

Hereinafter, the electrical properties of the liquid crystal layer thus manufactured will be explained.

Figure 4:
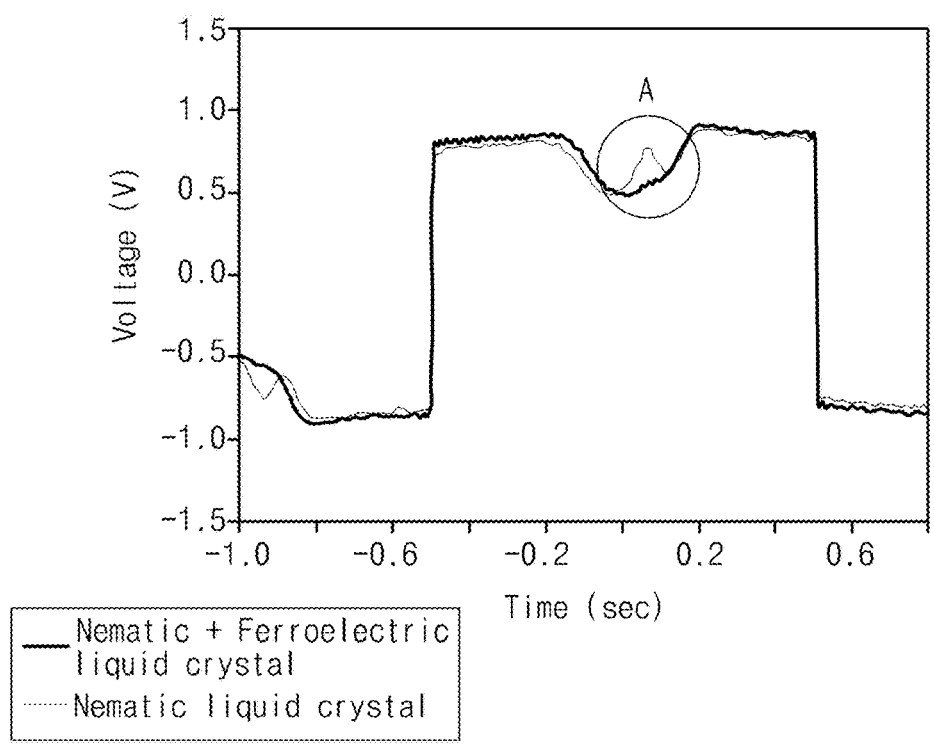
FIG. 4 is a graph illustrating the electrical properties of a liquid crystal layer according to an embodiment of the present invention.

FIG. 4 is a graph illustrating the electrical properties of a liquid crystal layer according to an embodiment of the present invention. In FIG. 1, x-axis represents time, and the unit thereof is second, and Y-axis represents an applied voltage, and the unit thereof is volt [V].

When a voltage is applied to the liquid crystal layer manufactured by the above-described method, a peak that is not shown in a liquid crystal layer including only a nematic liquid crystal is shown as illustrated in FIG. 4. This peak is due to a ferroelectric liquid crystal. Thus, the nematic liquid crystal and the ferroelectric liquid crystal are present not as a compound shape but as a mixture in the liquid crystal layer, and the nematic liquid crystal may exhibit intrinsic properties thereof, and the ferroelectric liquid crystal may exhibit intrinsic properties thereof. Therefore, the nematic liquid crystal and the ferroelectric liquid crystal may reinforce and/or interfere the movement from each other.

Hereinafter, the present invention will be explained in detail through examples and Comparative Example 1. However, the following examples are described only for illustrating the present invention. Thus, the present invention is not limited thereto and may be modified and changed diversely.

Liquid Crystal Display Device

Comparative Example 1

A liquid crystal display device including a first display plate including a first substrate and a first electrode having a first slit of Chevron pattern, a second display plate including a second substrate and a second electrode having a second slit of Chevron pattern, and a liquid crystal layer filling up a space between the first and second display plates was manufactured. The liquid crystal display device was manufactured in a PVA mode.

The liquid crystal layer was manufactured by using about 100 wt % of MLC 6608 ($\Delta n$=0.084, $\Delta \in$=−4.3) of Merck Co. The thickness (cell gap) of the liquid crystal layer of the liquid crystal display device was about 4.5 μm.

Example 1

A liquid crystal display device including a first display plate including a first substrate and a first electrode having a first slit of Chevron pattern, a second display plate including a second substrate and a second electrode having a second slit of Chevron pattern, and a liquid crystal layer filling up a space between the first and second display plates was manufactured. The liquid crystal display device was manufactured in a PVA mode.

The liquid crystal layer was manufactured by mixing about 97 wt % of MLC 6608 ($\Delta n$=0.084, $\Delta \in$=−4.3) of Merck Co. and about 3 wt % of KFLC 7 ($\Delta n$=0.18) of Kingston Chemical Co. at about 100° C. The thickness of the liquid crystal layer of the liquid crystal display device was about 4.5 μm. The about 3 wt % of the KFLC included about 2.8 wt % of an achiral component and about 0.2 wt % of a chiral component.

Example 2

A liquid crystal display device was manufactured by the same procedure described in Example 1 except for the material of the liquid crystal layer.

The liquid crystal layer was manufactured by mixing about 95 wt % of MLC 6608 ($\Delta n$=0.084, $\Delta \in$=−4.3) of Merck Co. and about 5 wt % of KFLC 10 ($\Delta n$=0.18) of Kingston Chemical Co. at about 100° C. The about 5 wt % of the KFLC 10 included about 4.5 wt % of an achiral component and about 0.5 wt % of a chiral component.

Example 3

A liquid crystal display device was manufactured by the same procedure described in Example 1 except for the material of the liquid crystal layer.

The liquid crystal layer was manufactured by mixing about 90 wt % of MLC 6608 ($\Delta n=0.084$, $\Delta\varepsilon=-4.3$) of Merck Co. and about 10 wt % of KFLC 3 ($\Delta n=0.18$) of Kingston Chemical Co. at about 100° C. The about 10 wt % of the KFLC 3 included about 9.7 wt % of an achiral component and about 0.3 wt % of a chiral component.

Example 4

A liquid crystal display device was manufactured by the same procedure described in Example 1 except for the material of the liquid crystal layer.

The liquid crystal layer was manufactured by mixing about 90 wt % of MLC 6608 ($\Delta n=0.084$, $\Delta\varepsilon=-4.3$) of Merck Co. and about 10 wt % of KFLC 10 ($\Delta n=0.18$) of Kingston Chemical Co. at about 100° C. The about 10 wt % of the KFLC 10 included about 9.0 wt % of an achiral component and about 1.0 wt % of a chiral component.

Example 5

A liquid crystal display device was manufactured by the same procedure described in Example 1 except for the material of the liquid crystal layer.

The liquid crystal layer was manufactured by mixing about 85 wt % of MLC 6608 ($\Delta n=0.084$, $\Delta\varepsilon=-4.3$) of Merck Co. and about 15 wt % of KFLC 5 ($\Delta n=0.18$) of Kingston Chemical Co. at about 100° C. The about 15 wt % of the KFLC 5 included about 14.3 wt % of an achiral component and about 0.7 wt % of a chiral component.

Example 6

A liquid crystal display device was manufactured by the same procedure described in Example 1 except for the material of the liquid crystal layer.

The liquid crystal layer was manufactured by mixing about 80 wt % of MLC 6608 ($\Delta n=0.084$, $\Delta\varepsilon=-4.3$) of Merck Co. and about 20 wt % of KFLC 7 ($\Delta n=0.18$) of Kingston Chemical Co. at about 100° C. The about 20 wt % of the KFLC 7 included about 18.6 wt % of an achiral component and about 1.6 wt % of a chiral component.

Example 7

A liquid crystal display device was manufactured by the same procedure described in Example 1 except for the material of the liquid crystal layer.

The liquid crystal layer was manufactured by mixing about 70 wt % of MLC 6608 ($\Delta n=0.084$, $\Delta\varepsilon=-4.3$) of Merck Co. and about 30 wt % of KFLC 3 ($\Delta n=0.18$) of Kingston Chemical Co. at about 100° C. The about 30 wt % of the KFLC 3 included about 29.1 wt % of an achiral component and about 0.9 wt % of a chiral component.

The constituting components and the thickness of the liquid crystal layer in Comparative Example 1 and Examples 1 to 7 are illustrated in the following Table 1.

TABLE 1

|  | Nematic liquid crystal | Smectic liquid crystal | | Thickness of liquid crystal layer |
|---|---|---|---|---|
|  |  | Achiral component | Chiral component |  |
| Comparative Example 1 | 100 wt % | 0 | 0 | 4.5 μm |
| Example 1 | 97 wt % | 2.8 wt % | 0.2 wt % | 4.5 μm |
| Example 2 | 95 wt % | 4.5 wt % | 0.5 wt % | 4.5 μm |
| Example 3 | 90 wt % | 9.7 wt % | 0.3 wt % | 4.5 μm |
| Example 4 | 90 wt % | 9.0 wt % | 1.0 wt % | 4.5 μm |
| Example 5 | 85 wt % | 14.3 wt % | 0.7 wt % | 4.5 μm |
| Example 6 | 80 wt % | 18.6 wt % | 1.6 wt % | 4.5 μm |
| Example 7 | 70 wt % | 29.1 wt % | 0.9 wt % | 4.5 μm |

Evaluation of Transmittance

Figure 5:
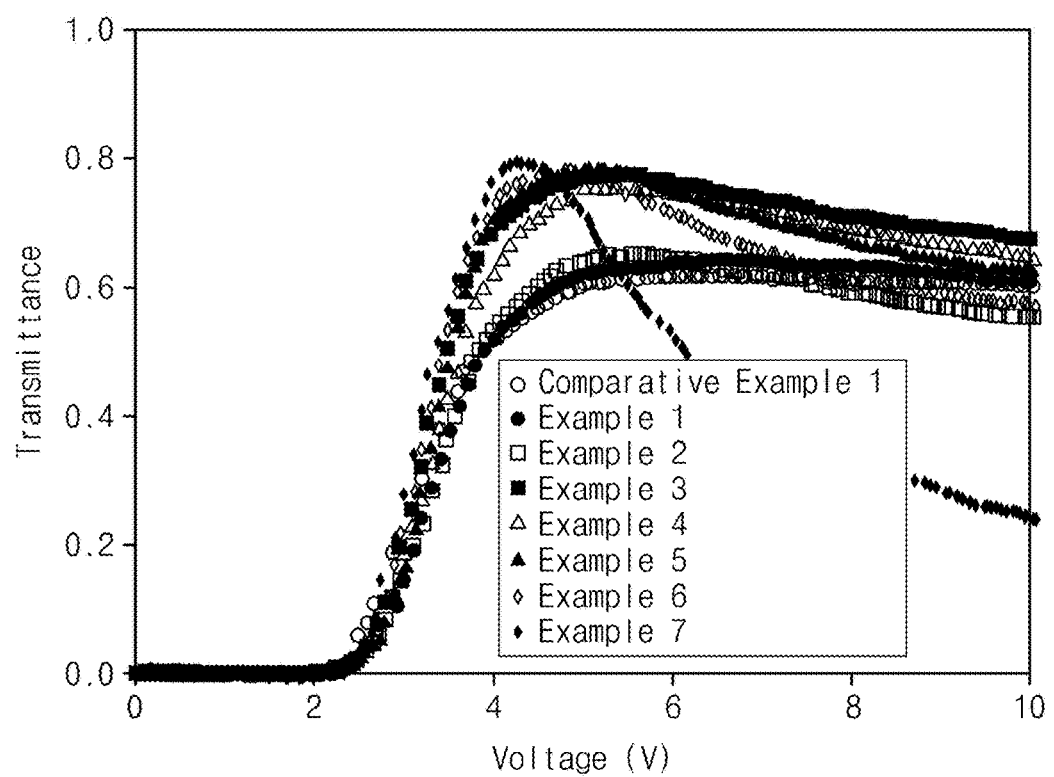
FIG. 5 is a graph for comparing the transmittance of the liquid crystal display devices of Comparative Example 1 and Examples 1 to 7.

FIG. 5 is a graph for comparing the transmittance of the liquid crystal display devices according to Comparative Example 1 and Examples 1 to 7. In FIG. 5, the graph illustrates transmittance according to an applied voltage. In FIG. 3, x-axis represents an applied voltage, and the unit thereof is [V], and y-axis represents transmittance.

Referring to FIG. 5, the transmittance of the liquid crystal display devices according to Examples 1 to 7 is good in general when compared to that of a liquid crystal display device according to Comparative Example 1. In more detail, the transmittance of the liquid crystal display devices of Examples 1 and 2 is increased very slightly when compared to that of Comparative Example 1. In addition, the transmittance of the liquid crystal display devices of Examples 3 to 7 is about 0.8 and is excellent when compared to that of the liquid crystal display device of Comparative Example 1.

Through the above evaluation, the achiral smectic liquid crystal in the liquid crystal layers of Examples 1 to 7 is expected to induce the alignment of the liquid crystal molecules uniformly and stably. Thus, the transmittance of the liquid crystal display devices of Examples 1 to 7 is better than that of the liquid crystal display device of Comparative Example 1.

Figure 6A:
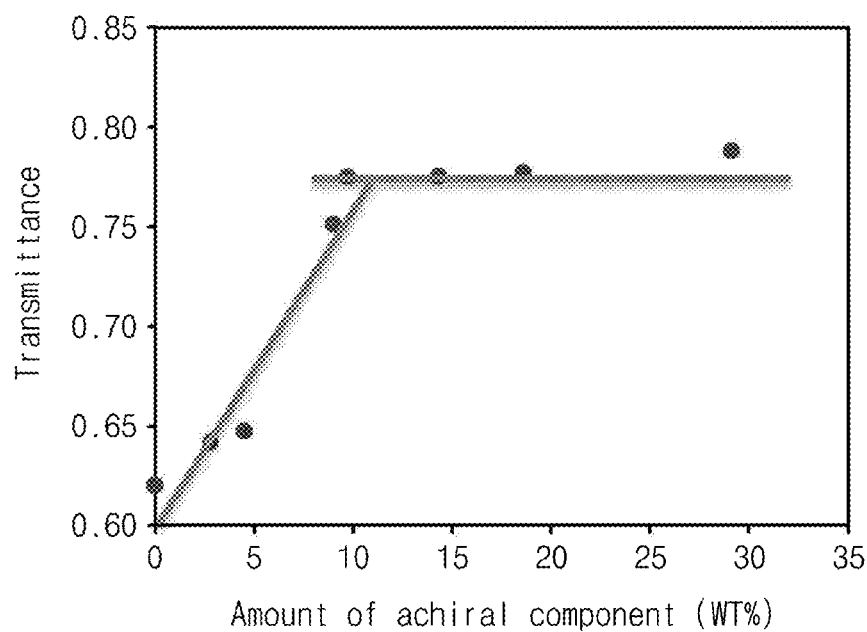
FIG. 6A is a graph illustrating the transmittance of the liquid crystal display device of Comparative Example 1 and the transmittance of the liquid crystal display devices of Examples 1 to 7 according to the amount of an achiral component in a liquid crystal layer.
Figure 6B:
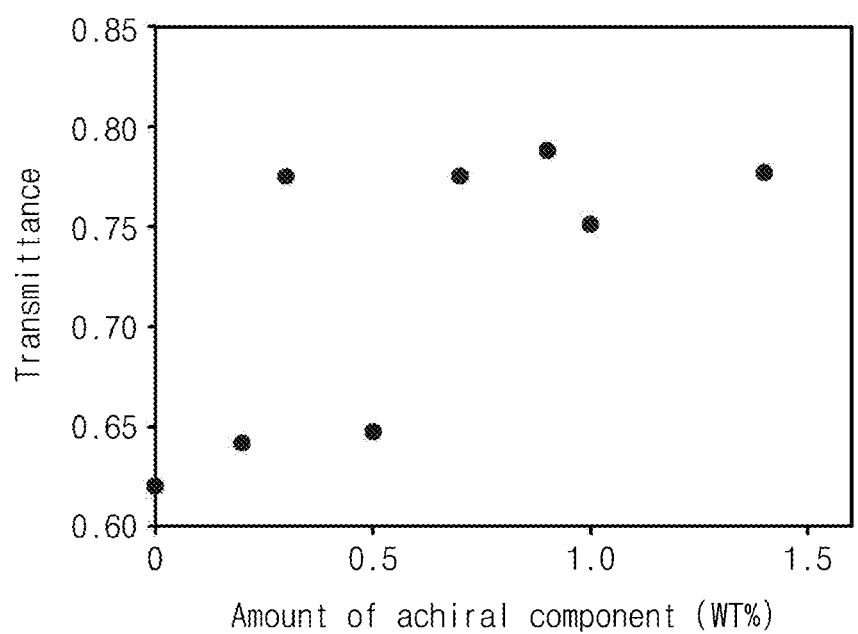
FIG. 6B is a graph illustrating the transmittance of the liquid crystal display device of Comparative Example 1 and the transmittance of the liquid crystal display devices of Examples 1 to 7 according to the amount of a chiral component in a liquid crystal layer.

FIG. 6A is a graph illustrating the transmittance of the liquid crystal display devices of Examples 1 to 7 and the transmittance of the liquid crystal display device of Comparative Example 1 according to the amount of an achiral component in a liquid crystal layer, and FIG. 6B is a graph illustrating the transmittance of the liquid crystal display devices of Examples 1 to 7 and the transmittance of the liquid crystal display device of Comparative Example 1 according to the amount of a chiral component in a liquid crystal layer. In FIGS. 6A and 6B, x-axes represent the amounts of the achiral component and the chiral component, and the unit thereof is [wt %], and y-axes represent transmittance.

Referring to FIG. 6A, as the amount of the achiral component in the liquid crystal layer increases, the transmittance of the liquid crystal display devices increases. In more detail, the transmittance of the liquid crystal display device of Comparative Example 1 without the achiral component exhibits the transmittance of about 0.67, however the transmittance of the liquid crystal display devices increases as the amount of the achiral component in the liquid crystal layer increases. In addition, when the amount of the achiral component in the liquid crystal layer is greater than or equal to about 9.7 wt %, the transmittance increases to about 0.8.

Referring to FIG. 6B, as the amount of the chiral component in the liquid crystal layer increases, the transmittance of the liquid crystal display devices increases in general. In more detail, the transmittance of the liquid crystal display device of Comparative Example 1 without the chiral component exhibits the transmittance of about 0.67, however the transmittance of the liquid crystal display devices increases as the amount of the achiral component in the liquid crystal layer increases. In addition, when the amount of the chiral component in the liquid crystal layer is greater than or equal to about 0.9 wt %, the transmittance increases to about 0.8.

Evaluation of Response Time

Figure 7:
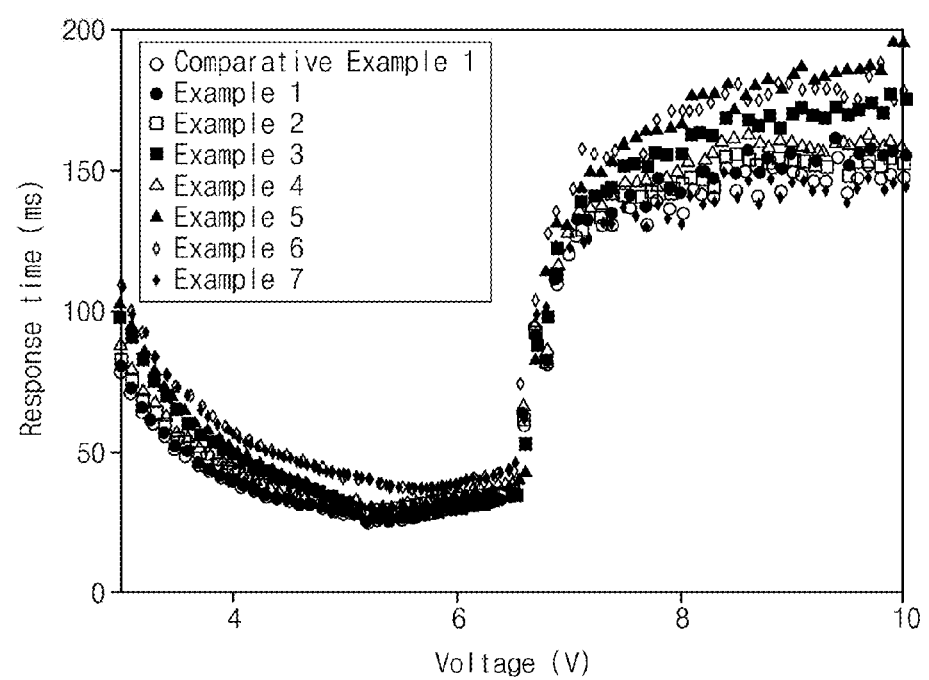
FIG. 7 is a graph for comparing the response time of the liquid crystal display devices of Comparative Example 1 and Examples 1 to 7.

FIG. 7 is a graph for comparing the response time of the liquid crystal display devices of Comparative Example 1 and Examples 1 to 7. FIG. 7 is a graph illustrating response time according to an applied voltage. In FIG. 7, x-axis represents an applied voltage, and the unit thereof is [V], and y-axis represents response time, and the unit thereof if [ms].

Referring to FIG. 7, the response time of the liquid crystal display devices of Examples 1 to 7 is increased to a certain degree when compared to that of the liquid crystal display device of Comparative Example 1. Meanwhile, in FIG. 7, the response time of the liquid crystal display device including a liquid crystal layer containing about 29.1 wt % of the achiral component is substantially similar to that of Comparative Example 1. The response time increased to a certain degree is expected to decrease by changing the amount or the kind of the nematic liquid crystal. In addition, the increased response time is expected to decrease by additionally adding a reactive mesogen material in the liquid crystal layer.

Figure 8:
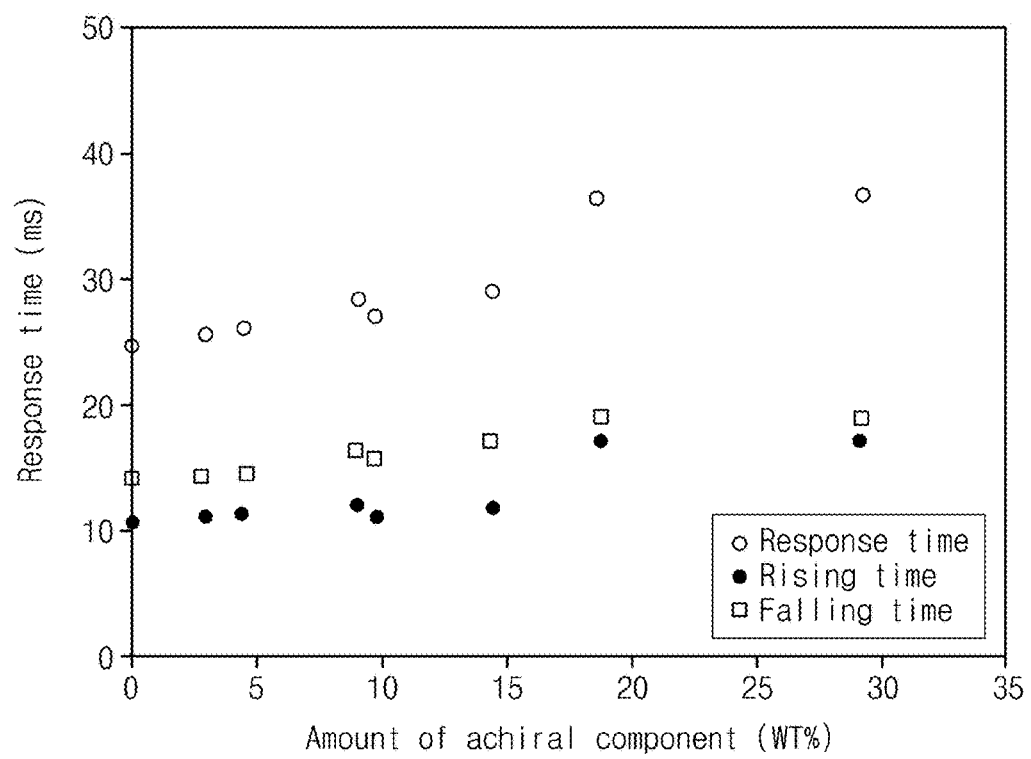
FIG. 8 is a graph illustrating the rising time and the falling time of the liquid crystal display device of Comparative Example 1 and the rising time and the falling time of the liquid crystal display devices of Examples 1 to 7 according to the amount of an achiral component.

FIG. 8 is a graph illustrating the rising time and the falling time of the liquid crystal display device of Comparative Example 1 and the rising time and the falling time of the liquid crystal display devices of Examples 1 to 7 according to the amount of an achiral component. In FIG. 8, x-axis represents the amount of an achiral component, and the unit thereof is [wt %], and y-axis represents time, and the unit thereof is [ms].

When target transmittance of a liquid crystal display device is set to 100%, it takes time to exhibit the transmittance of 100% when the liquid crystal display device is turned on. The rising time means the time necessary for exhibiting the transmittance from about 10% to about 90% after turning on the liquid crystal display device. On the contrary, it takes time to exhibit the transmittance of 0% when the liquid crystal display device is turned off. The falling time means the time necessary for exhibiting the transmittance from about 90% to about 10% after turning off the liquid crystal display device. The response time is the sum of the rising time and the falling time.

The rising time is about 10 ms, the falling time is about 14 ms and the response time is about 14 ms for the liquid crystal display device of Comparative Example 1. Referring to the data of Examples 1 to 7, as the amount of the achiral component increases, the rising time and the falling time increase, and so, the response time increases to a certain degree.

Figure 9A:
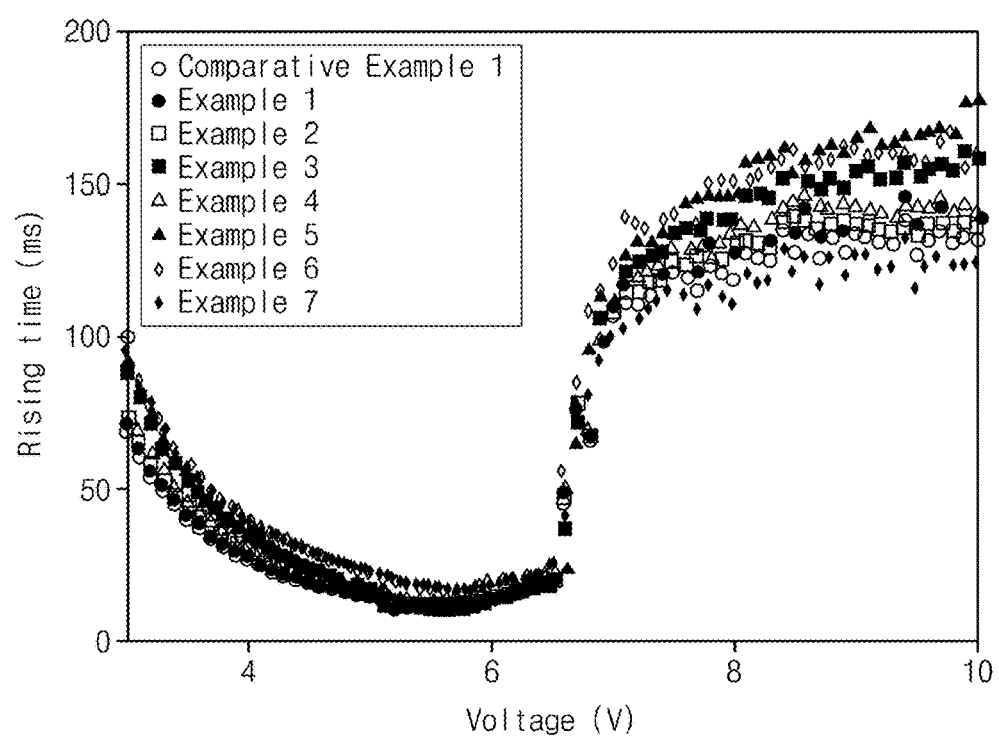
FIG. 9A is a graph illustrating the rising time of the liquid crystal display devices of Comparative Example 1 and Examples 1 to 7.
Figure 9B:
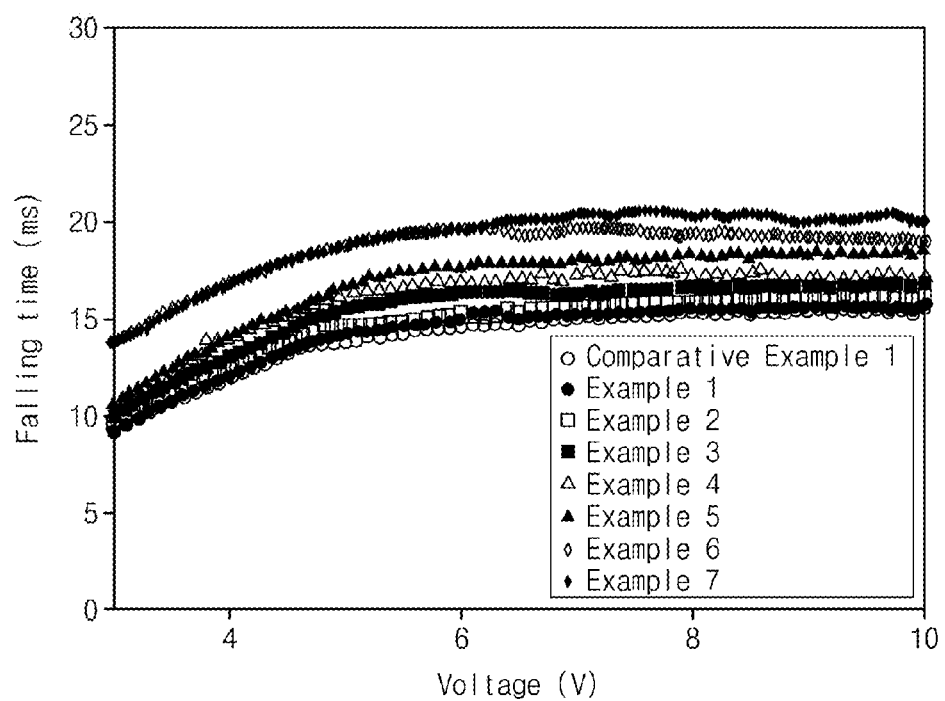
FIG. 9B is a graph illustrating the falling time of the liquid crystal display devices of Comparative Example 1 and Examples 1 to 7.

FIG. 9A is a graph illustrating the rising time of the liquid crystal display devices of Comparative Example 1 and Examples 1 to 7, and FIG. 9B is a graph illustrating the falling time of the liquid crystal display devices of Comparative Example 1 and Examples 1 to 7. FIGS. 9A and 9B are graphs illustrating the rising time and the falling time according to an applied voltage. In FIGS. 9A and 9B, x-axes represent an applied voltage, and the unit thereof is [V], and y-axes represent time, and the unit thereof is [ms].

The results of FIGS. 9A and 9B are similar to those explained in FIGS. 7 and 8. That is, the rising time and the falling time of Examples 1 to 7 are increased to a certain degree when compared to those of Comparative Example 1. The increased rising time and the falling time may be lowered by additionally adding a reactive mesogen material in the liquid crystal layer.

Evaluation of Textures

FIGS. 10A to 10H and FIGS. 11A to 11H are the textures of the liquid crystal display devices of Comparative Example 1 and Examples 1 to 7.

In the liquid crystal display devices, a voltage of about 7 V was applied, and a cross polarization plate was rotated to obtain white images and black images in FIGS. 10A to 10H and FIGS. 11A to 11H.

The textures of FIGS. 10A to 10H are white images under the cross polarization plate. In more detail, the white images are obtained when the angle between the cross polarization plate and the liquid crystal molecules of the liquid crystal layer is about 45°, and bright images are shown via the penetration of lights through the liquid crystal layer. This may be confirmed in the following Mathematical Formula 1.

$$T = \frac{1}{2}\sin^2(2\varphi)\sin^2\left(\frac{\pi\Delta n \cdot d}{\lambda}\right) \qquad \text{Mathematical Formula 1}$$

In the above Mathematical Formula 1, T is transmittance, $\varphi$ is an angle formed by a polarization plate and liquid crystal molecules, $\Delta n$ is a birefringence value, d is the thickness of a liquid crystal layer, and $\lambda$, is the wavelength of exposing lights. In Mathematical Formula 1, when $\varphi$ is 45°, a $\sin^2$ value is the maximum value, and the transmittance is the highest.

FIGS. 10A to 10H are textures of Comparative Example 1 and Examples 1 to 7. Referring to FIG. 8A, defects appearing black are shown at the edge portions of the slit or at the border of the slits. Referring to FIGS. 10A to 10H, the defects appearing black are removed at the border of the slits as well as at the edge portions of the slit.

The textures in FIGS. 11A to 11H, black images under the cross polarization plate are illustrated. In more detail, the black images are obtained when the angle between the cross polarization plate and the liquid crystal molecules of the liquid crystal layer is about 0°, and black images are shown because a rotated upper polarization plate has perpendicular polarization with respect to polarized lights penetrated through the liquid crystal layer. In the above Mathematical Formula 1, when $\varphi$ is 0°, a $\sin^2$ value is 0, and the transmittance becomes 0.

Figure 10A:
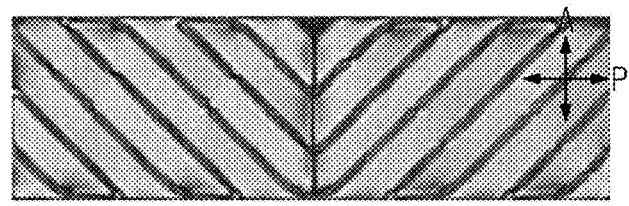
FIGS. 10A and 10H are white textures of the liquid crystal display devices of Comparative Example 1 and Examples 1 to 7.
Figure 11A:
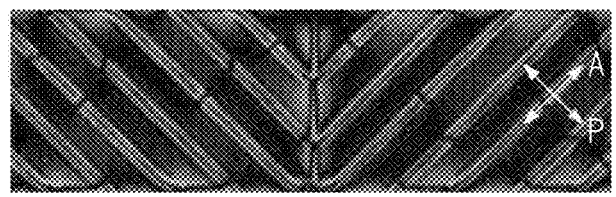
FIGS. 11A to 11H are black textures of the liquid crystal display devices of Comparative Example 1 and Examples 1 to 7.
Figure 11B:
Figure 11C:
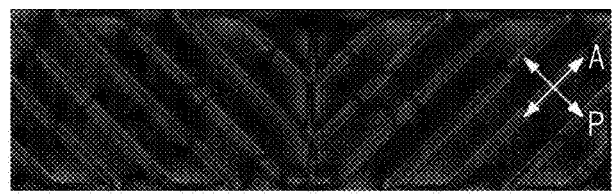
Figure 11D:
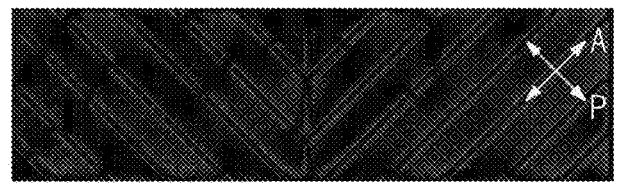
Figure 11E:
Figure 11F:
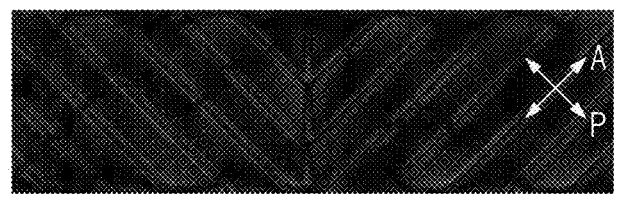
Figure 11G:
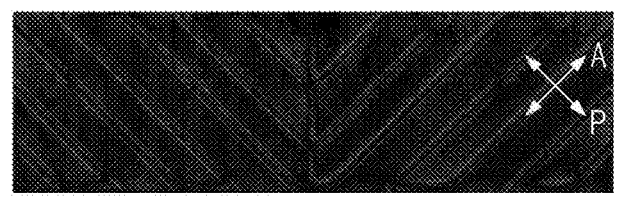
Figure 11H:
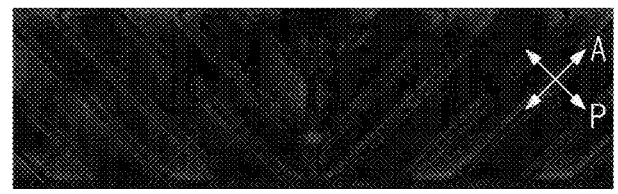

FIGS. 11A to 11H are textures of Comparative Example 1 and Examples 1 to 7. Referring to FIG. 11A, light leakage phenomena are shown at the edge portions of the slit or at the border of the slits. Referring to FIGS. 11A to 11H, the light leakage phenomena are mostly removed at the border of the slits as well as at the edge portions of the slit when compared to those in FIG. 10A.

When inspecting the textures, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 10B:
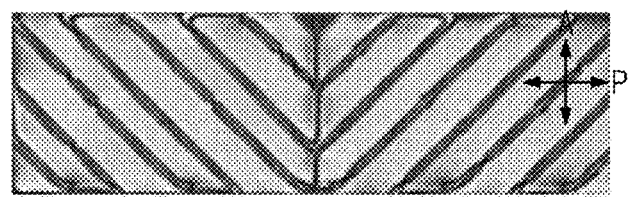
Figure 10C:
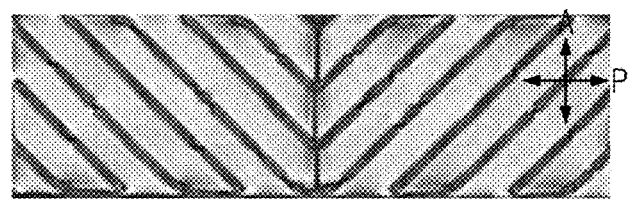
Figure 10D:
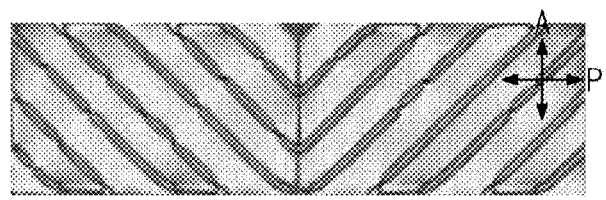
Figure 10E:
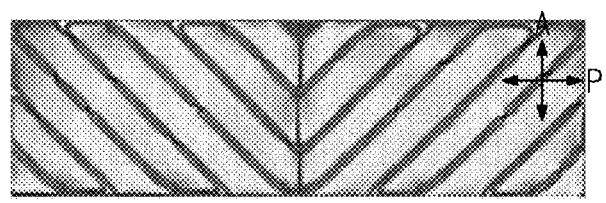
Figure 10F:
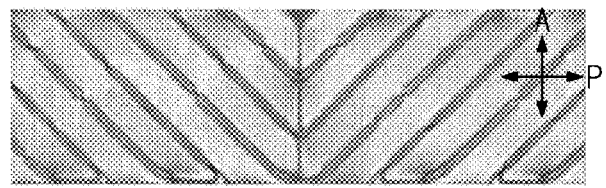
Figure 10G:
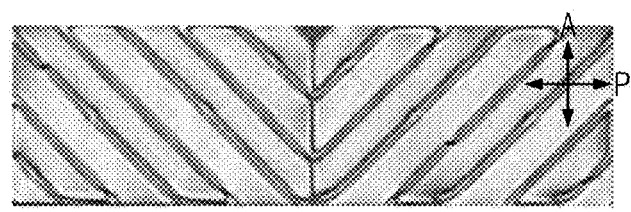
Figure 10H:
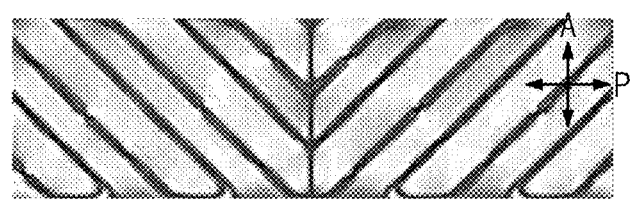
Figure 12A:
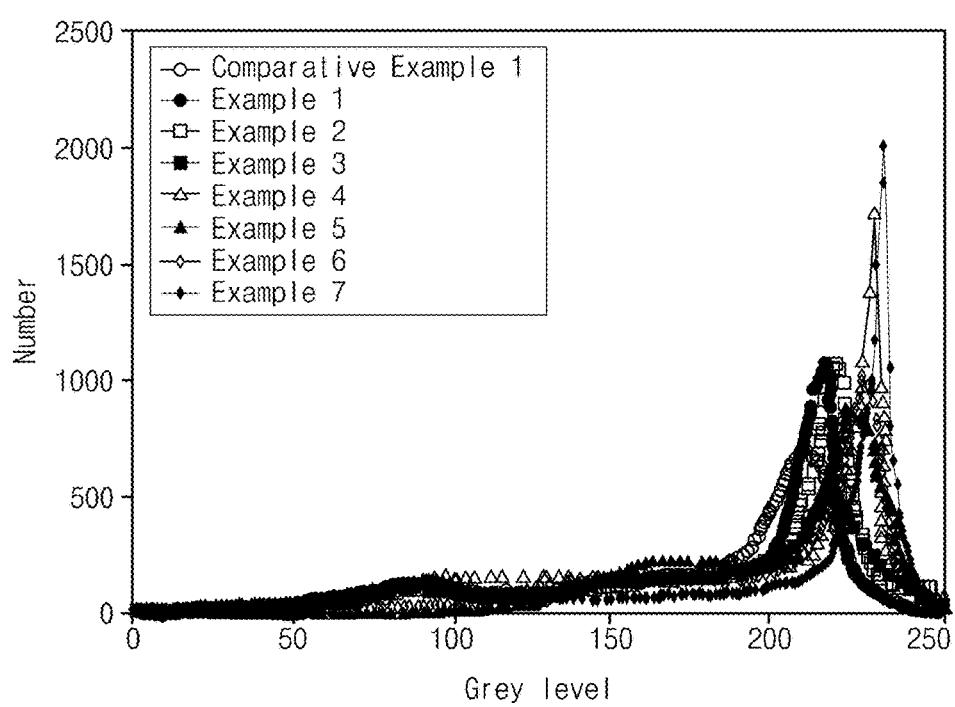
FIGS. 12A and 12B are graphs illustrating the grey level of the textures of Comparative Example 1 and Examples 1 to 7.
Figure 12B:
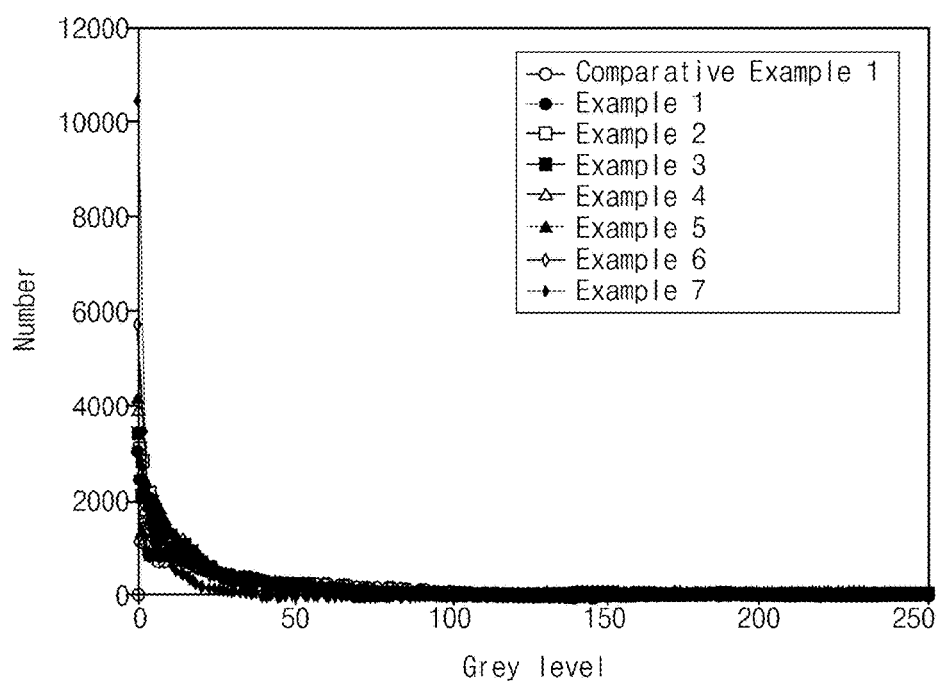

FIGS. 12A and 12B are graphs illustrating grey levels of the textures of Comparative Example 1 and Examples 1 to 7. FIGS. 10A and 10B are evaluated by 256 ($2^8$) grey levels. As the grey level approaches to 0, grey closes to black, and the concentration of the grey is represented by the levels from 0 to 255.

FIG. 12A illustrates the grey level of the textures in FIGS. 10A to 10H, and the white images are found at the grey level of about 255. The white image of Comparative Example 1 in FIG. 10A is found a lot from about 200 to about 230 of the grey level, and the peak width thereof is found wide. The white images of Examples 1 to 7 in FIGS. 10B to 10H are found a lot from about 235 to about 250 of the grey level, and the peak width thereof is found narrow when compared to that of Comparative Example 1. In addition, the white images are found at the grey level of about 250, and the peak width becomes narrow from Example 1 to Example 7.

FIG. 12B represents the grey levels of the textures in FIGS. 11A to 11H, and the black images are found around 0 of the grey level. The black image of Comparative Example 1 in FIG. 11A is found a lot at from about 30 to about 50 of the grey level, and the peak width thereof is found wide. The black images of Examples 1 to 7 in FIGS. 11B to 11H are found a lot from about 0 to about 25 of the grey level, and the peak width thereof is found narrow when compared to that of Comparative Example 1. In addition, the black images are found at the grey level of about 0, and the peak width becomes narrow from Example 1 to Example 7.

When inspecting the graphs in FIGS. 12A and 12B, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 13A:
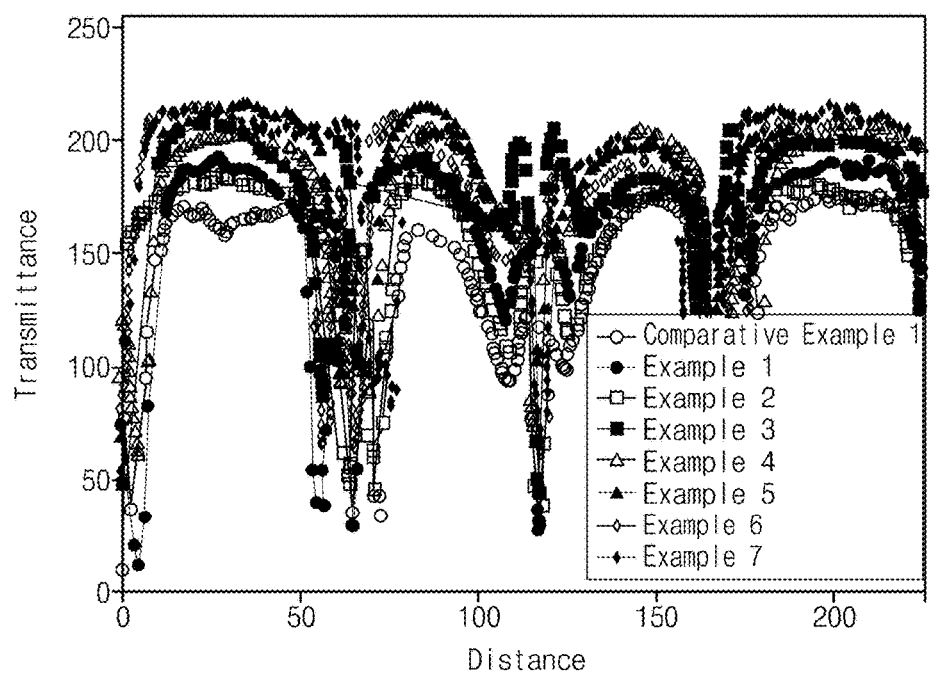
FIGS. 13A and 13B are graphs illustrating the transmittance of Comparative Example 1 and Examples 1 to 7 according to the distance of the textures.
Figure 13B:
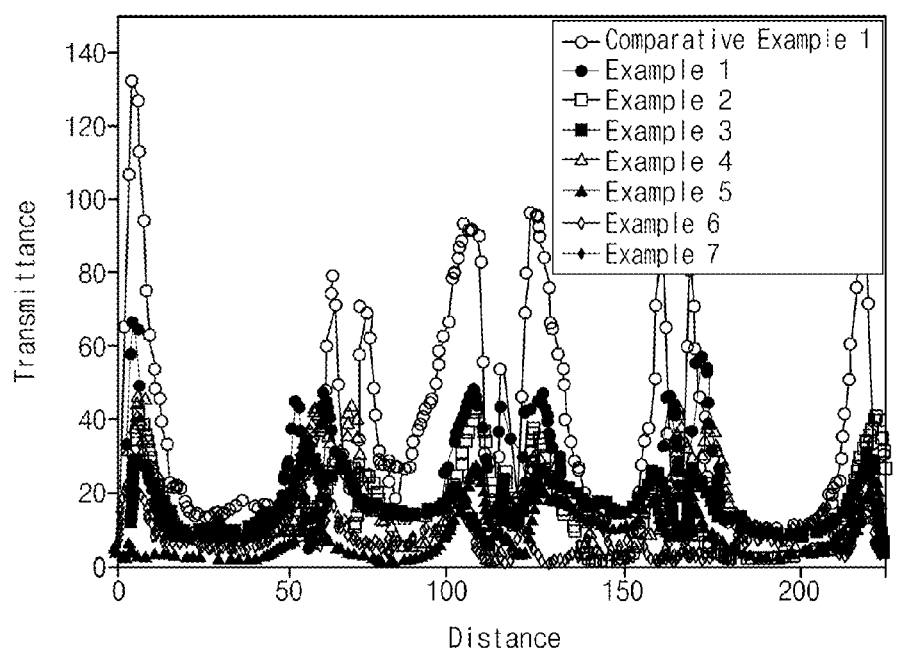

FIGS. 13A and 13B are graphs illustrating the transmittance of Comparative Example 1 and Examples 1 to 7 according to the distance of the textures. FIGS. 13A and 13B are graphs obtained by evaluating the transmittance change according to the distance of the slit after cutting the textures in one direction.

FIG. 13A illustrates the grey level change according to the distance of the slit after cutting the textures of FIGS. 10A to 10H in one direction. Referring to FIG. 13A, the transmittance around the slit is from about 20 to about 100, and the portions around the slit are found darker than the portions other than the slit. The transmittance of the textures of Examples 1 to 7 is found higher than that of Comparative Example 1 around the slits.

FIG. 13B illustrates the grey level change according to the distance of the slit after cutting the textures of FIGS. 11A to 11H in one direction. Referring to FIG. 13B, the transmittance around the slit is from about 80 to about 140, and light leakage defects are found around the slit of Comparative Example 1. The transmittance around the slits of Examples 1 to 7 is from about 20 to about 60, and the light leakage defects are found to be solved to a certain degree.

[[Liquid Crystal Display Device in PVA Mode]]

Figure 14A:
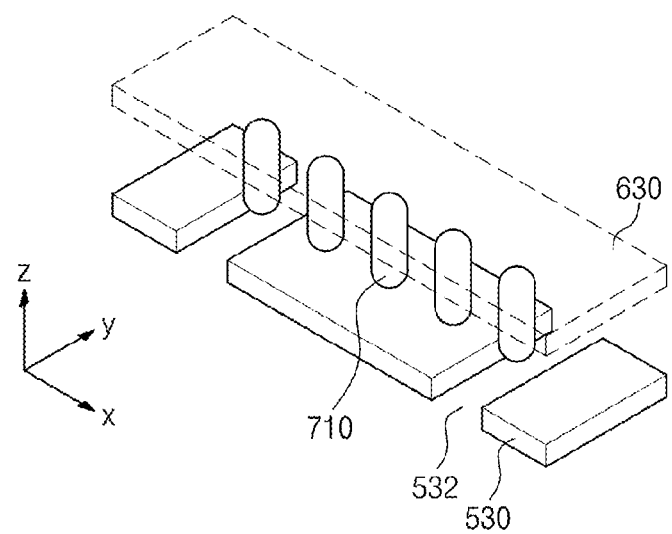
FIGS. 14A, 15A and 16A are perspective views for explaining a liquid crystal display device according to an embodiment of the present invention.
Figure 14B:
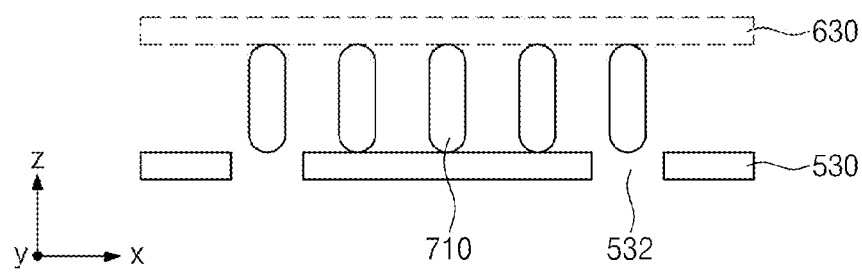
FIGS. 14B, 15B and 16B are cross-sectional views for explaining a liquid crystal display device according to an embodiment of the present invention.
Figure 14C:
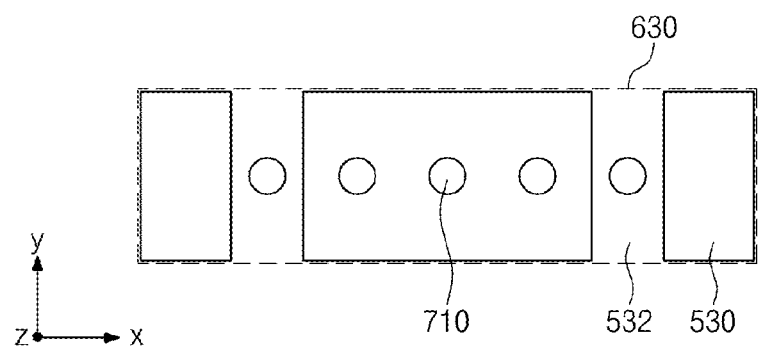
FIGS. 14C, 15C and 16C are plan views for explaining a liquid crystal display device according to an embodiment of the present invention.
Figure 15A:
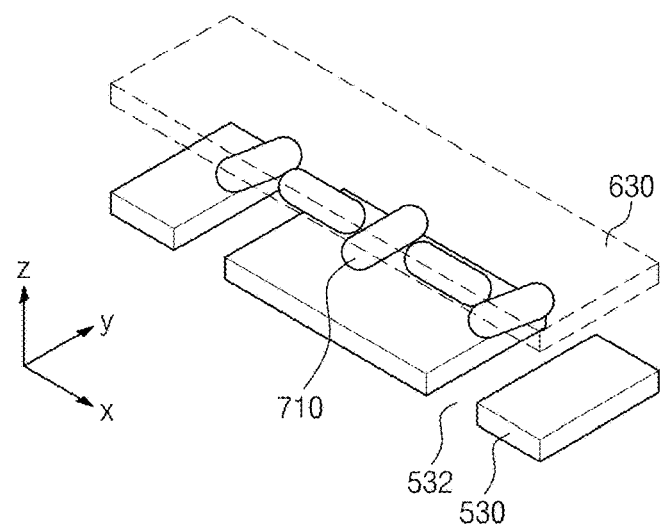
Figure 15B:
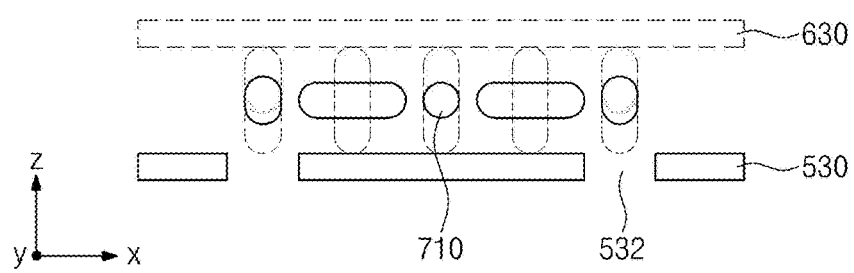
Figure 15C:
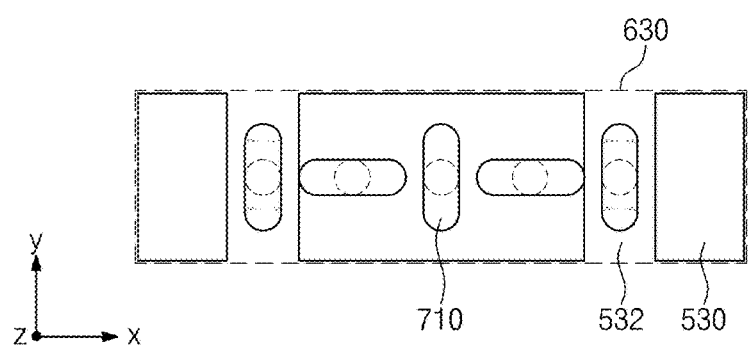
Figure 16A:
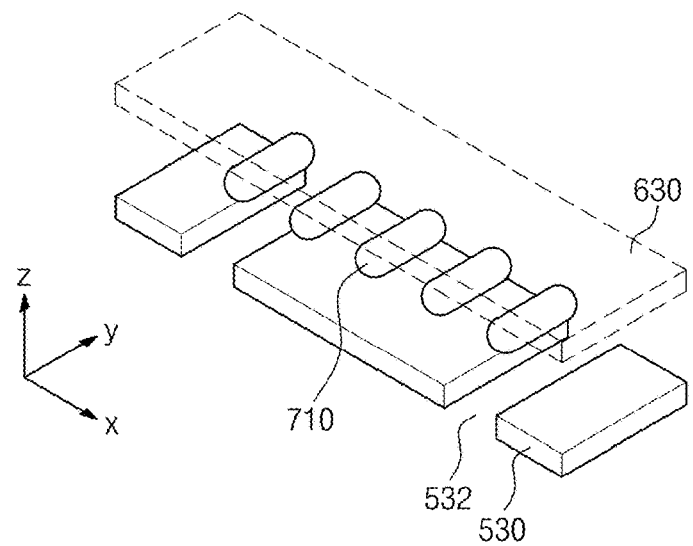
Figure 16B:
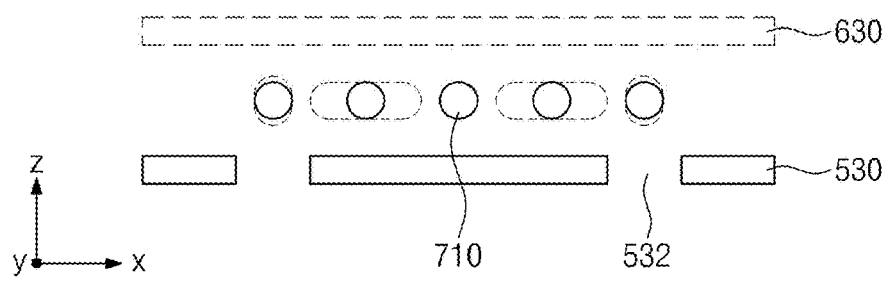
Figure 16C:
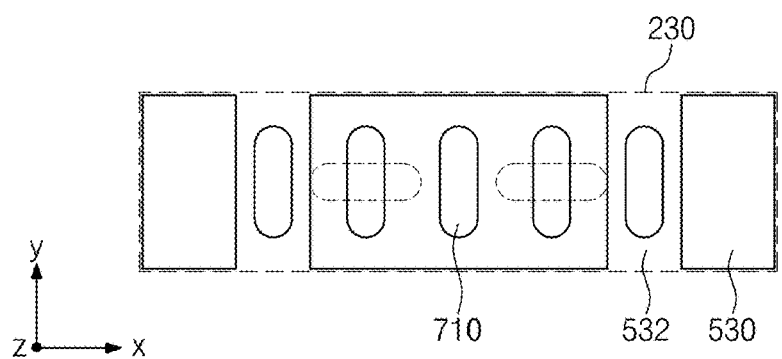

FIGS. 14A, 15A and 16A are perspective views for explaining a liquid crystal display device according to an embodiment of the present invention, FIGS. 14B, 15B and 16B are cross-sectional views for explaining a liquid crystal display device according to an embodiment of the present invention, and FIGS. 14C, 15C and 16C are plan views for explaining a liquid crystal display device according to an embodiment of the present invention.

FIGS. 14A to 14C are obtained when no potential difference is between the first and second electrodes of the liquid crystal display device. FIGS. 15A to 15C and FIGS. 16A to 16C are obtained when potential difference is present between the first and second electrodes of the liquid crystal display device.

Referring to FIGS. 14A to 16C, the liquid crystal display device may include a first electrode 530, a second electrode 630 separated from and opposing the first electrode 530, and a liquid crystal layer 700 filling up a space between the first and second electrodes 530 and 630.

The first electrode 530 and the second electrode 630 may be extended in an x-axis direction. According to an embodiment of the present invention, a slit 532 may be formed in the first electrode 530. The slit 532 formed in the first electrode 530 may be extended in a y-axis direction. The width of the slit 532 may be a few μm. In this embodiment, the first electrode and the second electrode 630 illustrated in FIGS. 14A to 16C are explained as an illustration, and the structures of the first and second electrodes 530 and 630 are not limited thereto in the present invention.

The liquid crystal layer 700 may include a plurality of liquid crystal molecules 710. Referring to FIG. 14A, the plurality of liquid crystal molecules 710 may be aligned in a first alignment direction that is perpendicular to the surface of the first or second electrode 530 or 630 when no potential difference is present between the first and second electrodes 530 and 630. For example, the first alignment direction may be substantially in parallel to a z-axis direction.

When the potential difference is generated between the first and second electrodes 530 and 630, the alignment of the liquid crystal molecules 710 may be changed to a second alignment direction that is substantially in parallel to the extended direction of the first or second electrode 530 or 630. For example, the second alignment direction may be substantially in parallel to the extended direction of the slit 532. As described above, the slit 532 is extended in the y-axis direction, and the second alignment direction may be substantially in parallel to the y-axis direction.

According to an embodiment of the present invention, when potential difference is generated between the first and second electrodes 530 and 630, the alignment direction of the liquid crystal molecules 710 may be changed in at least two steps, and finally the liquid crystal molecules may be aligned in the second direction. For example, the operation of changing the alignment directions of the liquid crystal molecules 710 may include a first alignment step and a second alignment step in order. The alignment direction of the liquid crystal molecules 710 of the liquid crystal layer 700 is not changed to a target direction immediately because the intensity or the shape of electric field generated between the first and second electrodes 530 and 630 is different in accordance with the structures of the first and second electrodes 530 and 630.

Hereinafter, the first alignment step and the second alignment step for changing the liquid crystal molecules 710 one by one by generating the potential difference between the first and second electrodes 530 and 630 will be explained in detail.

Referring to FIGS. 15A to 15C, the first alignment step (as soon as the potential difference is generated between the first and second electrodes) may be a procedure of changing the liquid crystal molecules 710 aligned in the first alignment direction into a third alignment direction. The third alignment direction may include directions different from the first or second alignment directions. The third alignment direction of the liquid crystal molecules 710 may have various alignment directions according to the structures of the first and second electrodes 530 and 630 and the disposed position of the liquid crystal molecules 710 between the first and second electrodes 530 and 630.

The change of the alignment direction of the liquid crystal molecules 710 in the first alignment step in accordance with the position between the first and second electrodes 530 and 630 will be explained in more detail for illustration. When potential difference is generated between the first and second electrodes 530 and 630, relatively strong electric field may be formed at a center portion (the farthest portion from the slits) between a pair of adjacent slits 532 between the first electrode 530 and the second electrode 630 in a perpendicular direction of the surface of the first or the second electrode 530 or 630. In addition, at the portion where the slit 532 is formed between the first electrode 530 and the second electrode 630, relatively weak electric field may be formed obliquely.

The liquid crystal molecules 710 disposed at the first electrode 530 at the center portion between a pair of adjacent slits 532, where relatively strong electric field is generated may be changed from the first alignment direction to the third alignment direction, and the third alignment direction may be an optional direction and may not be easily anticipated. The liquid crystal molecules 710 disposed at the first electrode 530 having the slits 532, where relatively weak electric field is generated may be changed from the first alignment direction to the third alignment direction, and the third alignment direction may be a perpendicular direction to the electric field. According to an embodiment, the alignment direction of the liquid crystal molecules disposed at one slit of the pair of slits 532 and the alignment direction of the liquid crystal molecules disposed at other one slit may be different from each other. For example, the alignment directions may face to each other.

Referring to FIGS. 16A to 16C, the second alignment step (after a certain time from the generation of the potential difference between the first and second electrodes) may be a procedure of changing the liquid crystal molecules 710 aligned in the third alignment direction to the second alignment direction. In more detail, the liquid crystal molecules 710 at the center portion of a pair of the adjacent slits 532 formed in the first electrode 530 may change to a final alignment direction that offsets different alignment directions of adjacent liquid crystal molecules 710. In this embodiment, the final alignment direction may be the second alignment direction substantially in parallel to the direction of the slit 532. When the alignment direction of the liquid crystal molecules 710 at the center portion of the pair of the slits 532 is changed to the second alignment direction, the alignment direction of unstably disposed adjacent liquid crystal molecules 710 may be changed to substantially the same alignment direction as the alignment direction of the liquid crystal molecules 530 at the center portion of the pair of the slits 532. Thus, the alignment direction of the liquid crystal molecules 710 between the first and second electrodes 530 and 630 may be changed to the target second alignment direction.

According to an embodiment of the present invention, the liquid crystal display device may include a plurality of pixels. Each pixel may include multi domains. The formation of the multi domains in one pixel may be determined by the structures of the first and second electrodes 530 and 630.

The structures of the first and second electrodes 530 and 630 of the present invention may be diverse, and the structures of the first and second electrodes 530 and 630 may not be limited in the present invention only if the alignment direction of the liquid crystal molecules 710 may be changed subsequently by the first and second alignment steps as described above when potential difference is generated between the first and second electrodes 530 and 630.

According to an embodiment, the liquid crystal layer 700 may include a nematic liquid crystal and an achiral smectic liquid crystal. According to another embodiment, the liquid crystal layer 700 may include a nematic liquid crystal and a smectic liquid crystal. The detailed explanation of the liquid crystal layer 700 is substantially the same as that of the liquid crystal layer in the PVA mode, and detailed description thereof will be omitted.

Because of the nematic liquid crystal and the smectic liquid crystal of the liquid crystal layer 700, the liquid crystal molecules 710 may have uniform and stable alignment. Thus, the luminance of a liquid crystal display device including the liquid crystal layer 700 may be improved. Experimental evaluation thereon will be explained in detail through the following experimental examples.

According to an embodiment of the present invention, the liquid crystal layer 700 may include a reactive mesogen material. The alignment direction of the liquid crystal molecules 710 may be changed from the first alignment direction to the second alignment direction when potential difference is generated between the first and second electrodes 530 and 630 due to the reactive mesogen material in the liquid crystal layer 700. That is, the alignment direction of the liquid crystal molecules 710 may be changed from the first alignment direction to the second alignment direction without being changed from the first alignment direction to the third alignment direction, thereby improving the response time of the liquid crystal display device.

According to another embodiment of the present invention, the liquid crystal display device may further include alignment layers 540 and 640 (see FIGS. 17A and 17B) in at least one between the liquid crystal layer 700 and the first electrode 530 and between the liquid crystal layer 700 and the second electrode 630. The alignment layers 540 and 640 may include a reactive mesogen material. The alignment direction of the liquid crystal molecules 710 may be changed from the first alignment direction to the second alignment direction when potential difference is generated between the first and second electrodes 530 and 630 due to the reactive mesogen material in the alignment layers 540 and 640. That is, the alignment direction of the liquid crystal molecules 710 may be changed from the first alignment direction to the second alignment direction without being changed from the first alignment direction to the third alignment direction, thereby improving the response time of the liquid crystal display device.

Figure 17A:
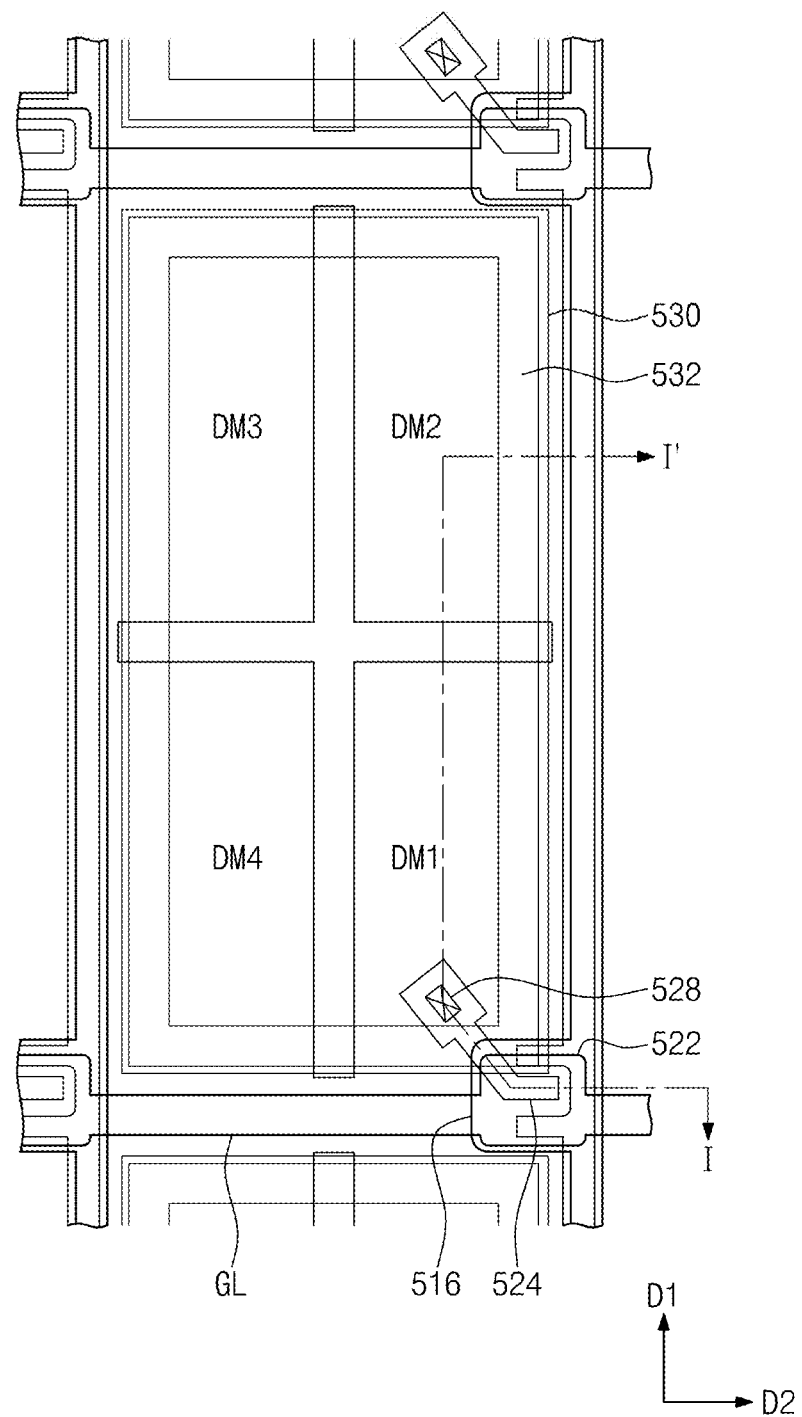
FIGS. 17A and 17B are a plan view and a cross-sectional view for explaining a liquid crystal display device according to an embodiment of the present invention.
Figure 17B:
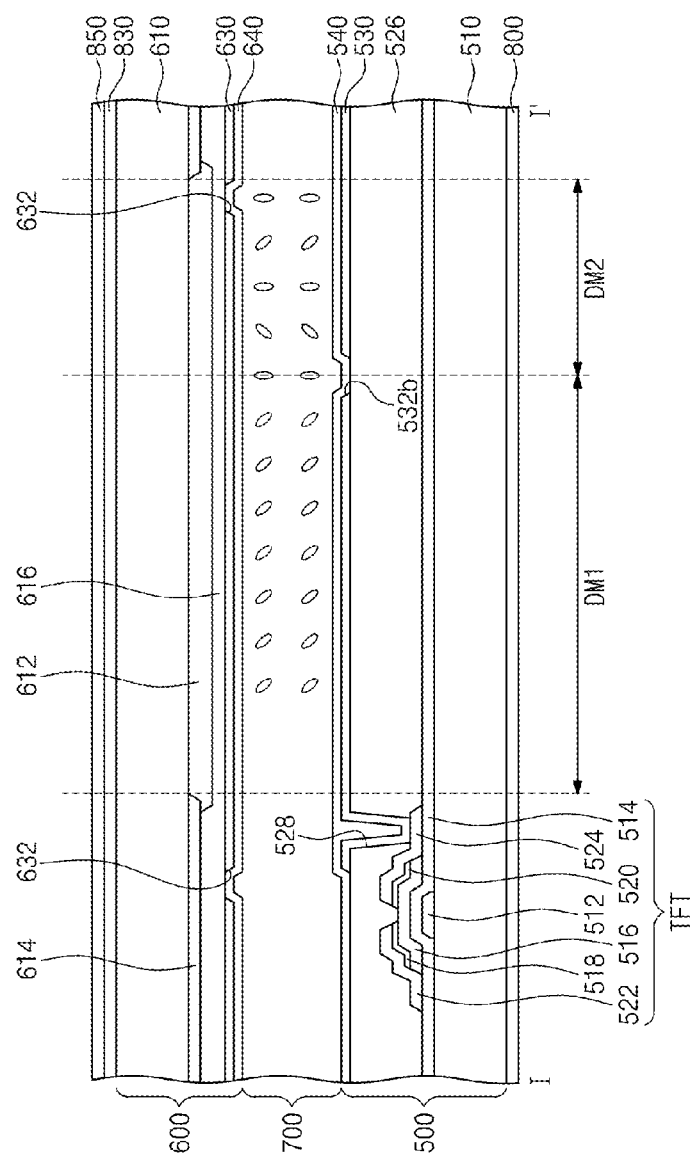

FIGS. 17A and 17B are a plan view and a cross-sectional view for explaining a liquid crystal display device according to an embodiment of the present invention. FIG. 17B is a cross-sectional view taken along line I-I' in FIG. 17A.

Referring to FIGS. 17A and 17B, a liquid crystal display device may include a first display plate 500, a second display plate 600 separated from and opposing the first display plate 500, and a liquid crystal layer 700 disposed between the first and second display plates 500 and 600. In addition, the liquid crystal display device may further include a first polarization plate 800 and a second polarization plate 850 having a transmission axis perpendicular to the transmission axis of the first polarization plate 800.

The first display plate 500 may include a first substrate 510, a thin film transistor TFT and a first electrode 530. The first substrate 510 may include a transparent insulating material such as glass.

The thin film transistor TFT may be disposed at one side of the first substrate 510. The thin film transistor TFT may include a gate electrode 512, a gate insulating layer 514, a semiconductor 516, a source electrode 522 and a drain electrode 524 stacked subsequently. The gate electrode 512 may include a single layer or a multi layer of a metal or a metal alloy, and the gate insulating layer 514 may include silicon oxide, silicon nitride or silicon oxynitride. The intrinsic semiconductor 516 may include amorphous silicon. The source electrode 522 and the drain electrode 524 may be disposed separately while facing to each other on the intrinsic semiconductor 516. In the intrinsic semiconductor 516 between the source electrode 522 and the drain electrode 524, a channel of the thin film transistor TFT may be formed. The source electrode 522 may be electrically connected with a data line DL and may receive a data voltage from the data line DL. The drain electrode 524 may make electrical connection with the first electrode 530.

According to an aspect, the thin film transistor TFT may further include resistive contact members 518 and 520 disposed between the intrinsic semiconductor 516 and the source and drain electrodes 522 and 524. The resistive contact members 518 and 520 may include silicide or n+ hydrogenated amorphous silicon heavily doped with n-type impurities.

On the thin film transistor TFT, a first insulation layer 526 having a contact hole 528 may be formed. The first insulation layer 526 may include inorganic insulation material such as silicon oxide, silicon nitride, silicon oxynitride, etc. or an organic insulation material such as a resin, etc. The contact hole 528 may expose the top surface of the drain electrode 524.

On the first insulation layer 526, a first electrode 530 may be formed. The first electrode 530 may be a pixel electrode. The first electrode 530 may be electrically connected with the drain electrode by the contact hole. The first electrode 530 may be applied with a data voltage from the drain electrode. The first electrode 530 may include a transparent conductive material such as ITO and IZO.

According to an embodiment of the present invention, the first electrode 530 may include a domain division element, for example, a first slit 532. The first slit 532 of the first electrode 530 corresponds to a removed part of the first electrode 530. When a voltage is applied between the first electrode 530 and the second electrode 630, an electric field is generated between the first and second electrodes 530 and 630, and the electric field may not be formed in a vertical direction with respect to the surface of the first substrate 510 but may be formed in a slanted direction having both a vertical component and a horizontal component due to the first slit 532 of the first electrode 530. According to another embodiment of the present invention, the domain division element may be formed on the first electrode 530 and may have an extruded shape in a direction from the first electrode 530 to the liquid crystal layer 700.

According to an aspect, the first slit 532 may be formed along the edge portion of the first electrode 530. The first slit 532 may have a square ring shape when seen from plane when the first electrode 530 has a square shape. The first slit 532 of the first electrode 530 may have diverse structures. Hereinafter, the structure of the first electrode 530 will be described in detail.

As described above, the structure of the first electrode 530 is not limited. The structure of the first electrode 530 may be satisfactory together with the second electrode 630 explained subsequently only when the alignment direction of the liquid crystal molecules between the first and second electrodes 530 and 630 may be changed by at least two steps.

The first display plate 500 may further include a first alignment layer 540 between the first electrode 530 and the liquid crystal layer 700. The first alignment layer 540 may pre-tilt liquid crystal molecules in the liquid crystal layer 700 in one direction. According to an embodiment, the first alignment layer 540 may include at least one selected from the group consisting of polyamic acid, polyimide, lecithin, nylon and PVA. According to another embodiment, the first alignment layer 540 may further include a reactive mesogen material.

The first polarization plate 800 may be disposed on the other side of the first substrate 510. The other side of the first substrate 510 may be a side corresponding to the one side.

The second display plate 600 may include a second substrate 610 and a second electrode 630. The second substrate 610 may include a transparent insulation material such as glass.

The second electrode 630 may be disposed on one side of the second substrate 610, and the one side of the second substrate 610 may be a side opposing the first display plate 500. The second electrode 630 may be a common electrode. The second electrode 630 may include a transparent conductive material such as ITO, IZO, etc.

According to an embodiment of the present invention, the second electrode 630 may include a domain division element, for example, a second slit 632. The second slit 632 corresponds to a removed part of the second electrode 630, and the second electrode 630 may have a pattern. When a voltage is applied between the first electrode 530 and the second electrode 630, an electric field may be generated between the first and second electrodes 530 and 630, and the electric field may not be formed in a vertical direction with respect to the surface of the second substrate 610 but may be formed in a slanted direction having both a vertical component and a horizontal component due to the second slit 632. According to another embodiment of the present invention, the domain division element may be formed on the second electrode 630 and may have an extruded shape in a direction from the second electrode 630 to the liquid crystal layer 700.

According to an aspect, the second slit 632 may include a first line 632*a* crossing the center of the second electrode 630 in a first direction and a second line 632*b* crossing the center of the second electrode 630 in a second direction that is perpendicular to the first direction. The second slit 632 may have a cross shape when seen from plane. The structure of the second electrode 630 will be explained in detail hereinafter. According to another aspect, the second electrode 630 may not include the second slit 632 according to the structure of the first electrode 530.

As described above, the structure of the second electrode 630 is not limited. The structure of the second electrode 630 may be satisfactory together with the first electrode 530 only when the alignment direction of the liquid crystal molecules between the first and second electrodes 530 and 630 may be changed by at least two steps.

According to exemplary embodiments of the present invention, slanted electric field may be formed between the first and second electrodes 530 and 630 when a voltage is applied due to the first and second slits 532 and 632 of the first and second electrodes 530 and 630 as described above. Therefore, multi-domains D1 to D4 may be formed in one pixel. In this embodiment, the liquid crystal molecules may align in four directions, and four domains D1 to D4 may be formed in one pixel. However, the domain number formed in one pixel will not be limited thereto in the present invention.

According to an embodiment, the second display plate 600 may further include a color filter 612. The color filter 612 may be disposed between the second substrate 610 and the second electrode 630. In addition, a shielding member 614 may be disposed on one side of the second substrate 610, and the color filter 612 may be formed in each area defined by the shielding member 614. The color filter 612 may be passivated by a second insulation layer 616. In this embodiment, the color filter 612 is explained to be disposed on the second display plate 600, however the color filter 612 may be disposed on the first display plate 500. However, the position of the color filter 612 is not limited in the present invention.

According to another embodiment of the present invention, the second display plate 600 may further include a second alignment layer 640 between the second electrode 630 and the liquid crystal layer 700. The second alignment layer 640 may pre-tilt the liquid crystal molecules in the liquid crystal layer 700 in one direction. According to an embodiment, the second alignment layer 640 may include at least one selected from the group consisting of polyamic acid, polyimide, lecithin, nylon and PVA. According to another embodiment, the second alignment layer 640 may further include a reactive mesogen material.

The second polarization plate 850 may be disposed on the other side of the second substrate 610. The other side of the second substrate 610 may be a side corresponding to the one side. The second polarization plate 850 may penetrate linearly polarized light vibrating in a vertical direction among lights penetrated through the first polarization plate 800.

The liquid crystal layer 700 may fill up a space between the first and second display plates 500 and 600. According to an embodiment, the liquid crystal layer 700 may include a negative nematic liquid crystal, a positive nematic liquid crystal and a ferroelectric liquid crystal. According to another embodiment, the liquid crystal layer 700 may include a non-ferroelectric liquid crystal and a ferroelectric liquid crystal. The explanation on the liquid crystal layer 700 is substantially the same as the description concerning the above PVA mode, and detailed description thereof will be omitted. According to a further another embodiment, the liquid crystal layer may further include a mesogen material. Detailed explanation on the liquid crystal layer 700 is substantially the same as the description concerning the PVA mode, and detailed description thereof will be omitted.

According to an embodiment of the present invention, the liquid crystal display device may further include an optical compensation film 830. The optical compensation film 830 may be disposed between the second polarization plate 850 and the second substrate 610. When the liquid crystal molecules maintain a vertically aligned state, the polarization axes of the first polarization plate 800 and the second polarization plate 850 may cross at right angles when observed from a front side, and light leakage may not be generated, however polarization angles formed by the polarization axes of the first and second polarization plates 800 and 850 may be increased, and light leakage may be generated when seen from plane. To compensate the light leakage, the optical compensation film 8,5 such as a biaxial film or a uniaxial film may be disposed.

As described above, since the liquid crystal layer 700 of the liquid crystal display device includes the ferroelectric liquid crystal together with the nematic liquid crystal, uniform alignment of the liquid crystal layer may be attained, and the stability of the alignment may be improved. Thus, the luminance of the liquid crystal display device including the liquid crystal layer 700 may be improved. In addition, since at least one of the liquid crystal layer 700 and the first and second alignment layers 540 and 640 further include the reactive mesogen material, the alignment rate and the alignment angle of the liquid crystal molecules in the liquid crystal layer 700 may be increased, thereby improving optical properties.

Hereinafter, the driving of a liquid crystal display device having the structures of first and second electrodes 530 and 630 illustrated in FIGS. 17A and 17B will be described in brief.

When no potential difference is present between the first and second electrodes 530 and 630, liquid crystal molecules may be aligned in a first direction that is perpendicular to the surface of the first and second electrodes 530 and 630.

When potential difference is generated between the first and second electrodes 530 and 630, the alignment of the liquid crystal molecules may be changed to a second alignment direction that is substantially in parallel to the extended direction of the first and second electrodes 530 and 630. In this embodiment, the second alignment direction of the liquid crystal molecules may be different depending on the position of the liquid crystal molecules between the first and second electrodes. The liquid crystal molecules disposed between the first and second electrodes and having the first and second slits may have the second alignment direction that is perpendicular to the first and second slits. Meanwhile, the liquid crystal molecules provided between the first and second electrodes and separated from the first and second slits may have the second alignment direction that is a twisted direction by about 45° or about 135° with respect to the first and second slits.

According to an embodiment of the present invention, when potential difference is generated between the first and second electrodes 530 and 630, the alignment direction of the liquid crystal molecules may be changed by at least two steps, thereby finally aligning thereof in the second alignment direction. For example, the changing operation of the alignment direction of the liquid crystal molecules may include a first alignment step and a second alignment step one by one. The alignment direction of the liquid crystal molecules of the liquid crystal layer 700 is not changed to a target direction immediately because the intensity or the shape of electric field generated between the first and second electrodes 530 and 630 are different in accordance with the structures of the first and second electrodes 530 and 630.

Hereinafter, the first alignment step and the second alignment step for changing the alignment direction of the liquid crystal molecules one by one by generating the potential difference between the first and second electrodes 530 and 630 will be explained in detail.

The first alignment step (as soon as the potential difference is generated between the first and second electrodes) may be a procedure for changing the alignment direction of the liquid crystal molecules aligned in the first alignment direction into a third alignment direction. The third alignment direction may include directions different from the first or second alignment directions.

The change of the alignment directions of the liquid crystal molecules in the first alignment step in accordance with the position between the first and second electrodes 530 and 630 will be explained in more detail for illustration. When potential difference is generated between the first and second electrodes 530 and 630, relatively strong electric field may be formed at a farther portion from the first and second slits. In addition, at the portion where the first and second slits are formed, relatively weak electric field may be formed.

The alignment direction of the liquid crystal molecules disposed where relatively strong electric field is generated may be changed from the first alignment direction to the third alignment direction, and the third alignment direction may be an optional direction and may not be easily anticipated. The liquid crystal molecules disposed where relatively weak electric field is generated may be changed from the first alignment direction to the third alignment direction, and the third alignment direction may be a perpendicular direction to the first and second slits.

The second alignment step (after a certain time from the generation of the potential difference between the first and second electrodes) may be a procedure of changing the alignment direction of the liquid crystal molecules aligned in the third alignment direction to the second alignment direction. In more detail, the liquid crystal molecules disposed where relatively strong electric field is generated may be changed to have the second alignment direction that is a twisted direction to about 45° or about 135° with respect to the first and second slits. The liquid crystal molecules disposed where relatively weak electric field is generated may be changed to have the second alignment direction that is perpendicular to the first and second slits. Thus, the liquid crystal molecules between the first and second electrodes 530 and 630 may be changed to have a target second alignment direction.

Meanwhile, when the liquid crystal layer 700 or a first or second alignment layer 540 or 640 includes a reactive mesogen material, and when potential difference is generated between the first and second electrodes 530 and 630, the alignment direction of the liquid crystal molecules having the first alignment direction may be changed to the second alignment direction immediately. That is, the alignment direction of the liquid crystal molecules may be directly changed from the first alignment direction to the second alignment direction while omitting the step of changing to the third alignment direction.

Hereinafter, the structures of the first and second electrodes 530 and 630 will be described in detail. Hereinafter, the slit structure of the first electrode will be explained in detail. However, the structures of the first and second electrodes are explained only for illustration, and the present invention is not limited thereto.

FIGS. 18A to 18E are plan views for explaining the structures of first and second electrodes according to exemplary embodiments of the present invention.

Figure 18A:
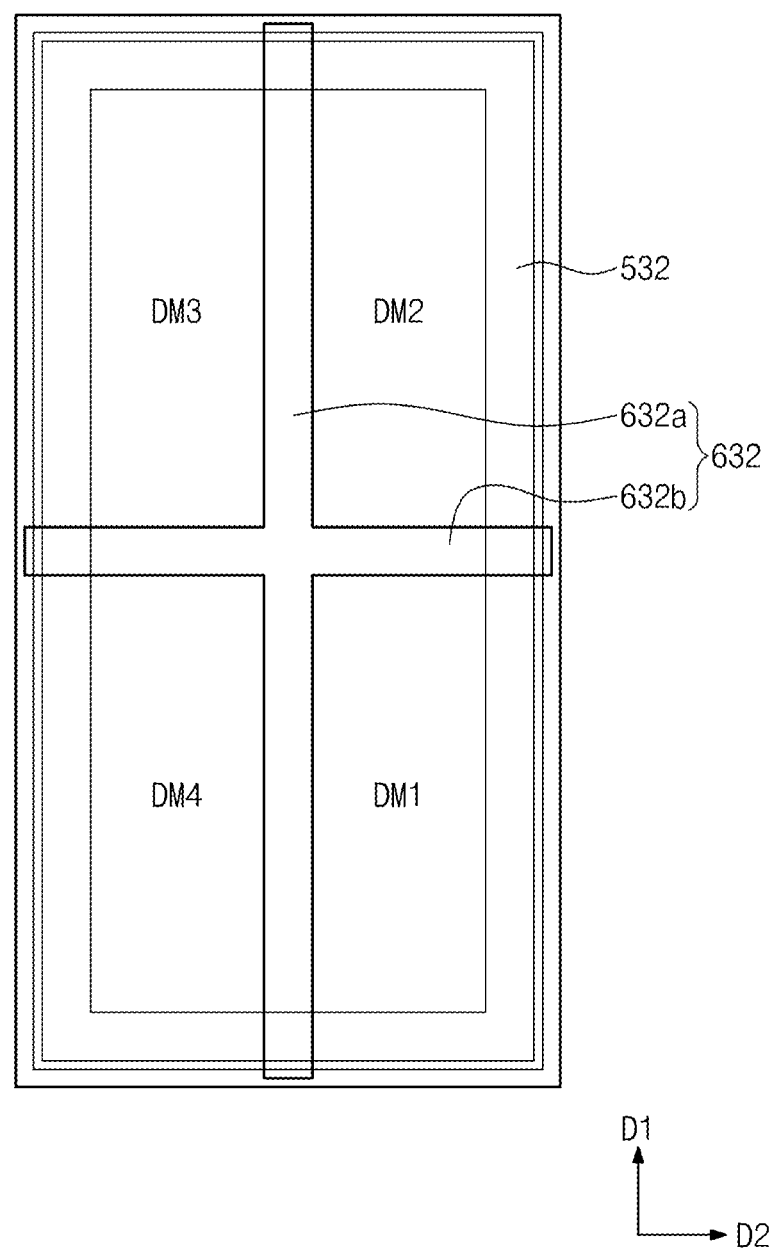
FIGS. 18A to 18F are plan views for explaining the structures of first and second electrodes according to exemplary embodiments of the present invention.

Referring to FIG. 18A, a first electrode 530 may include a first slit 532 formed along the edge portion of the first electrode 530. When the first electrode 530 has a square shape, the first slit 532 may have a square ring shape seen from plane. The second electrode 630 may include a second slit 632 including a first line 632a penetrating the center of the second electrode 630 and extended in a first direction D1 and a second line 632b penetrating the center of the second electrode 630 and extended in a second direction D2. The first and second directions D1 and D2 may be perpendicular to each other. In addition, the first and second lines 632a and 632b may be connected to each other. For example, the second electrode 630 may have a cross shape.

Figure 18B:
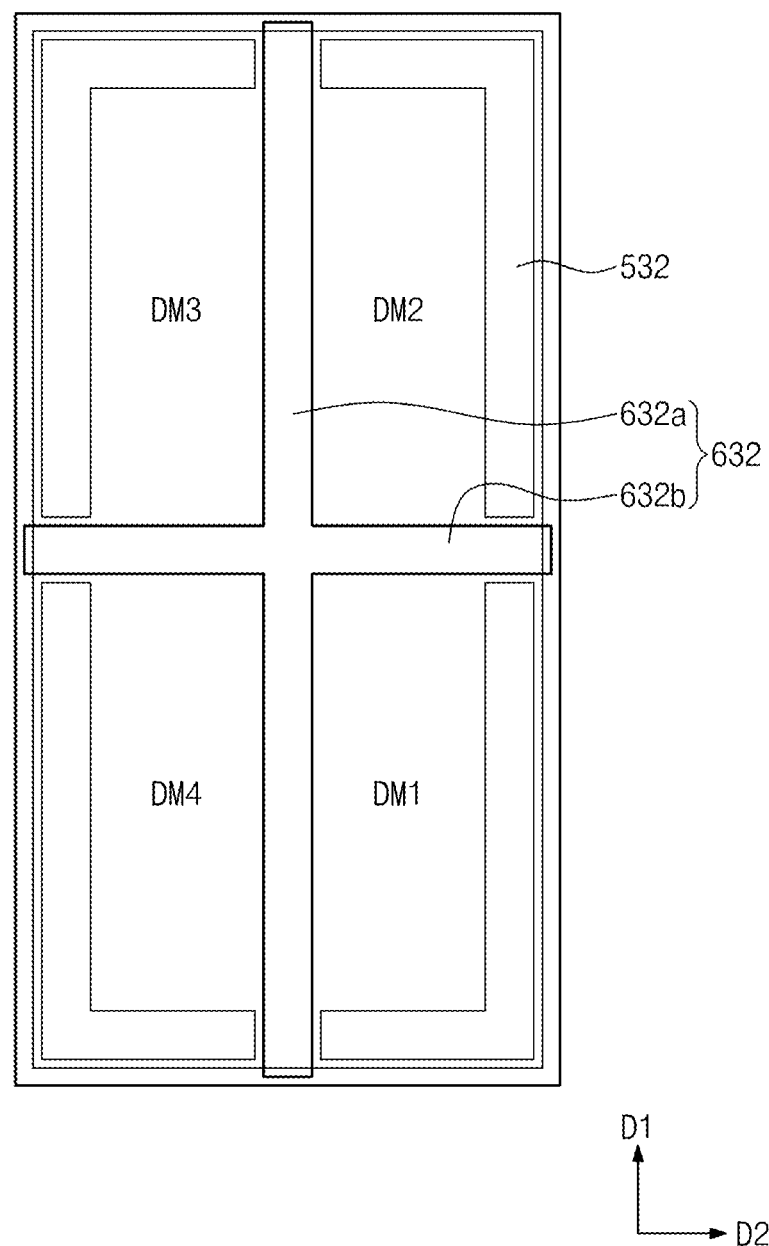

Referring to FIG. 18B, a first electrode 530 may include a first slit 532 formed along the edge portion of the first electrode 530. Different from FIG. 18A, the first slit 532 may not be continuously formed but may include a cut portion in this embodiment. For example, the cut portion of the first slit 532 may be formed at the middle of a side. When the first electrode 530 has a square shape, the first slit 532 may have a clamp shape disposed at each vertex when seen from plane. The structure of a second electrode 630 is substantially the same as that explained in FIG. 18A, and detailed description thereof will be omitted. For example, the second slit 632 of the second electrode 630 may have a cross shape.

In this embodiment, the first slit 532 may be formed so as not to overlap with the second slit 632. For example, a portion of the second slit 632 may be overlapped at the cut portion of the first slit 532.

Figure 18C:
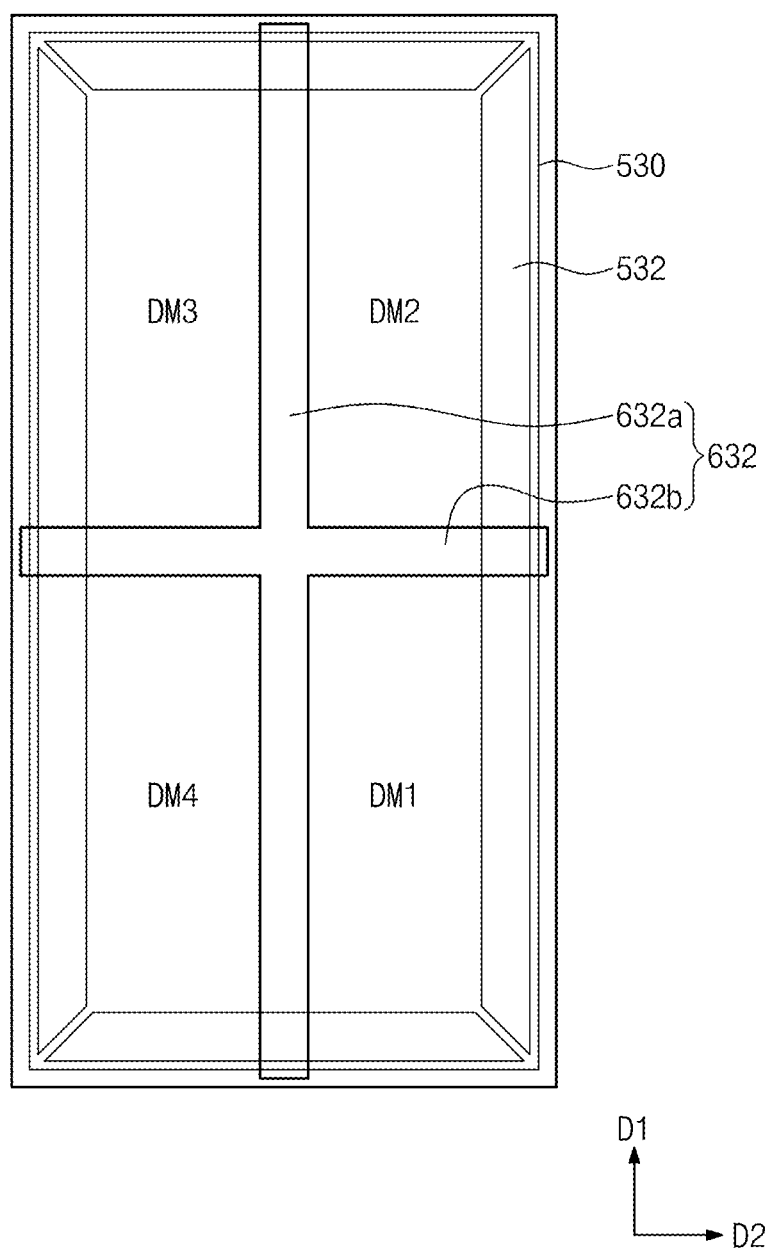

Referring to FIG. 18C, a first electrode 530 may include a first slit 532 formed along the edge portion of the first electrode 530. Different from FIG. 18A, the first slit 532 may not be continuously formed but may include a cut portion in this embodiment. For example, the cut portion of the first slit 532 may be formed at a vertex portion. When the first electrode 530 has a square shape, the first slit 532 may have a line shape disposed at each side when seen from plane. The structure of the second electrode 630 is substantially the same as that explained in FIG. 18A, and detailed description thereon will be omitted.

Figure 18D:
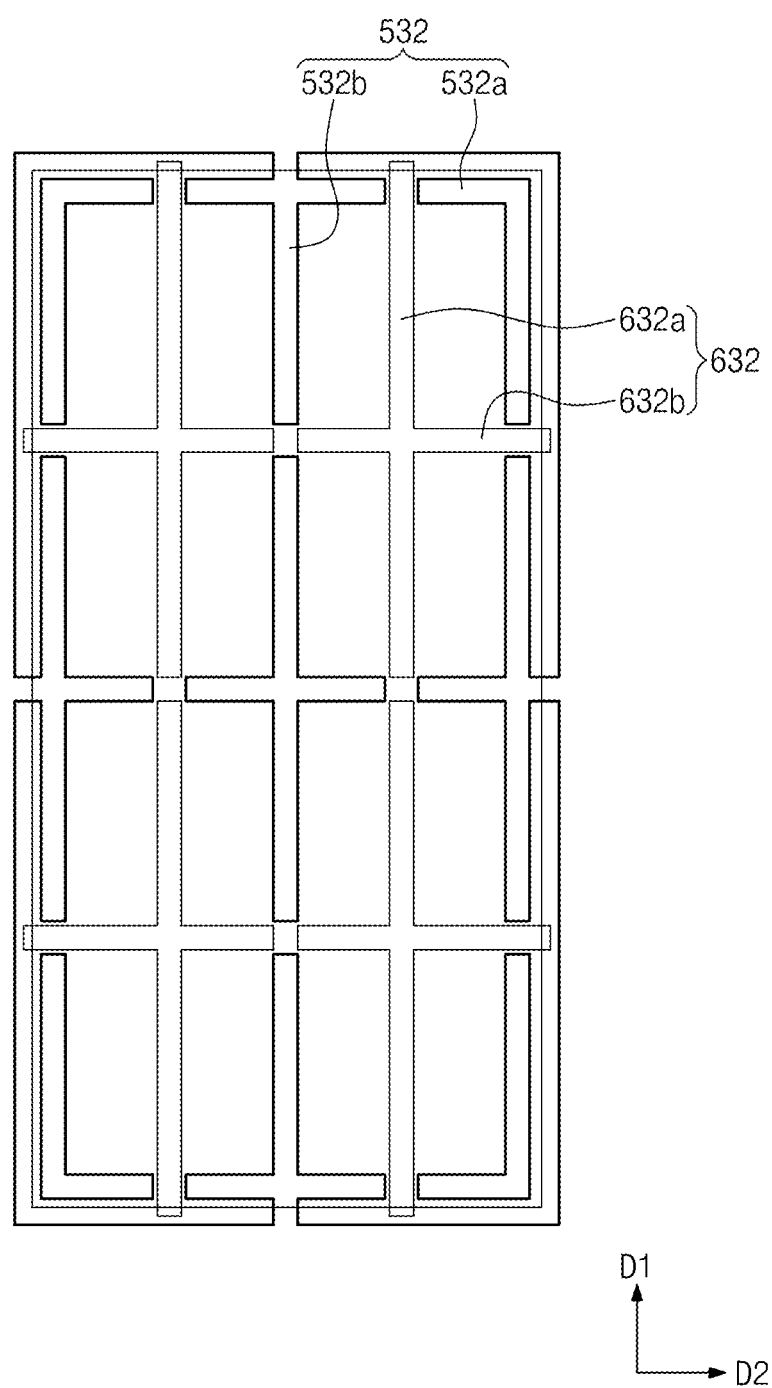

Referring to FIG. 18D, a first electrode 530 may include a first slit 532 including a first line 532a formed along the edge portion of the first electrode 530 and a second line 532b penetrating the center of the first electrode 530 and having a cross shape. The first slit 532 may include cut portions. The first electrode 530 may be divided into four areas by the first slit 532 of the first electrode 530. The second electrode 630 may include a second slit 632 penetrating the center of the four areas of the first electrode 530 and having a cross shape. According to this embodiment, the first and second slits 532 and 632 may be formed so as not to overlap with each other.

Figure 18E:
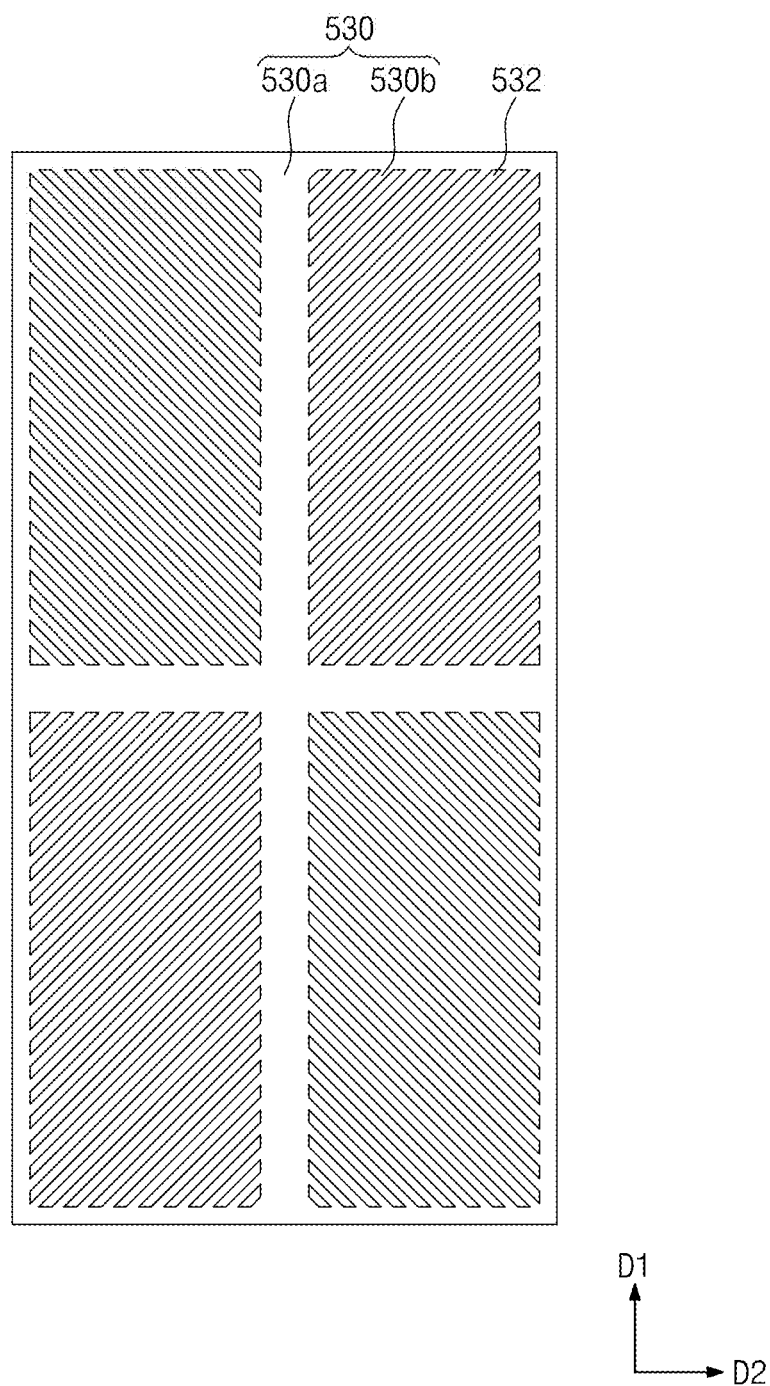

Referring to FIG. 18E, a first electrode 530 may include a stem part 530a having a cross shape and a plurality of branch parts 530b extruded and extended in a radial direction from the stem part 530a. The stem part 530a may be provided in diverse shapes and may have, for example, a cross shape. The branch parts 530b may be extended in four areas divided by the stem part 530a having the cross shape. Each branch part 530b is extended toward each vertex, and may be separated by the unit of micrometers (μm). The branch parts 530b in neighboring areas may have a mirror image to each other. The first electrode 530 may include a first slit 532 having a line shape and separating the branch parts 530b. The distance between the first slits 532 may be a few micrometers. The first slits 532 may not be connected to each other and have a separated shape from each other. Meanwhile, the second electrode 630 may be an electrode having no slit and no pattern in this embodiment.

Figure 18F:
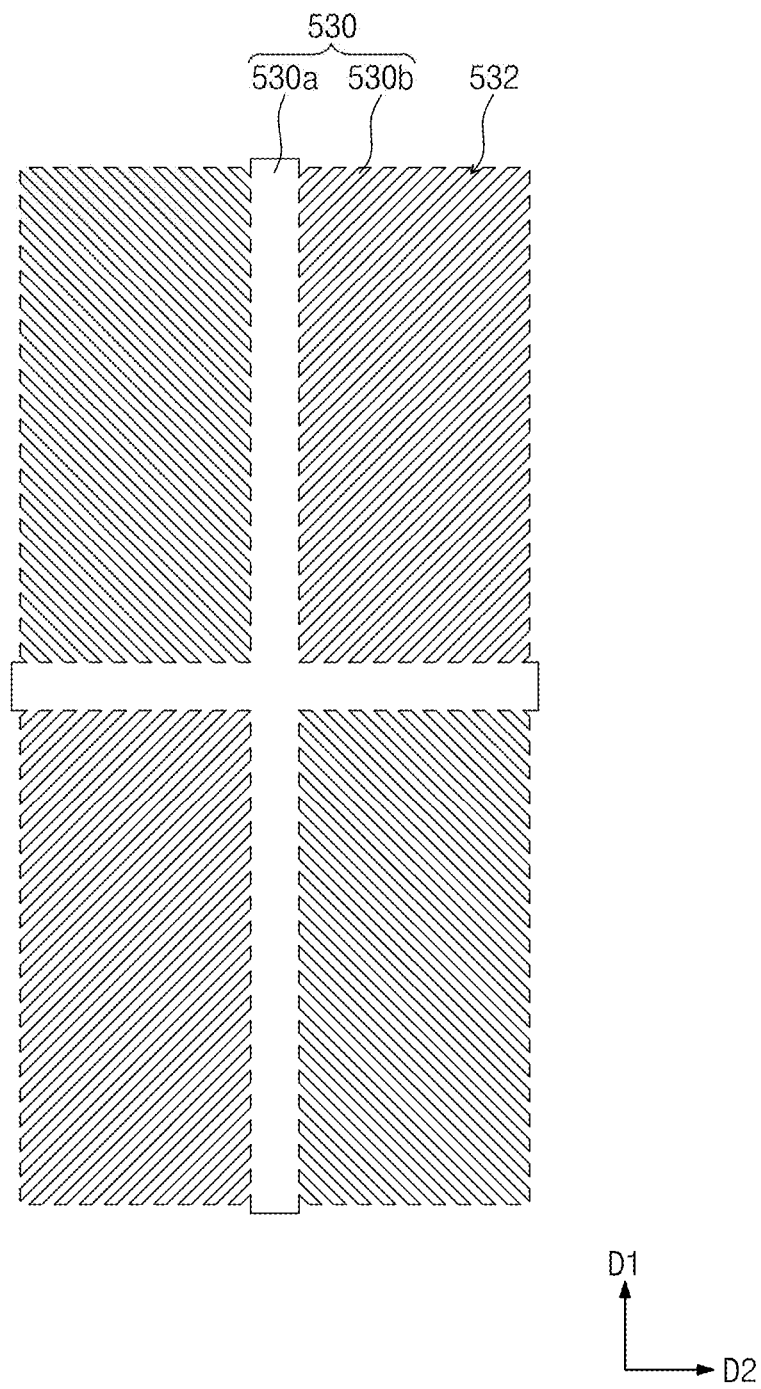

Referring to FIG. 18F, a first electrode 530 may include a stem part 530a and branch parts 530b similar to the first electrode 530 in FIG. 18E, however first slits 532 having a line shape and separating the branch parts 530b may be connected to each other. The second electrode 630 may be an electrode having no slit and no pattern in this embodiment.

Hereinafter, the present invention will be explained in more detail through examples and Comparative Example 2. However, the examples are explained only for illustrating the present invention, and the present invention is not limited thereto and includes various revisions and modifications.

Liquid Crystal Display Device in LVA Mode

Comparative Example 2

A liquid crystal display device including a first display plate including a first electrode having a first slit of a square ring shape, a second display plate including a second electrode having a second slit of a cross shape, and a liquid crystal layer filling up a space between the first and second display plates was manufactured. The liquid crystal display device was manufactured in a lattice structure vertical alignment (VA) mode having four domains.

The liquid crystal layer was manufactured by using about 100 wt % of MLC 6608 (Δn=0.084, Δ∈=−4.3) of Merck Co. The thickness (cell gap) of the liquid crystal layer of the liquid crystal display device was about 4.5 μm.

Example 8

A liquid crystal display device including a first display plate including a first electrode having a first slit of a square ring shape, a second display plate including a second electrode having a second slit of a cross shape, and a liquid crystal layer filling up between a space of the first and second display plates was manufactured. The liquid crystal display device was manufactured in a lattice structure VA mode having four domains.

The liquid crystal layer was manufactured by mixing about 97 wt % of MLC 6608 (Δn=0.084, Δ∈=−4.3) of Merck Co. and about 3 wt % of KFLC 7 (Δn=0.18) of Kingston Chemical Co. at about 100° C. The thickness of the liquid crystal layer of the liquid crystal display device was about 4.5 μm. The about 3 wt % of the KFLC 7 included about 2.8 wt % of an achiral component and about 0.2 wt % of a chiral component.

Example 9

A liquid crystal display device was manufactured by the same procedure described in Example 8 except for the material of the liquid crystal layer.

The liquid crystal layer was manufactured by mixing about 95 wt % of MLC 6608 (Δn=0.084, Δ∈=−4.3) of Merck Co. and about 5 wt % of KFLC 10 (Δn=0.18) of Kingston Chemical Co. at about 100° C. The about 5 wt % of the KFLC 10 included about 4.5 wt % of an achiral component and about 0.5 wt % of a chiral component.

Example 10

A liquid crystal display device was manufactured by the same procedure described in Example 8 except for the material of the liquid crystal layer.

The liquid crystal layer was manufactured by mixing about 90 wt % of MLC 6608 (Δn=0.084, Δ∈=−4.3) of Merck Co. and about 10 wt % of KFLC 3 (Δn=0.18) of Kingston Chemical Co. at about 100° C. The about 10 wt % of the KFLC 3 included about 9.7 wt % of an achiral component and about 0.3 wt % of a chiral component.

Example 11

A liquid crystal display device was manufactured by the same procedure described in Example 8 except for the material of the liquid crystal layer.

The liquid crystal layer was manufactured by mixing about 90 wt % of MLC 6608 (Δn=0.084, Δ∈=−4.3) of Merck Co. and about 10 wt % of KFLC 10 (Δn=0.18) of Kingston Chemical Co. at about 100° C. The about 10 wt % of the KFLC included about 9.0 wt % of an achiral component and about 1.0 wt % of a chiral component.

Example 12

A liquid crystal display device was manufactured by the same procedure described in Example 8 except for the material of the liquid crystal layer.

The liquid crystal layer was manufactured by mixing about 85 wt % of MLC 6608 (Δn=0.084, Δ∈=−4.3) of Merck Co. and about 15 wt % of KFLC 5 (Δn=0.18) of Kingston Chemical Co. at about 100° C. The about 15 wt % of the KFLC 5 included about 14.3 wt % of an achiral component and about 0.7 wt % of a chiral component.

Example 13

A liquid crystal display device was manufactured by the same procedure described in Example 8 except for the material of the liquid crystal layer.

The liquid crystal layer was manufactured by mixing about 80 wt % of MLC 6608 (Δn=0.084, Δ∈=−4.3) of Merck Co. and about 20 wt % of KFLC 7 (Δn=0.18) of Kingston Chemical Co. at about 100° C. The about 20 wt % of the KFLC 7 included about 18.6 wt % of an achiral component and about 1.6 wt % of a chiral component.

Example 14

A liquid crystal display device was manufactured by the same procedure described in Example 8 except for the material of the liquid crystal layer.

The liquid crystal layer was manufactured by mixing about 70 wt % of MLC 6608 (Δn=0.084, Δ∈=−4.3) of Merck Co. and about 30 wt % of KFLC 3 (Δn=0.18) of Kingston Chemical Co. at about 100° C. The about 30 wt % of the KFLC 3 included about 29.1 wt % of an achiral component and about 0.9 wt % of a chiral component.

The constituting components and the thickness of the liquid crystal layer in Comparative Example 2 and Examples 8 to 14 are illustrated in the following Table 2.

TABLE 2

| | Nematic liquid crystal | Smectic liquid crystal | | Thickness of liquid crystal layer |
| --- | --- | --- | --- | --- |
| | | Achiral component | Chiral component | |
| Comparative Example 2 | 100 wt % | 0 | 0 | 4.5 μm |
| Example 8 | 97 wt % | 2.8 wt % | 0.2 wt % | 4.5 μm |
| Example 9 | 95 wt % | 4.5 wt % | 0.5 wt % | 4.5 μm |
| Example 10 | 90 wt % | 9.7 wt % | 0.3 wt % | 4.5 μm |
| Example 11 | 90 wt % | 9.0 wt % | 1.0 wt % | 4.5 μm |
| Example 12 | 85 wt % | 14.3 wt % | 0.7 wt % | 4.5 μm |
| Example 13 | 80 wt % | 18.6 wt % | 1.6 wt % | 4.5 μm |
| Example 14 | 70 wt % | 29.1 wt % | 0.9 wt % | 4.5 μm |

Evaluation of Transmittance

Figure 19:
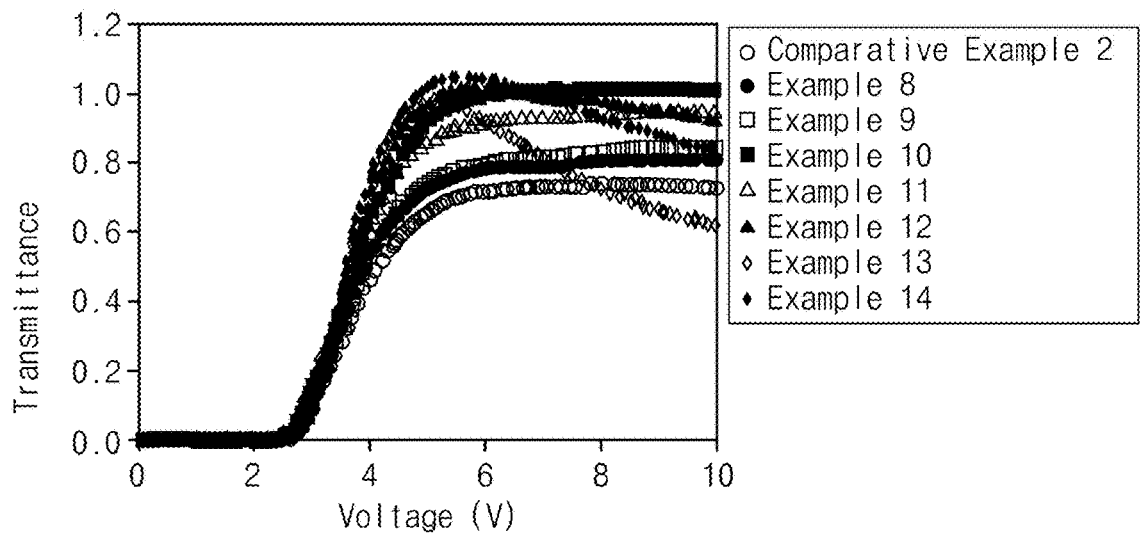
FIG. 19 is a graph for comparing the transmittance of the liquid crystal display devices of Comparative Example 2 and Examples 8 to 14.

FIG. 19 is a graph for comparing the transmittance of the liquid crystal display devices according to Comparative Example 2 and Examples 8 to 14. In FIG. 19, the graph illustrates the transmittance according to an applied voltage. In FIG. 3, x-axis represents an applied voltage, and the unit thereof is [V], and y-axis represents transmittance.

Referring to FIG. 19, the transmittance of the liquid crystal display devices according to Examples 8 to 14 is good in general when compared to that of a liquid crystal display device according to Comparative Example 2. In more detail, the transmittance of the liquid crystal display devices of Examples 8 and 9 is increased very slightly when compared to that of Comparative Example 2. In addition, the transmittance of the liquid crystal display devices of Examples 10 to 14 is about 1.2 and is excellent when compared to that of the liquid crystal display device of Comparative Example 1 of which transmittance is about 0.6.

Through the above evaluation, the achiral smectic liquid crystal in the liquid crystal layer of Examples 8 to 14 is expected to induce the alignment of the liquid crystal molecules uniformly and stably. Thus, the transmittance of the liquid crystal display devices of Examples 8 to 14 is better than that of the liquid crystal display device of Comparative Example 2.

Figure 20A:
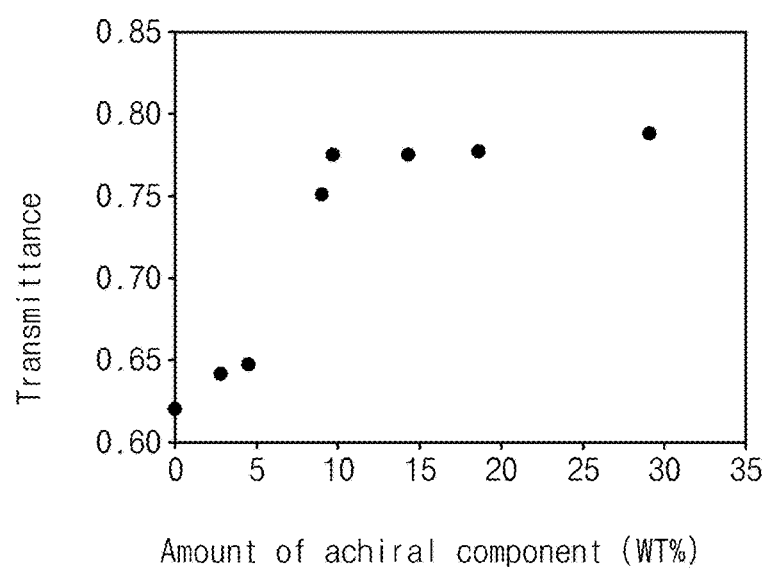
FIG. 20A is a graph illustrating the transmittance of the liquid crystal display device of Comparative Example 2 and the transmittance of the liquid crystal display devices of Examples 8 to 14 according to the amount of an achiral component in a liquid crystal layer.
Figure 20B:
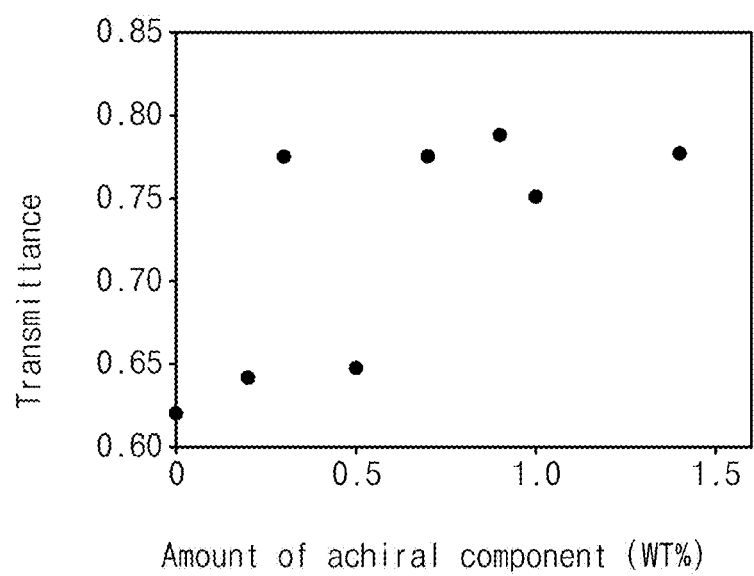
FIG. 20B is a graph illustrating the transmittance of the liquid crystal display device of Comparative Example 2 and the transmittance of the liquid crystal display devices of Examples 8 to 14 according to the amount of a chiral component in a liquid crystal layer.

FIG. 20A is a graph illustrating the transmittance of the liquid crystal display devices of Examples 8 to 14 and the transmittance of the liquid crystal display device of Comparative Example 2 according to the amount of an achiral component in a liquid crystal layer, and FIG. 20B is a graph illustrating the transmittance of the liquid crystal display devices of Examples 8 to 14 and transmittance of the liquid crystal display device of Comparative Example 2 according to the amount of a chiral component in a liquid crystal layer. In FIGS. 20A and 20B, x-axes represent the amounts of the achiral component and the chiral component, and the unit thereof is [wt %], and y-axes represent transmittance.

Referring to FIG. 20A, as the amount of the achiral component in the liquid crystal layer increases, the transmittance of the liquid crystal display devices increases. In more detail, the transmittance of the liquid crystal display device of Comparative Example 2 without the achiral component exhibits the transmittance of about 0.63, however the transmittance of the liquid crystal display devices increases as the amount of the achiral component in the liquid crystal layer increases. In addition, when the amount of the achiral component in the liquid crystal layer is greater than or equal to about 9.7 wt %, the transmittance increases to about 0.8.

Referring to FIG. 20B, as the amount of the chiral component in the liquid crystal layer increases, the transmittance of the liquid crystal display devices increases in general even though somewhat irregular. In more detail, the transmittance of the liquid crystal display device of Comparative Example 2 without the chiral component exhibits the transmittance of about 0.63, however the transmittance of the liquid crystal display devices increases as the amount of the achiral component in the liquid crystal layer increases. In addition, when the amount of the chiral component in the liquid crystal layer is greater than or equal to about 0.9 wt %, the transmittance increases to about 0.8.

Evaluation of Textures

FIGS. 21A to 21H and FIGS. 22A to 22H are textures of the liquid crystal display devices of Comparative Example 2 and Examples 8 to 14.

In the liquid crystal display devices, a voltage of about 7 V was applied, and a cross polarization plate was rotated to obtain white images and black images in FIGS. 21A to 21H and FIGS. 22A to 22H.

The textures of FIGS. 21A to 21H are white images under the cross polarization plate. In more detail, the white images are obtained when the angle between the cross polarization plate and the liquid crystal molecules of the liquid crystal layer is about 45°, and bright images are shown via the penetration of lights through the liquid crystal layer. This may be confirmed in the above Mathematical Formula 1.

In the above Mathematical Formula 1, T is transmittance, $\varphi$ is an angle formed by a polarization plate and liquid crystal molecules, $\Delta n$ is a birefringence value, d is the thickness of a liquid crystal layer, and $\lambda$ is the wavelength of exposing lights. In Mathematical Formula 1, when $\varphi$ is 45°, a $\sin^2$ value is the maximum value, and the transmittance is the highest.

Figure 21A:
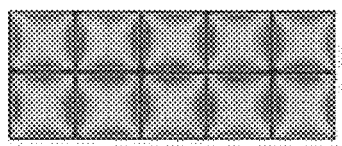
FIGS. 21A to 21H and 22A to 22H are textures of the liquid crystal display devices of Comparative Example 2 and Examples 8 to 14.
Figure 21D:
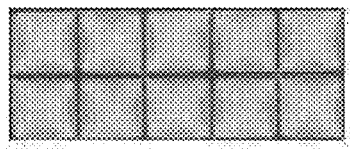
Figure 21B:
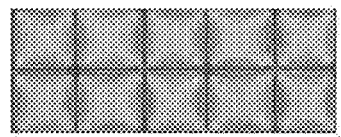
Figure 21E:
Figure 21C:
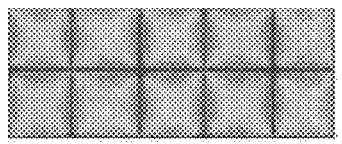
Figure 21F:
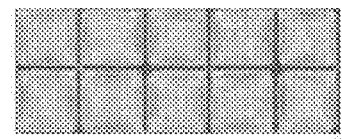
Figure 21G:
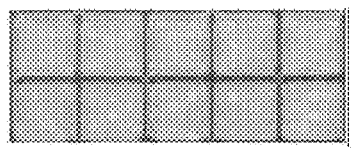

FIGS. 21A to 21H are textures of Comparative Example 2 and Examples 8 to 14. Referring to FIG. 21A, defects appearing black are shown at the edge portions of the slit or at the border of the slits. Referring to FIGS. 21B to 21H, the defects appearing black are removed at the border of the slits as well as at the edge portions of the slit.

The textures in FIGS. 22A to 22H exhibit black images under the cross polarization plate. In more detail, the black images are obtained when the angle between the cross polarization plate and the liquid crystal molecules of the liquid crystal layer is about 0°, and black images are shown because a rotated upper polarization plate has perpendicular polarization with respect to polarized lights penetrated through the liquid crystal layer. In the above Mathematical Formula 1, when $\varphi$ is 0°, a $\sin^2$ value is 0, and the transmittance becomes 0.

Figure 22A:
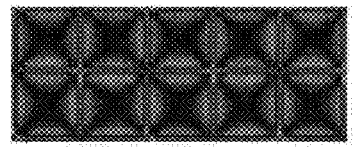
Figure 21H:
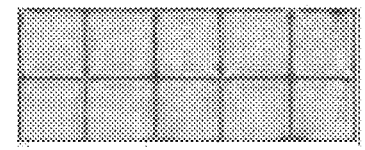
Figure 22B:
Figure 22C:
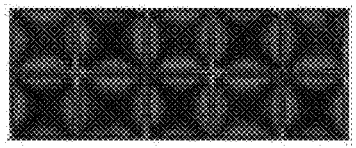
Figure 22D:
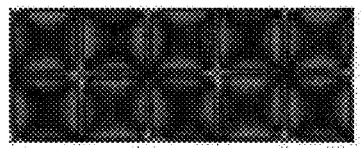
Figure 22G:
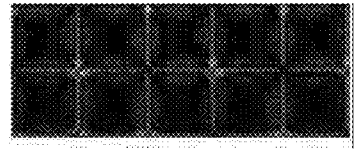
Figure 22E:
Figure 22H:
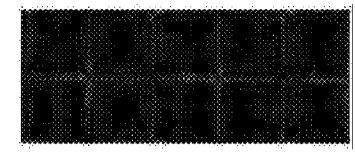
Figure 22F:
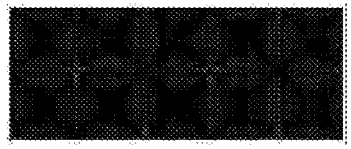

FIGS. 22A to 22H are textures of Comparative Example 2 and Examples 8 to 14. Referring to FIG. 22A, light leakage phenomena are shown at the edge portions of the slit or at the border of the slits. Referring to FIGS. 22B to 22H, the light leakage phenomena are mostly removed at the border of the slits as well as at the edge portions of the slit when compared to FIG. 22A.

When inspecting the textures, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 23A:
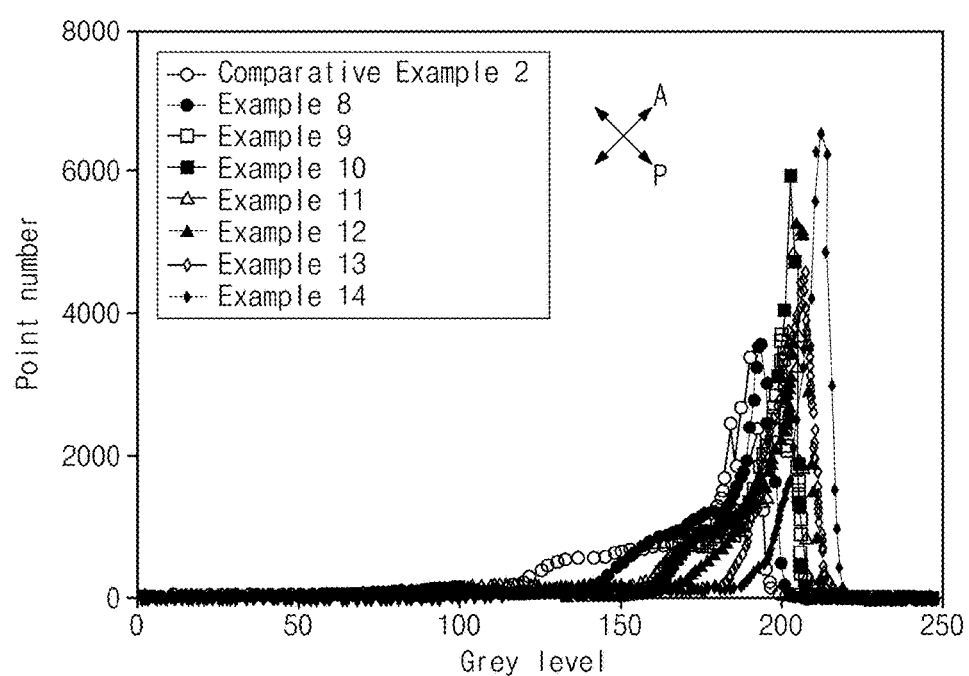
FIGS. 23A and 23B are graphs illustrating the grey level of the textures of Comparative Example 2 and Examples 8 to 14.
Figure 23B:
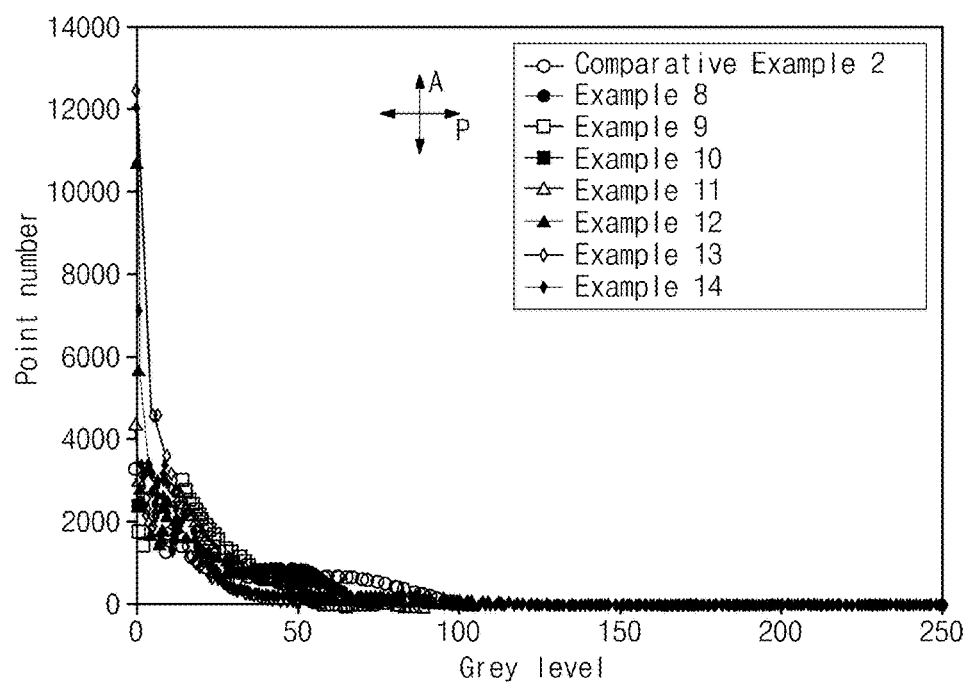

FIGS. 23A and 23B are graphs illustrating grey levels of the textures of Comparative Example 2 and Examples 8 to 14. FIGS. 23A and 23B are evaluated by 256 ($2^8$) grey levels. As the grey level approaches to 0, grey closes to black, and the concentration of the grey is represented by the levels from 0 to 255.

FIG. 23A illustrates the grey level of the textures in FIGS. 21A to 21H, and the white images are found around the grey level of from about 150 to about 230. The white image of Comparative Example 2 in FIG. 21A is found a lot from about 150 to about 200 of the grey level, and the peak width thereof is found wide. The white images of Examples 8 to 14 in FIGS. 21B to 21H are found a lot from about 200 to about 230 of the grey level, and the peak width thereof is found narrower when compared to that of Comparative Example 2. In addition, the white images are found around the grey level of about 230, and the peak width becomes narrow from Example 8 to Example 14.

FIG. 23B represents the grey levels of the textures in FIGS. 22A to 22H, and the black images are found around 0 of the grey level. The black image of Comparative Example 2 in FIG. 22A is found a lot from about 30 to about 50 of the grey level, and the peak width thereof is found wide. The black images of Examples 8 to 14 in FIGS. 22B to 22H are found a lot from about 0 to about 25 of the grey level, and the peak width thereof is found narrower when compared to that of Comparative Example 2. In addition, the black images are found around the grey level of about 0, and the peak width becomes narrow from Example 8 to Example 14.

When inspecting the graphs in FIGS. 23A and 23B, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 24A:
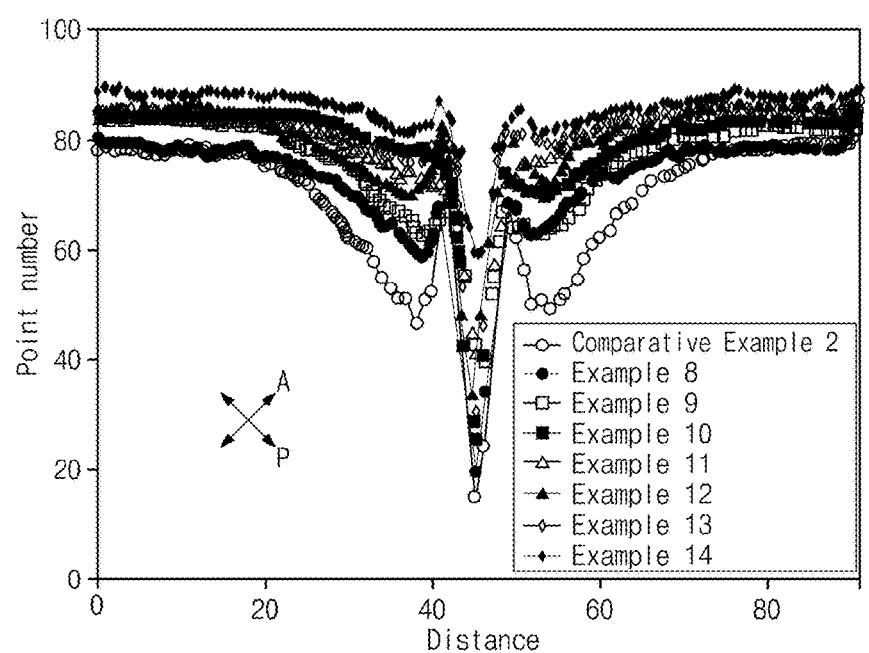
FIGS. 24A and 24B are graphs illustrating the transmittance of the textures of Comparative Example 2 and Examples 8 to 14 according to distance.
Figure 24B:
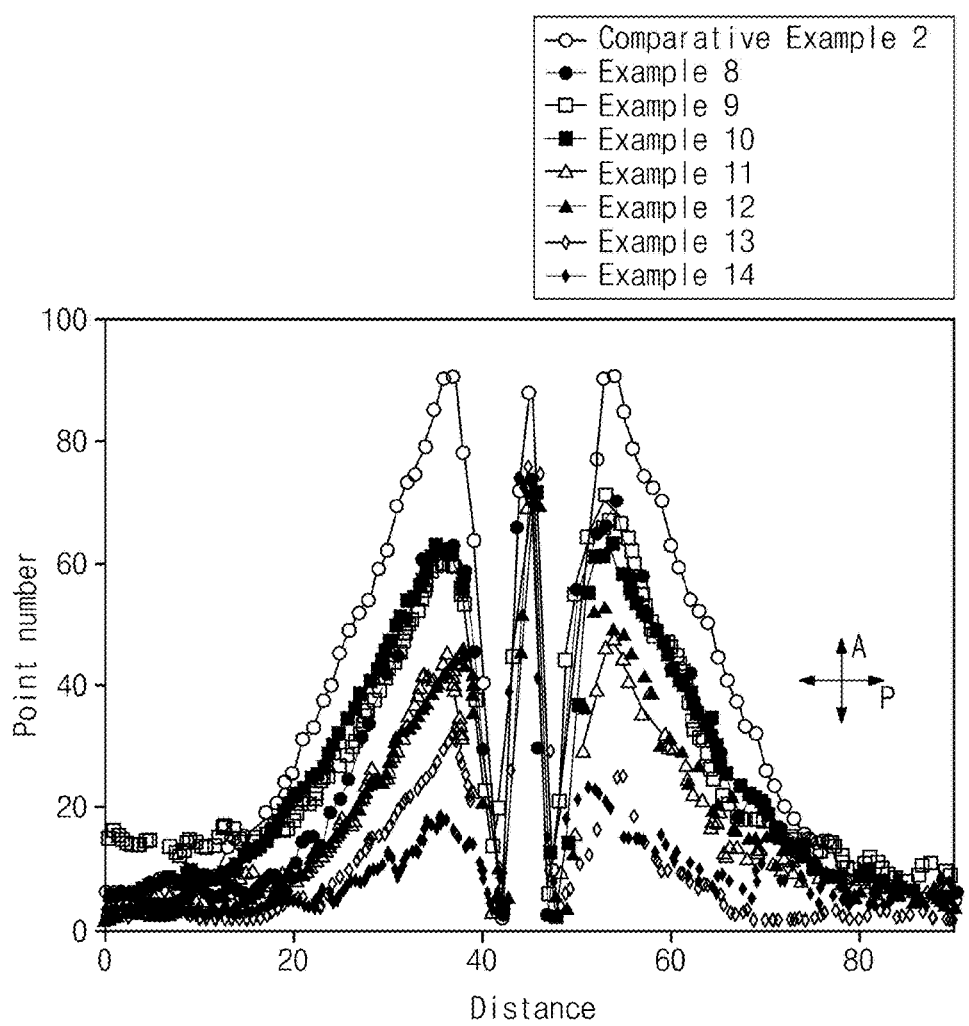

FIGS. 24A and 24B are graphs illustrating the transmittance of Comparative Example 2 and Examples 8 to 14 according to the distance of the textures.

FIG. 24A illustrates transmittance according to the distance of the slit after cutting the textures of FIGS. 21A to 21H in one direction. Referring to FIG. 24A, the transmittance around the slit is from about 130 to about 180, and the portions around the slit are found darker than the portions other than the slit. The transmittance of Examples 8 to 14 is found from about 180 to about 230. The transmittance of Examples 8 to 14 is found higher than that of Comparative Example 2 around the slit.

FIG. 24B illustrates transmittance according to the distance of the slit after cutting the textures of FIGS. 22A to 22H in one direction. Referring to FIG. 24B, the transmittance around the slit is greater than or equal to about 80, and light leakage defects are found around the slit of Comparative Example 2. The transmittance around the slit of Examples 8 to 14 is less than or equal to about 80, and the light leakage defects are found to be solved to a certain degree.

[[Liquid Crystal Display Device in FFS Mode]]

Figure 25:
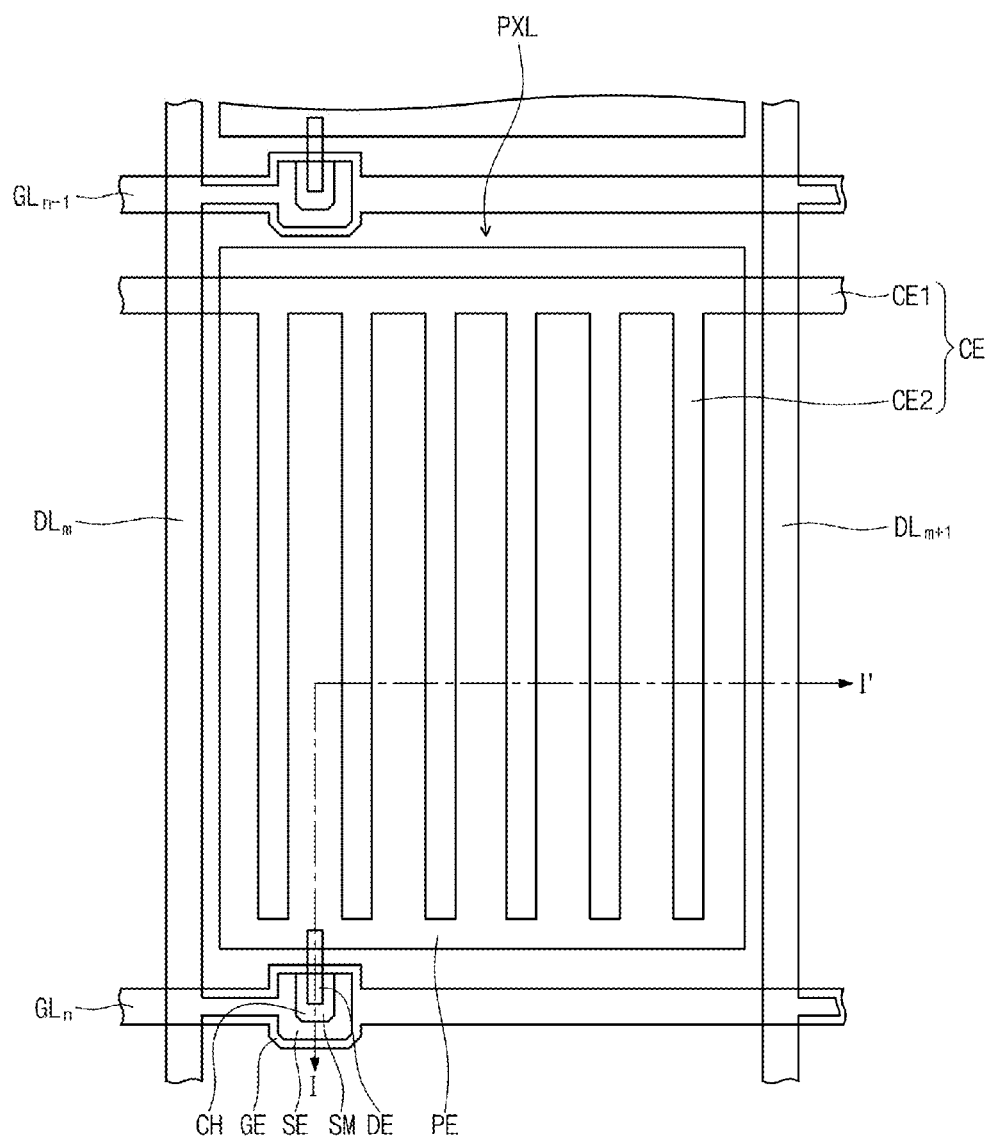
FIGS. 25 and 26 are a plan view and a cross-sectional view for explaining a liquid crystal display device according to an embodiment of the present invention.
Figure 26:
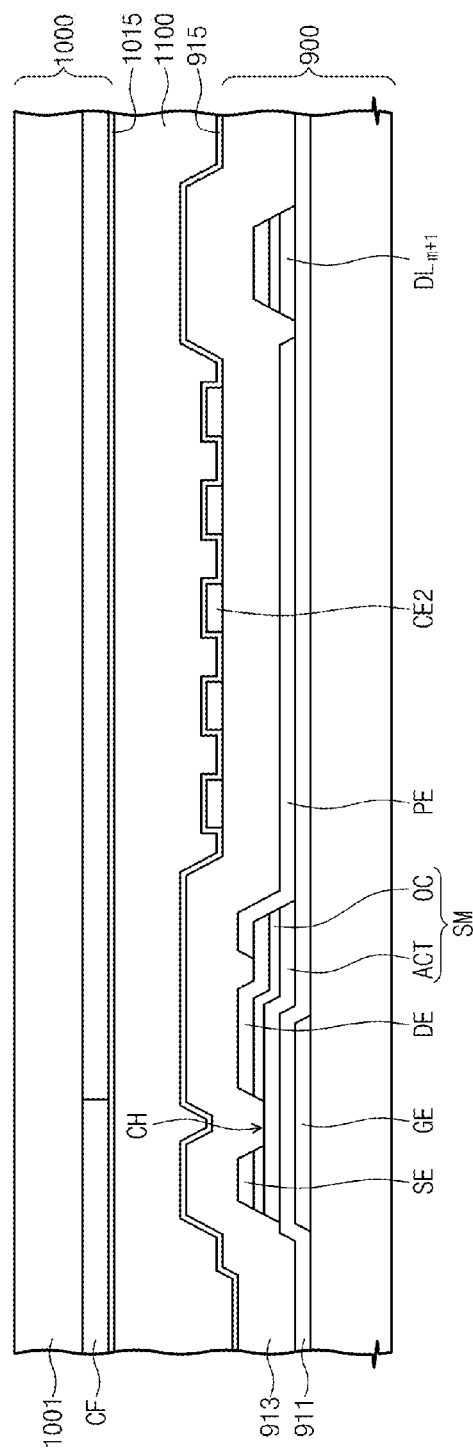

FIGS. 25 and 26 are a plan view and a cross-sectional view for explaining a liquid crystal display device according to an embodiment of the present invention.

Referring to FIGS. 25 and 26, a liquid crystal display device 2 includes a first substrate 900, a second substrate 1000 opposing the first substrate 900 and a liquid crystal layer 1100 formed between the first substrate 900 and the second substrate 1000. Since the first substrate 900 corresponds to a substrate on which thin film transistors are formed, the first substrate 900 is called a thin film transistor substrate. Since the second substrate 1000 corresponds to a substrate on which color filters CF are formed, the second substrate 1000 is called a color filter substrate.

The first substrate 900 includes a first insulation substrate 901, a plurality of gate lines, a plurality of data lines and a plurality of pixels PXL. The first insulation substrate 901 has an approximately square shape and is formed using a transparent insulating material.

The gate lines are formed on the first insulation substrate 901 and are extended in a first direction. The gate lines include, for example, n+p numbers of gate lines GL1, ..., GLn, GLn+1, ..., GL(n+p)−1, GL(n+p).

The data lines are extended in a second direction that is crossing the first direction and are separated from the gate lines with an insulation layer therebetween. The data lines include, for example, m+q numbers of data lines DL1, ..., DLm, DLm+1, ..., DL(m+q)−1, DL(m+q). Each pixel is connected to one of the gate lines GL1, ..., GLn, GLn+1, ..., GL(n+p)−1, GL(n+p) and one of the data lines DL1, ..., DLm, DLm+1, ..., DL(m+q)−1, DL(m+q).

Since each pixel PXL has the same structure, an n-th gate line GLn, an m-th data line DLm and one pixel PXL are illustrated in FIG. 23 for convenience of explanation.

Each pixel PXL includes a thin film transistor, a pixel electrode PE connected to the thin film transistor, a passivation layer 913 covering the pixel electrode PE, and a common electrode CE separately provided from the pixel electrode PE. The thin film transistor includes a gate electrode GE, a gate insulation layer 911, a semiconductor pattern SM, a source electrode SE and a drain electrode DE.

The gate electrode GE is extruded from the n-th gate line GLn or provided in a partial area of the n-th gate line GLn.

The gate electrode GE may be formed using a metal. The gate electrode GE may be formed using nickel, chromium, molybdenum, aluminum, titanium, copper, tungsten and an alloy thereof. The gate electrode GE may be formed as a single layer or a multi layer using the metal. For example, the gate electrode GE may be a triple layer obtained by stacking molybdenum, aluminum and molybdenum one by one, or a double layer obtained by stacking titanium and copper one by one. Alternatively, the gate electrode GE may be a single layer formed by using an alloy of titanium and copper.

The gate insulation layer 911 is provided on the front side of the first insulation substrate 901 to cover the n-th gate line GLn and the n-th gate line GLn.

The semiconductor pattern SM is provided on the gate insulation layer 911. The semiconductor pattern SM is partially overlapped with the gate electrode GE. The semiconductor pattern SM includes an active pattern ACT provided on the gate insulation layer 911 and an ohmic contact layer OC formed on the active pattern ACT. The active pattern ACT may be formed as an amorphous silicon thin film, and the ohmic contact layer OC may be formed as an n+ amorphous silicon thin film. The ohmic contact layer OC is provided between a portion of the active pattern ACT and a source electrode SE described later and between another portion of the active pattern ACT and a drain electrode DE described later. The ohmic contact layer OC makes ohmic contact between the active pattern ACT and the source electrode SE and the drain electrode DE, respectively.

The source electrode SE is branched from the m-th data line DLm and provided. The source electrode SE is formed on the ohmic contact layer OC and is partially overlapped with the gate electrode GE.

The drain electrode DE is separated from the source electrode SE and provided with the semiconductor pattern SM therebetween. The drain electrode DE is formed on the ohmic contact layer OC and is partially overlapped with the gate electrode GE.

The source electrode SE and the drain electrode DE may be formed using nickel, chromium, molybdenum, aluminum, titanium, copper, tungsten and an alloy thereof. The source electrode SE and the drain electrode DE may be formed as a single layer or a multi layer using the metal. For example, the source electrode SE and the drain electrode DE may be a double layer obtained by stacking titanium and copper one by one. Alternatively, the source electrode SE and the drain electrode DE may be a single layer formed by using an alloy of titanium and copper.

The source electrode SE and the drain electrode DE are provided so as to be separated to a certain distance on the semiconductor pattern SM. Thus, the top surface of the active pattern ACT between the source electrode SE and the drain electrode DE is exposed, thereby forming a channel part CH forming a conductive channel between the source electrode SE and the drain electrode DE according to the application of the voltage of the gate electrode GE.

The pixel electrode PE is provided on the drain electrode DE and the gate insulation layer 911. The pixel electrode PE is provided directly on a portion of the drain electrode DE and the gate insulation layer 911 and makes a direct contact with a portion of the drain electrode DE and the gate insulation layer 911.

The pixel electrode PE has an approximately square shape when seen from plane and is not limited thereto. The pixel electrode PE may have diverse shapes according to the shape of a pixel. The pixel electrode PE is formed as a whole plate without pattern such as opening parts therein.

The common electrode CE may include a pattern having an opening part. According to an embodiment of the present invention, the common electrode CE may be extended in one direction and may have an equally-spaced stripe structure. Even though the common electrode CE having a stripe structure is explained as an illustration in this embodiment, the structure of the common electrode CE is not limited thereto in the present invention.

According to another embodiment of the present invention, the first substrate 900 may further include a first alignment layer 915 between the common electrode CE and the liquid crystal layer 1100. The first alignment layer 915 may pre-tilt the liquid crystal molecules in the liquid crystal layer 1100 in one direction. According to an embodiment, the first alignment layer 915 may include at least one selected from the group consisting of polyamic acid, polyimide, lecithin, nylon and PVA. According to another embodiment, the first alignment layer 915 may further include a reactive mesogen material.

According to a further another embodiment of the present invention, the second substrate 1000 may further include a second alignment layer 1015 between the color filter CF and the liquid crystal layer 1100. According to an embodiment, the second alignment layer 1015 may include at least one selected from the group consisting of polyamic acid, polyimide, lecithin, nylon and PVA. According to another embodiment, the second alignment layer 1015 may further include a reactive mesogen material.

The liquid crystal layer 1100 may fill up a space between the first and second substrates 900 and 1000. According to an embodiment, the liquid crystal layer 1100 may include a negative nematic liquid crystal, a positive nematic liquid crystal and a ferroelectric liquid crystal. According to another embodiment, the liquid crystal layer 1100 may include a non-ferroelectric liquid crystal and a ferroelectric liquid crystal. The explanation on the liquid crystal layer 1100 is substantially the same as that explained in the liquid crystal layer in the PVA mode, and detailed description thereof will be omitted.

As described above, since the liquid crystal layer 1100 of the liquid crystal display device in a field fringe switching (FFS) mode includes the ferroelectric liquid crystal together with the nematic liquid crystal, the alignment of the liquid crystal layer may become uniform and the stability of the alignment thereof may be improved. Thus, the luminance of the liquid crystal display device including the liquid crystal layer 1100 may be improved. In addition, since the first and second alignment layers 915 and 1015 further include the reactive mesogen material, the alignment rate and the alignment angle of the liquid crystal molecules in the liquid crystal layer 1100 may be increased, thereby improving optical properties.

Hereinafter, the present invention will be explained in detail through examples and Comparative Example 3. However, the following examples are described only for illustrating the present invention. Thus, the present invention is not limited thereto and may be modified and changed diversely.

Liquid Crystal Display Device in FFS Mode

Comparative Example 3

A liquid crystal display device of FIGS. 1 and 2 including a first substrate including a common electrode having a stripe pattern and a pixel electrode of a whole plate, a second display plate and a liquid crystal layer filling up a space between the first and second display plates was manufactured. The liquid crystal display device was manufactured in a FFS mode.

The liquid crystal layer was manufactured by using about 100 wt % of MLC 6608 ($\Delta n=0.084$, $\Delta \in =-4.3$) of Merck Co. The thickness (cell gap) of the liquid crystal layer of the liquid crystal display device was about 4.5 μm.

Example 15

A liquid crystal display device including a first substrate including a common electrode having a stripe pattern and a pixel electrode of a whole plate, a second display plate and a liquid crystal layer filling up a space between the first and second display plates was manufactured. The liquid crystal display device was manufactured in a FFS mode.

The liquid crystal layer was manufactured by mixing about 97 wt % of MLC 6608 ($\Delta n=0.084$, $\Delta \in =-4.3$) of Merck Co. and about 3 wt % of KFLC 7 ($\Delta n=0.18$) of Kingston Chemical Co. at about 100° C. The thickness of the liquid crystal layer of the liquid crystal display device was about 4.5 μm. The about 3 wt % of the KFLC 7 included about 2.8 wt % of an achiral component and about 0.2 wt % of a chiral component.

Example 16

A liquid crystal display device was manufactured by the same procedure described in Example 15 except for the material of the liquid crystal layer.

The liquid crystal layer was manufactured by mixing about 95 wt % of MLC 6608 ($\Delta n=0.084$, $\Delta \in =-4.3$) of Merck Co. and about 5 wt % of KFLC 10 ($\Delta n=0.18$) of Kingston Chemical Co. at about 100° C. The about 5 wt % of the KFLC 10 included about 4.5 wt % of an achiral component and about 0.5 wt % of a chiral component.

Example 17

A liquid crystal display device was manufactured by the same procedure described in Example 15 except for the material of the liquid crystal layer.

The liquid crystal layer was manufactured by mixing about 90 wt % of MLC 6608 ($\Delta n=0.084$, $\Delta \in =-4.3$) of Merck Co. and about 10 wt % of KFLC 3 ($\Delta n=0.18$) of Kingston Chemical Co. at about 100° C. The about 10 wt % of the KFLC 3 included about 9.7 wt % of an achiral component and about 0.3 wt % of a chiral component.

Example 18

A liquid crystal display device was manufactured by the same procedure described in Example 15 except for the material of the liquid crystal layer.

The liquid crystal layer was manufactured by mixing about 90 wt % of MLC 6608 ($\Delta n=0.084$, $\Delta \in =-4.3$) of Merck Co. and about 10 wt % of KFLC 10 ($\Delta n=0.18$) of Kingston Chemical Co. at about 100° C. The about 10 wt % of the KFLC included about 9.0 wt % of an achiral component and about 1.0 wt % of a chiral component.

Example 19

A liquid crystal display device was manufactured by the same procedure described in Example 15 except for the material of the liquid crystal layer.

The liquid crystal layer was manufactured by mixing about 85 wt % of MLC 6608 ($\Delta n=0.084$, $\Delta \in =-4.3$) of Merck Co. and about 15 wt % of KFLC 5 ($\Delta n=0.18$) of Kingston Chemical Co. at about 100° C. The about 15 wt % of the KFLC 5 included about 14.3 wt % of an achiral component and about 0.7 wt % of a chiral component.

Example 20

A liquid crystal display device was manufactured by the same procedure described in Example 15 except for the material of the liquid crystal layer.

The liquid crystal layer was manufactured by mixing about 80 wt % of MLC 6608 ($\Delta n=0.084$, $\Delta\in=-4.3$) of Merck Co. and about 20 wt % of KFLC 7 ($\Delta n=0.18$) of Kingston Chemical Co. at about 100° C. The about 20 wt % of the KFLC 7 included about 18.6 wt % of an achiral component and about 1.6 wt % of a chiral component.

Example 21

A liquid crystal display device was manufactured by the same procedure described in Example 15 except for the material of the liquid crystal layer.

The liquid crystal layer was manufactured by mixing about 70 wt % of MLC 6608 ($\Delta n=0.084$, $\Delta\in=-4.3$) of Merck Co. and about 30 wt % of KFLC 3 ($\Delta n=0.18$) of Kingston Chemical Co. at about 100° C. The about 30 wt % of the KFLC 3 included about 29.1 wt % of an achiral component and about 0.9 wt % of a chiral component.

The constituting components and the thickness of the liquid crystal layer in Comparative Example 3 and Examples 15 to 21 are illustrated in the following Table 3.

TABLE 3

| | Nematic liquid crystal | Smectic liquid crystal | | Thickness of liquid crystal layer |
| --- | --- | --- | --- | --- |
| | | Achiral component | Chiral component | |
| Comparative Example 3 | 100 wt % | 0 | 0 | 4.5 μm |
| Example 15 | 97 wt % | 2.8 wt % | 0.2 wt % | 4.5 μm |
| Example 16 | 95 wt % | 4.5 wt % | 0.5 wt % | 4.5 μm |
| Example 17 | 90 wt % | 9.7 wt % | 0.3 wt % | 4.5 μm |
| Example 18 | 90 wt % | 9.0 wt % | 1.0 wt % | 4.5 μm |
| Example 19 | 85 wt % | 14.3 wt % | 0.7 wt % | 4.5 μm |
| Example 20 | 80 wt % | 18.6 wt % | 1.6 wt % | 4.5 μm |
| Example 21 | 70 wt % | 29.1 wt % | 0.9 wt % | 4.5 μm |

Evaluation of Transmittance

Figure 27:
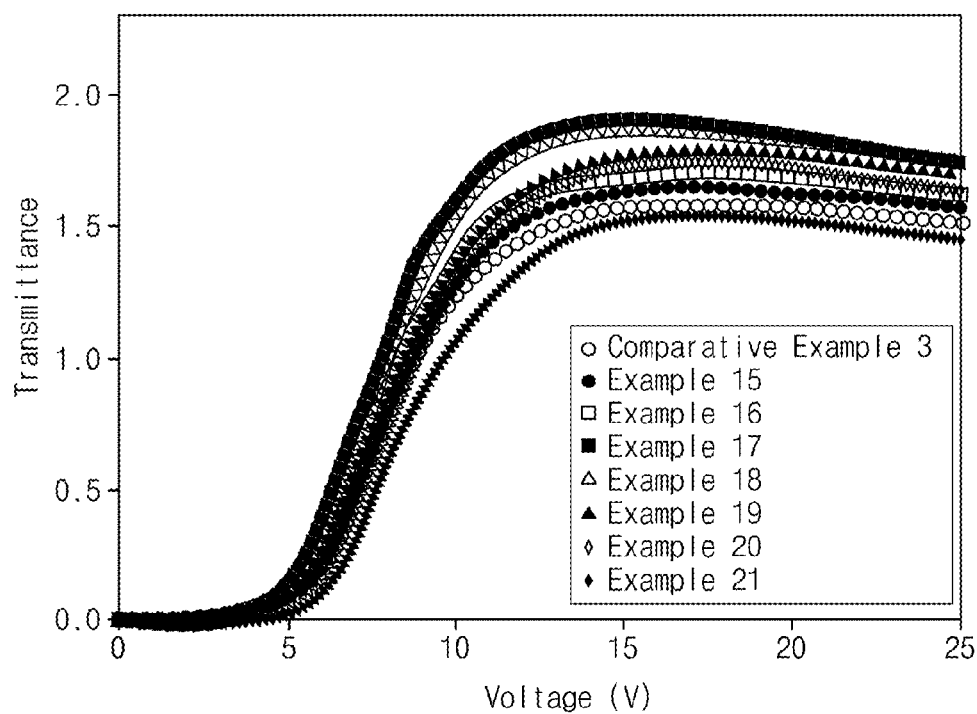
FIG. 27 is graph for comparing the transmittance of the liquid crystal display devices of Comparative Example 3 and Examples 15 to 21 according to an applied voltage.

FIG. 27 is a graph for comparing the transmittance of the liquid crystal display devices according to Comparative Example 3 and Examples 15 to 21. In FIG. 27, the graph illustrates the transmittance according to an applied voltage. In FIG. 27, x-axis represents an applied voltage, and the unit thereof is [V], and y-axis represents transmittance.

Referring to FIG. 27, the transmittance of the liquid crystal display devices according to Examples 15 to 21 is good in general when compared to that of a liquid crystal display device according to Comparative Example 3. In more detail, the transmittance of the liquid crystal display device of Example 15 is increased very slightly when compared to that of Comparative Example 3. In addition, the transmittance of the liquid crystal display devices of Examples 16 to 20 is from about 1.8 to about 2.0 and is excellent when compared to that of the liquid crystal display device of Comparative Example 3 of which transmittance is about 1.5.

Through the above evaluation, the achiral smectic liquid crystal in the liquid crystal layer of Examples 15 to 21 is expected to induce the alignment of the liquid crystal molecules uniformly and stably. Thus, the transmittance of the liquid crystal display devices of Examples 15 to 21 is better than that of the liquid crystal display device of Comparative Example 3.

Figure 28A:
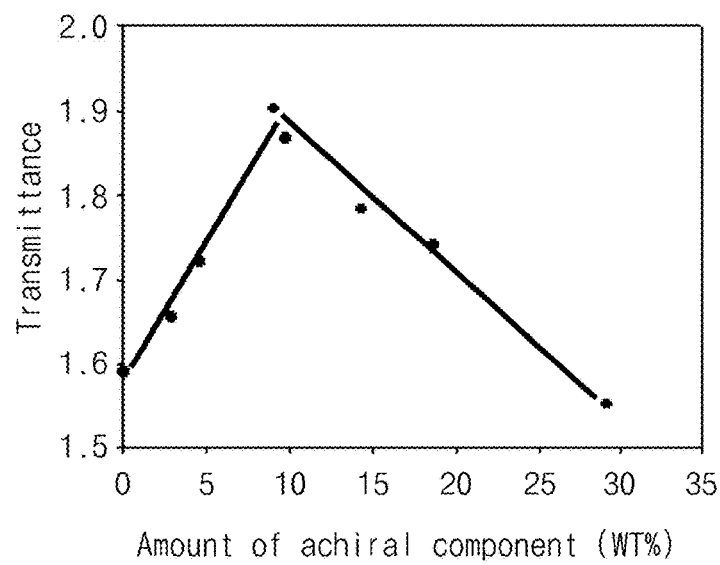
FIG. 28A is a graph illustrating the transmittance of the liquid crystal display device of Comparative Example 3 and the transmittance of the liquid crystal display devices of Examples 15 to 21 according to the amount of an achiral component in a liquid crystal layer.
Figure 28B:
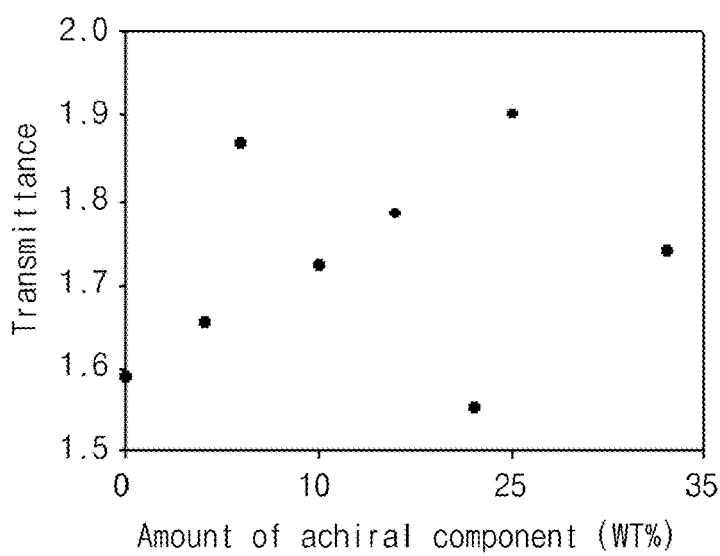
FIG. 28B is a graph illustrating the transmittance of the liquid crystal display device of Comparative Example 3 and the transmittance of the liquid crystal display devices of Examples 15 to 21 according to the amount of a chiral component in a liquid crystal layer.

FIG. 28A is a graph illustrating the transmittance of the liquid crystal display device of Comparative Example 3 and the transmittance the liquid crystal display devices of Examples 15 to 21 according to the amount of an achiral component in a liquid crystal layer, and FIG. 28B is a graph illustrating the transmittance of the liquid crystal display device of Comparative Example 3 and the transmittance the liquid crystal display devices of Examples 15 to 21 according to the amount of a chiral component in a liquid crystal layer. In FIGS. 28A and 28B, x-axes represent the amounts of the achiral component and the chiral component, and the unit thereof is [wt %], and y-axes represent transmittance.

Referring to FIG. 28A, when the amount of the achiral component in the liquid crystal layer is about 10 wt %, the highest transmittance is shown. The transmittance is somewhat low when the amount of the achiral component increases above 10 wt %, however is higher than that when the achiral component is not included. However, the transmittance is lower than that of Comparative Example 3 only when the achiral component is about 30 wt %.

Referring to FIG. 28B, when the chiral component is in the liquid crystal layer, the transmittance is higher in general when compared to that when the chiral component is not included. However, the transmittance is lower than that of Comparative Example 3 only when the chiral component is about 0.7 wt %.

Evaluation of Response Time

Figure 29A:
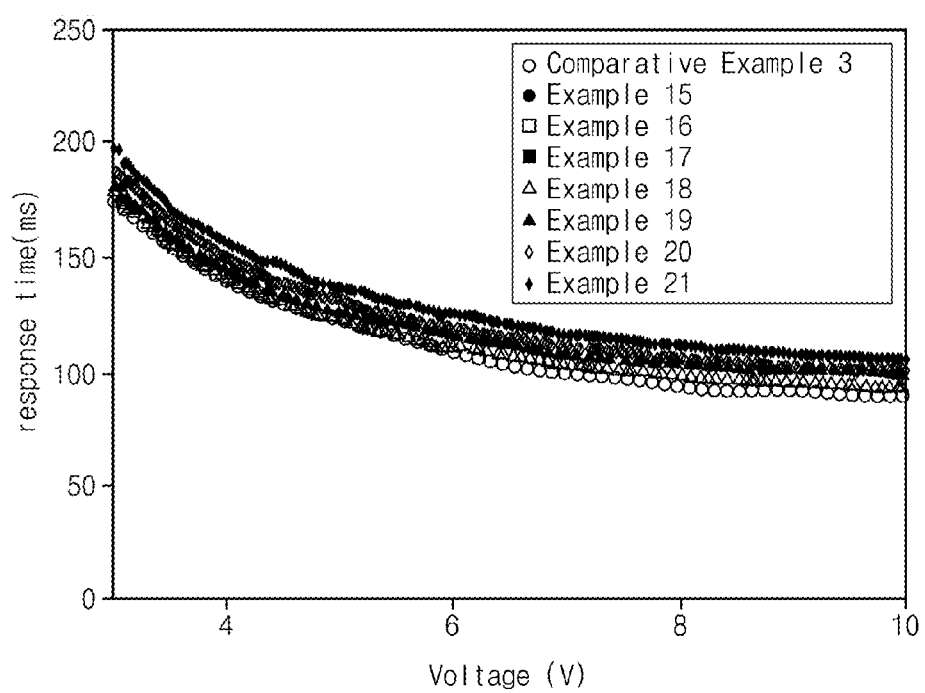
FIG. 29A is a graph for comparing the response time of the liquid crystal display devices of Comparative Example 3 and Examples 15 to 21.

FIG. 29A is a graph for comparing the response time of the liquid crystal display devices of Comparative Example 3 and Examples 15 to 21. In FIG. 29A, x-axis represents an applied voltage, and the unit thereof is [V], and y-axis represents response time, and the unit thereof is [ms].

Referring to FIG. 29A, the response time of the liquid crystal display devices of Examples 15 to 21 increases to a certain degree when compared to that of the liquid crystal display device of Comparative Example 3. Meanwhile, the response time of the liquid crystal display device including a liquid crystal layer of Example 18 is substantially similar to that of Comparative Example 3. The response time increased to a certain degree is expected to decrease by changing the amount or the kind of the nematic liquid crystal. In addition, the increased response time is expected to decrease by additionally adding a reactive mesogen material in the liquid crystal layer.

Figure 29B:
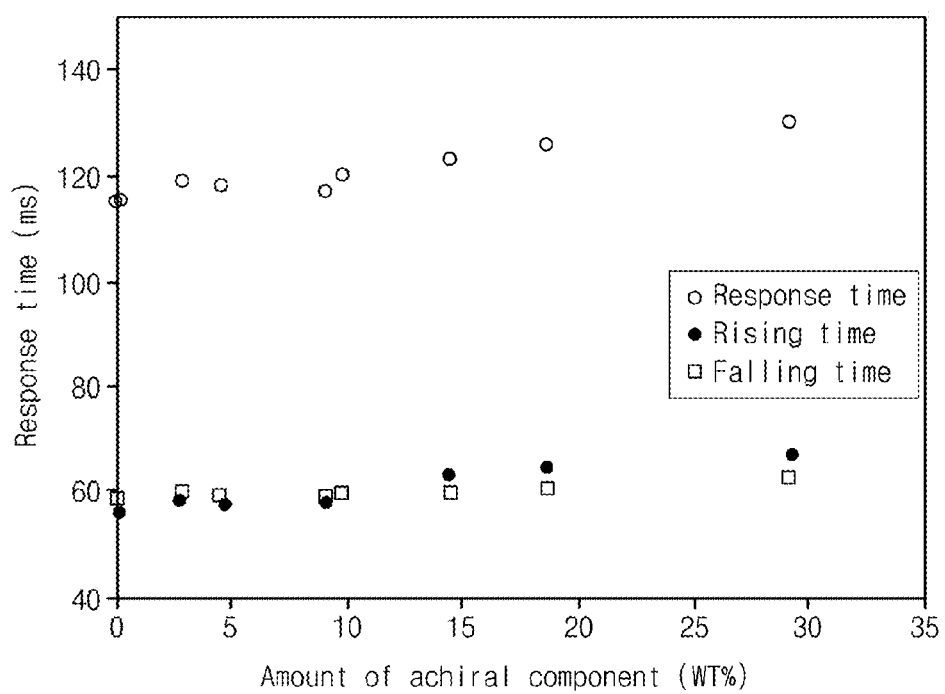
FIG. 29B is a graph illustrating the rising time and the falling time of the liquid crystal display device of Comparative Example 3 and the rising time and the falling time of the liquid crystal display devices of Examples 15 to 21 according to the amount of an achiral component.

FIG. 29B is a graph illustrating the rising time and the falling time of the liquid crystal display device of Comparative Example 3 and the rising time and the falling time of the liquid crystal display devices of Examples 15 to 21 according to the amount of an achiral component. In FIG. 29B, x-axis represents the amount of an achiral component, and the unit thereof is [wt %], and y-axis represents time, and the unit thereof is [ms].

When the target transmittance of a liquid crystal display device is set to 100%, it takes time to exhibit the transmittance of 100% when the liquid crystal display device is turned on. The rising time means the time necessary for exhibiting the transmittance from about 10% to about 90% after turning on the liquid crystal display device. On the contrary, it takes time to exhibit the transmittance of 0% when the liquid crystal display device is turned off. The falling time means the time necessary for exhibiting the transmittance from about 90% to about 10% after turning off the liquid crystal display device. The response time is the sum of the rising time and the falling time.

The rising time is about 50 ms, the falling time is about 60 ms and the response time is about 110 ms for the liquid crystal display device of Comparative Example 3. Referring to the data of Examples 15 to 21, the rising time and the falling time increase to a certain degree, and so, the response time increases to a certain degree when compared to that of Comparative Example 3.

Figure 29C:
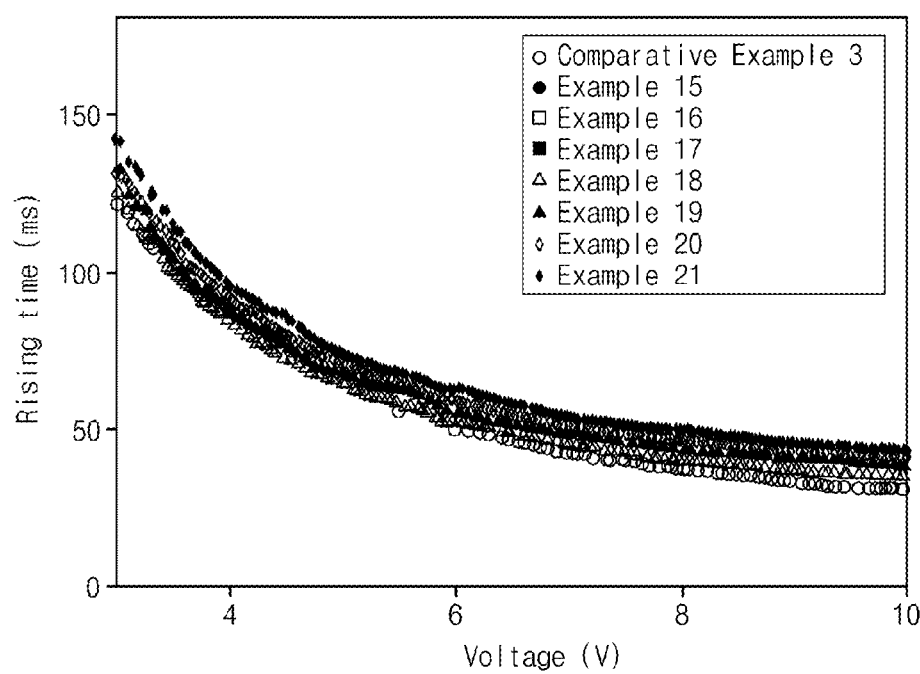
FIG. 29C is a graph illustrating the rising time of the liquid crystal display devices of Comparative Example 3 and Examples 15 to 21.
Figure 29D:
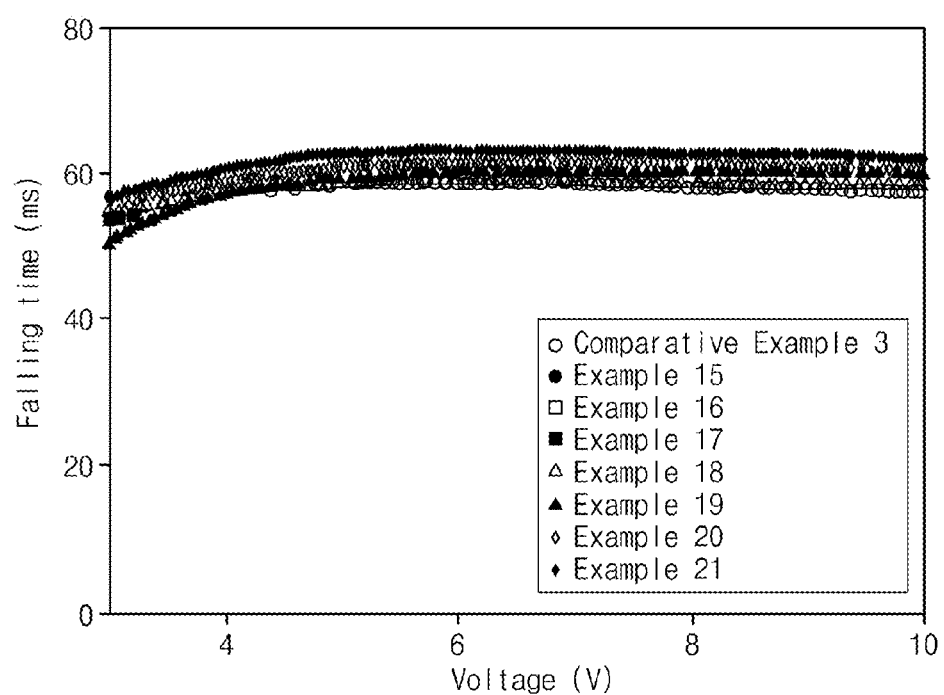
FIG. 29D is a graph illustrating the falling time of the liquid crystal display devices of Comparative Example 3 and Examples 15 to 21 according to an applied voltage.

FIG. 29C is a graph illustrating the rising time of the liquid crystal display devices of Comparative Example 3 and Examples 15 to 21 according to an applied voltage, and FIG. 29D is a graph illustrating the falling time of the liquid crystal display devices of Comparative Example 3 and Examples 15 to 21 according to an applied voltage. In FIGS. 29C and 29D, x-axes represent an applied voltage, and the unit thereof is [V], and y-axes represent time, and the unit thereof is [ms].

Referring to FIG. 29C, the rising rate of the liquid crystal display devices of Examples 15 to 21 is increased to a certain degree when compared to that of the liquid crystal display device of Comparative Example 3. Meanwhile, the rising rate of the liquid crystal display device including the liquid crystal layer of Example 18 is substantially similar to that of Comparative Example 3.

Referring to FIG. 29D, the falling rate of the liquid crystal display devices of Examples 15 to 21 is increased to a certain degree when compared to that of the liquid crystal display device of Comparative Example 3. Meanwhile, the falling rate of the liquid crystal display devices including the liquid crystal layers of Examples 18 and 19 is substantially similar to that of Comparative Example 3.

The somewhat increased rising rate and falling rate may be expected to decrease by changing the amount or the kind of the nematic liquid crystal. Alternatively, the increased rising rate and the falling rate may be lowered by additionally adding a reactive mesogen material in the liquid crystal layer.

Evaluation of Textures

FIGS. 30A to 30H and FIGS. 31A to 31H are textures of the liquid crystal display devices of Comparative Example 3 and Examples 15 to 21.

Figure 30A:
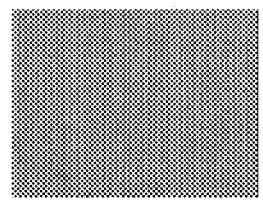
FIGS. 30A to 30H and 31A to 31H are textures of the liquid crystal display devices of Comparative Example 3 and Examples 15 to 21.
Figure 30C:
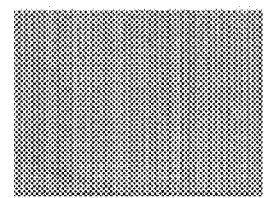
Figure 30B:
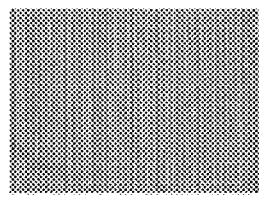
Figure 30D:
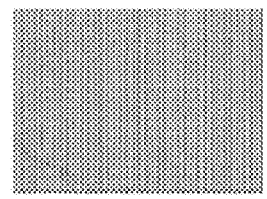
Figure 30E:
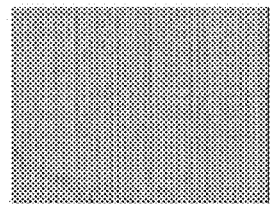
Figure 30F:
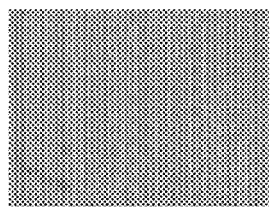
Figure 30G:
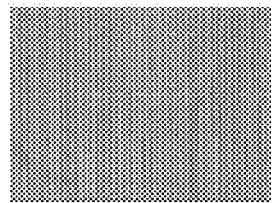
Figure 30H:
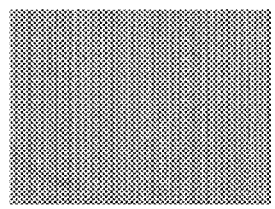
Figure 31A:
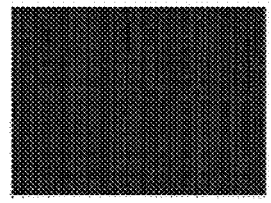
Figure 31C:
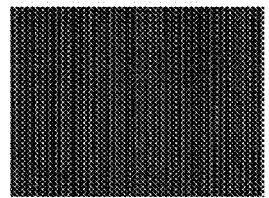
Figure 31B:
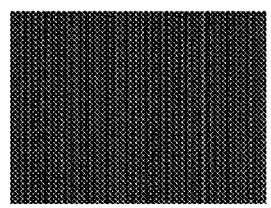
Figure 31D:
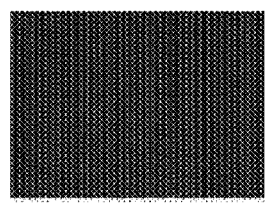
Figure 31E:
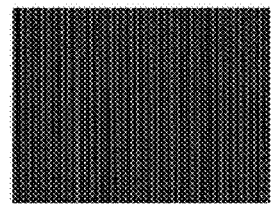
Figure 31G:
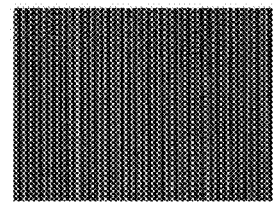
Figure 31F:
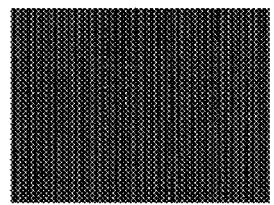
Figure 31H:
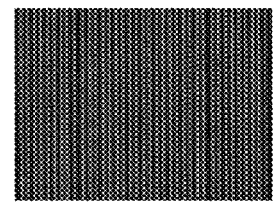

In the liquid crystal display devices of Comparative Example 3 and Examples 15 to 21, a voltage of about 7 V was applied, and a cross polarization plate was rotated to obtain white images in FIGS. 30A to 30H. Referring to FIG. 30A, defects appearing black are shown at the edge portions of the slit or at the border of the slits. Referring to FIGS. 30B to 30H, the images are brighten overall when compared to that of FIG. 30A. In addition, the defects appearing at the border of the slits as well as at the edge portions of the slit are removed from the images of FIGS. 30D to 30F.

In the liquid crystal display devices of Comparative Example 3 and Examples 15 to 21, a voltage of about 7 V was applied, and a cross polarization plate was rotated to obtain black images in FIGS. 31A to 31H. When comparing the images of FIGS. 31A and 31B, the light leakage phenomena are relaxed in the image of FIG. 31B.

When inspecting the textures, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 32A:
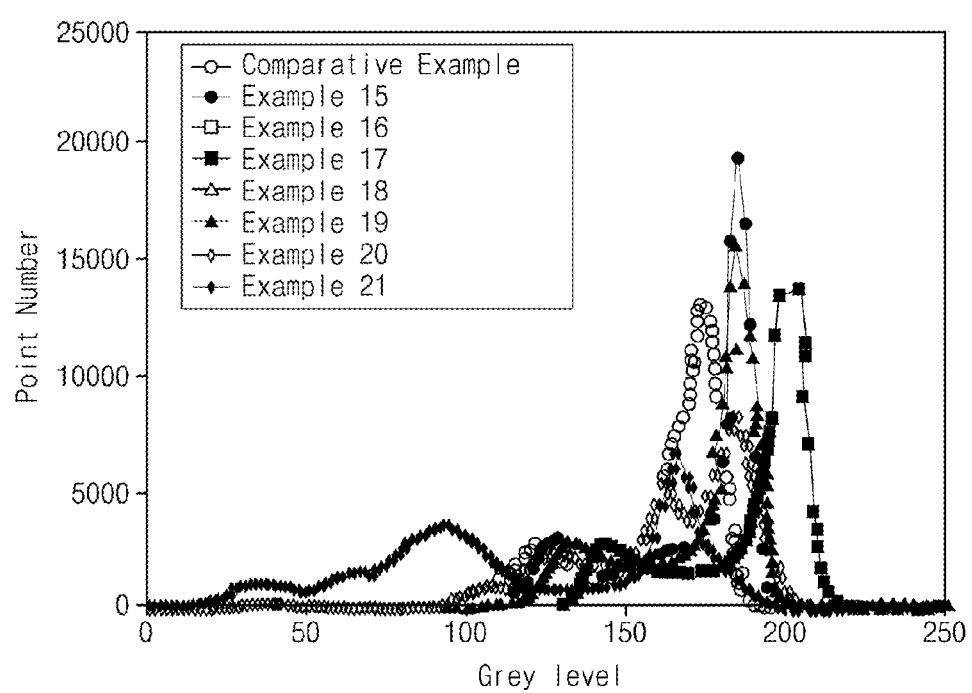
FIGS. 32A and 32B are graphs illustrating the transmittance of the textures of Comparative Example 3 and Examples 15 to 21 according to distance.
Figure 32B:
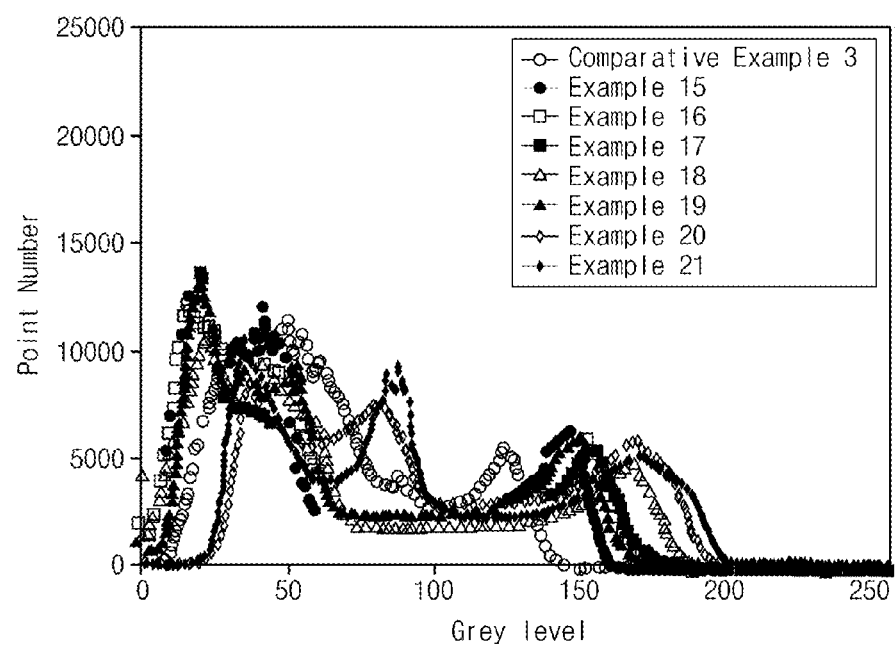

FIGS. 32A and 32B are graphs illustrating the transmittance of the textures of Comparative Example 3 and Examples 15 to 21 according to the distance of the texture.

FIGS. 32A and 32B are evaluated by 256 ($2^8$) grey levels. As the grey level approaches to 0, grey closes to black, and the concentration of the grey are represented by the levels from 0 to 255.

FIG. 32A illustrates the grey level of the textures in FIGS. 30A to 30H, and the white images are found around the grey level from about 150 to about 230. The white image of Comparative Example 3 in FIG. 32A is found a lot from about 150 to about 200 of the grey level, and the peak width thereof is found wide. The white images of Examples 15, 2 and 5 are found a lot from about 180 to about 200 of the grey level, and the peak width thereof is found narrower than that of Comparative Example 3. In addition, the white images are found a lot around the grey level from about 190 to about 230 in Examples 17 and 18.

FIG. 32B represents the grey level of the textures in FIGS. 31A to 31H, and the black images are found from about 0 to about 50 of the grey level. Two peaks of the black image of Comparative Example 3 are found at about 50 and about 130, and the peak width thereof is found wide. The black images of Examples 15 to 19 are found at about 20, about 60 and about 150, and the peak width thereof is found the highest at about 20, and the peak width is somewhat narrow.

When inspecting the graphs in FIGS. 32A and 32B, the effects are somewhat slight when compared to those of Comparative Example 3 in general, however, the liquid crystal display devices of Examples 17 and 19 exhibit good grey levels. The alignment of the liquid crystal molecules in the liquid crystal layer including the smectic material is uniform and stable when compared to that of a liquid crystal layer not including a ferroelectric material, thereby improving the luminance of a liquid crystal display device.

Figure 33A:
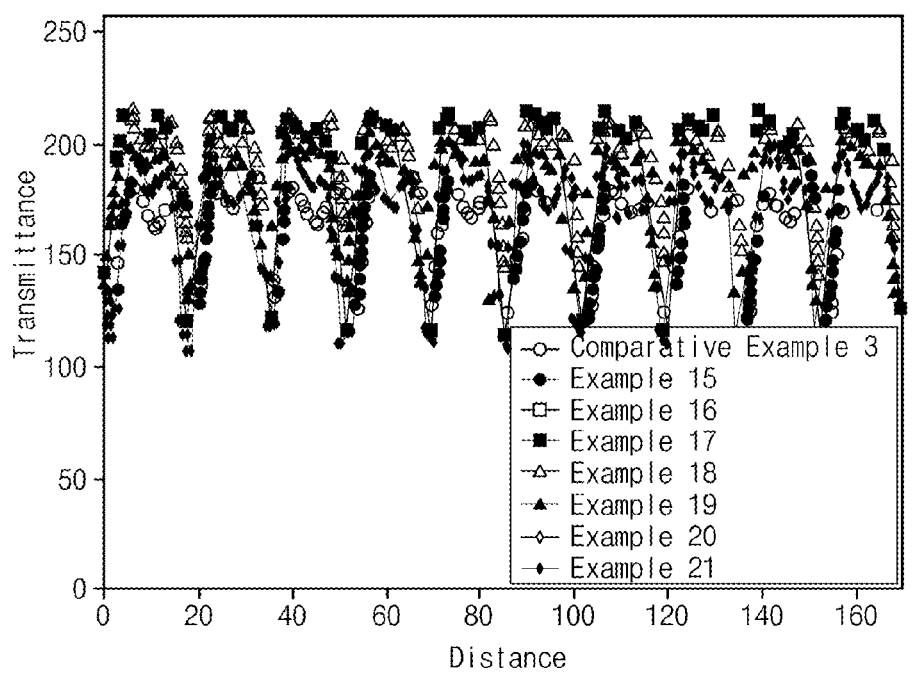
FIGS. 33A and 33B are graphs illustrating the transmittance of the textures of Comparative Example 3 and Examples 15 to 21 according to distance.
Figure 33B:
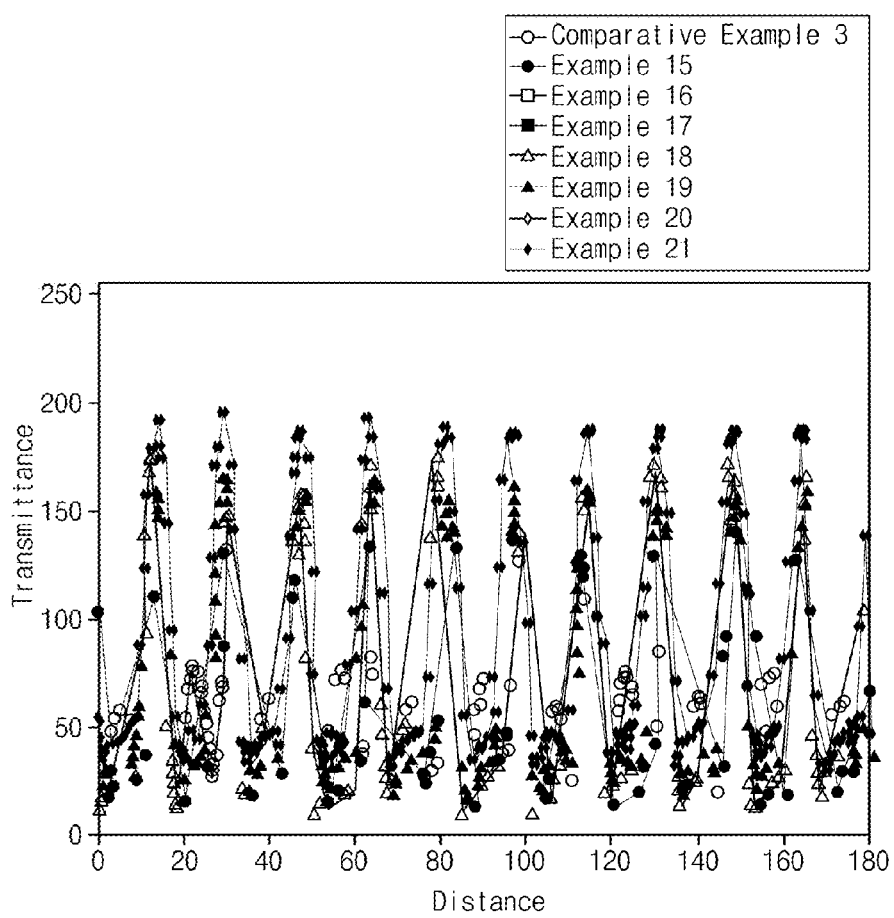

FIGS. 33A and 33B are graphs illustrating the transmittance of the textures of Comparative Example 3 and Examples 15 to 21 according to the distance of the textures.

FIG. 33A illustrates transmittance change according to the distance of the slit after cutting the textures of FIGS. 30A to 30H in one direction. Referring to FIG. 32A, the transmittance around the slit is about 120, and the portions around the slit are found darker than the portions other than the slit. The transmittance of Examples 17 and 18 are found higher than that of Comparative Example 3 around the slits.

FIG. 33B illustrates transmittance change according to the distance of the slit after cutting the textures of FIGS. 31A to 31H in one direction. Referring to FIG. 32B, the transmittance around the slit is about 80, and light leakage defects are found around the slit of Comparative Example 3. The transmittance around the slit of Examples 17 and 18 is less than or equal to about 80, and the light leakage defects are found to be solved to a certain degree.

[[Liquid Crystal Display Device in IPS Mode]]

Figure 34:
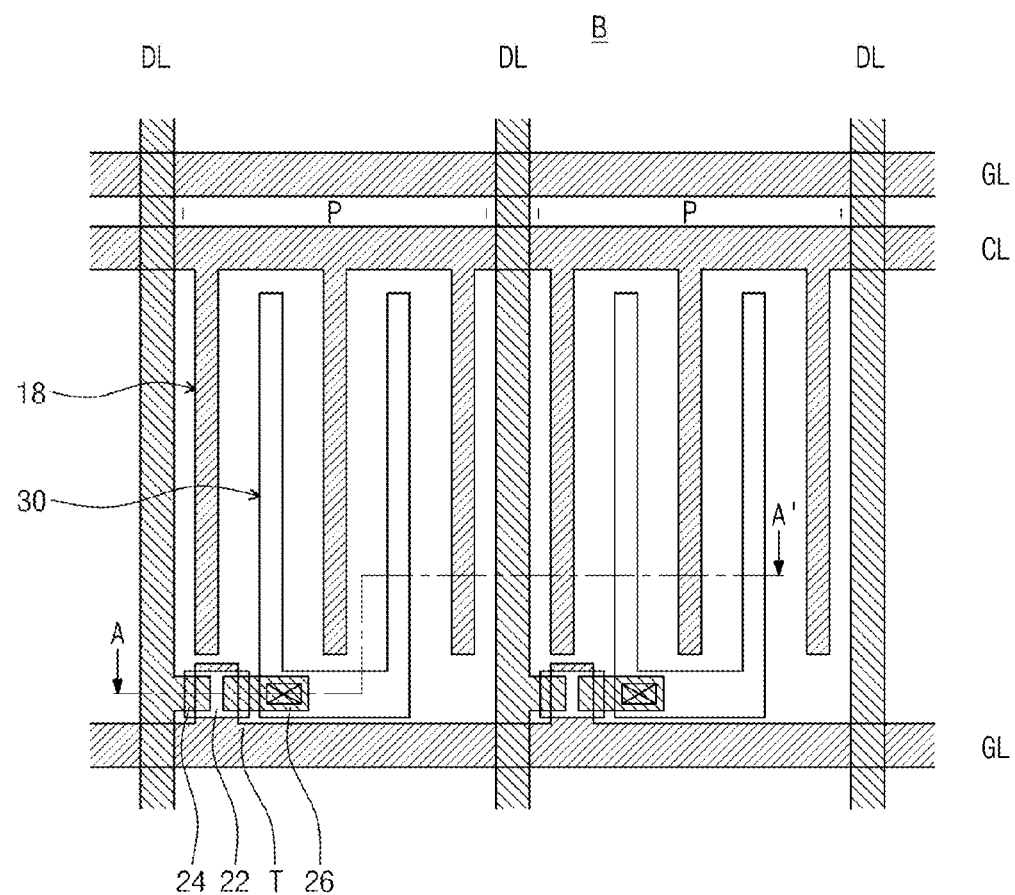
FIGS. 34 and 35 are a plan view and a cross-sectional view for explaining a liquid crystal display device according to an embodiment of the present invention.
Figure 35:
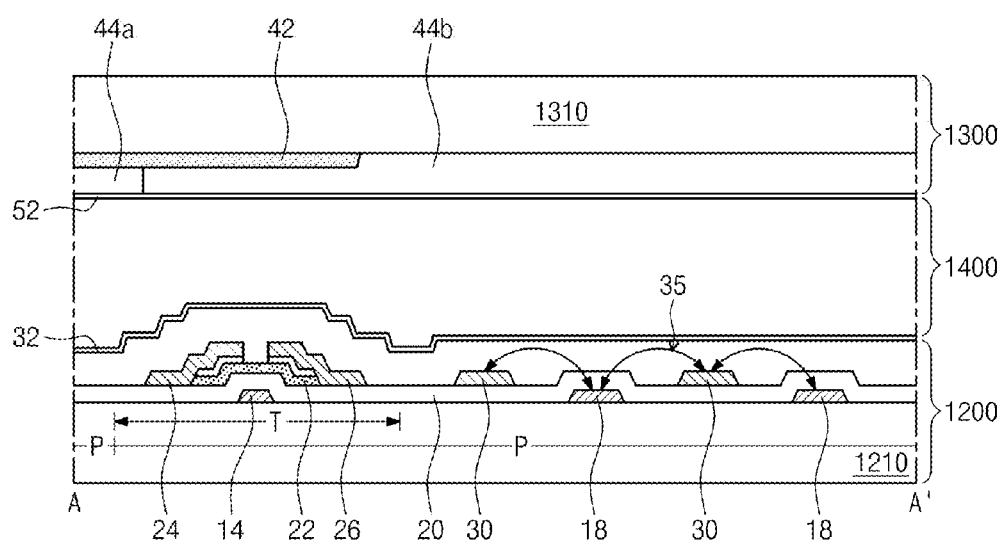

FIGS. 34 and 35 are a plan view and a cross-sectional view for explaining a liquid crystal display device according to an embodiment of the present invention.

Referring to FIGS. 34 and 35, a liquid crystal display device B includes an upper display plate 1300, a opposing lower display plate 1200, and a liquid crystal layer 1400 disposed between the upper display plate 1300 and the lower display plate 1200. The liquid crystal display device B may be in an in plane switching (IPS) mode.

The lower display plate 1200 may include a thin film transistor T, a common electrode 18 and a pixel electrode 30 in each of a plurality of pixel areas P defined on a transparent and insulating first substrate 1210. The thin film transistor T may include a gate electrode 14, a semiconductor layer 22 formed on the gate electrode 14 with an insulation layer 20 therebetween, and source electrode and drain electrodes 24 and 26 separately formed from each other on the semiconductor layer 22.

The common electrode 18 and the pixel electrode 30 may be separated in parallel to each other on the same first substrate 1210. The common electrode 18 may be formed as the same layer using the same material as the gate electrode 14, and the pixel electrode 30 may be formed as the same layer using the same material as the source and drain electrodes 24 and 26.

A gate line GL extended along a first side direction of a pixel area P and a data line DL extended in a second side direction that is perpendicular to the first side direction may be included, and a common line CL for applying a voltage to the common electrode 18 may be provided. The common line CL may be extended along a third side of the pixel area P separated from the gate line GL in parallel. In the pixel area, a common electrode 18 having a first pattern and a pixel electrode 30 having a second pattern may be provided. The first pattern may have a structure not overlapping with the second pattern. For example, the common electrode 18 may have a first pattern extended in a perpendicular direction to the common line CL and spaced in parallel to each other. The pixel electrode 30 may have a second pattern separated between the common electrodes 18 in parallel to the common electrode 18. In this case, the first pattern and the second pattern may not be overlapped with each other. In this embodiment, each of the first and second patterns is explained to have a line shape, however the structure of the first and second patterns is not limited thereto in the present invention.

The upper display plate 1300 includes a black matrix 42 formed at a corresponding part to the gate line GL, the data line DL and the thin film transistor T and color filters 44*a* and 44*b* formed in correspondence to the pixel area P on the transparent and insulating second substrate 1310.

According to another embodiment of the present invention, the lower display plate 1200 may further include a first alignment layer 32 between the common electrode 30 and the liquid crystal layer. The first alignment layer 32 may pre-tilt liquid crystal molecules in the liquid crystal layer 1400 in one direction. According to an embodiment, the first alignment layer 32 may include at least one selected from the group consisting of polyamic acid, polyimide, lecithin, nylon and PVA. According to another embodiment, the first alignment layer 32 may further include a reactive mesogen material.

According to a further another embodiment of the present invention, the upper display plate 1300 may further include a second alignment layer 52 between the color filters 44*a* and 44*b* and the liquid crystal layer 1400. According to an embodiment, the second alignment layer 52 may include at least one selected from the group consisting of polyamic acid, polyimide, lecithin, nylon and PVA. According to another embodiment, the second alignment layer 52 may further include a reactive mesogen material.

According to an embodiment, the liquid crystal layer 1400 may include a negative nematic liquid crystal, a positive nematic liquid crystal and a ferroelectric liquid crystal. According to another embodiment, the liquid crystal layer 300 may include a non-ferroelectric liquid crystal and a ferroelectric liquid crystal. The explanation on the liquid crystal layer 1400 is substantially the same as the description of the liquid crystal layer in the above PVA mode, and detailed description thereof will be omitted.

As described above, since the liquid crystal layer 1400 of the liquid crystal display device in the IPS mode includes a ferroelectric liquid crystal together with the nematic liquid crystal, uniform alignment of the liquid crystal layer may be attained, and the stability of the alignment may be improved. Thus, the luminance of the liquid crystal display device including the liquid crystal layer 1400 may be improved. In addition, since at least one of the first and second alignment layers 32 and 52 further include the reactive mesogen material, the alignment rate and the alignment angle of the liquid crystal molecules in the liquid crystal layer 1400 may be increased, thereby improving optical properties.

Hereinafter, the present invention will be explained in detail through examples and Comparative Example 4. However, the following examples are described only for illustrating the present invention. Thus, the present invention is not limited thereto and may be modified and changed diversely.

Liquid Crystal Display Device in IPS Mode

Comparative Example 4

A liquid crystal display device of FIGS. 1 and 2 including a first substrate including a common electrode having a line pattern and a pixel electrode having a line pattern, a second display plate and a liquid crystal layer filling up a space between the first and second display plates was manufactured. The liquid crystal display device was manufactured in an IPS mode.

The liquid crystal layer was manufactured by using about 100 wt % of MLC 6608 ($\Delta n=0.084$, $\Delta\varepsilon=-4.3$) of Merck Co. The thickness (cell gap) of the liquid crystal layer of the liquid crystal display device was about 4.5 μm.

Example 22

A liquid crystal display device including a first substrate including a common electrode having a line pattern and a pixel electrode having a line pattern, a second display plate and a liquid crystal layer filling up a space between the first and second display plates was manufactured. The liquid crystal display device was manufactured in an IPS mode.

The liquid crystal layer was manufactured by mixing about 97 wt % of MLC 6608 ($\Delta n=0.084$, $\Delta\varepsilon=-4.3$) of Merck Co. and about 3 wt % of KFLC 7 ($\Delta n=0.18$) of Kingston Chemical Co. at about 100° C. The thickness of the liquid crystal layer of the liquid crystal display device was about 4.5 μm. The about 3 wt % of the KFLC 7 included about 2.8 wt % of an achiral component and about 0.2 wt % of a chiral component.

Example 23

A liquid crystal display device was manufactured by the same procedure described in Example 22 except for the material of the liquid crystal layer.

The liquid crystal layer was manufactured by mixing about 95 wt % of MLC 6608 ($\Delta n=0.084$, $\Delta\varepsilon=-4.3$) of Merck Co. and about 5 wt % of KFLC 10 ($\Delta n=0.18$) of Kingston Chemical Co. at about 100° C. The about 5 wt % of the KFLC 10 included about 4.5 wt % of an achiral component and about 0.5 wt % of a chiral component.

Example 24

A liquid crystal display device was manufactured by the same procedure described in Example 22 except for the material of the liquid crystal layer.

The liquid crystal layer was manufactured by mixing about 90 wt % of MLC 6608 (Δn=0.084, Δ∈=−4.3) of Merck Co. and about 10 wt % of KFLC 3 (Δn=0.18) of Kingston Chemical Co. at about 100° C. The about 10 wt % of the KFLC 3 included about 9.7 wt % of an achiral component and about 0.3 wt % of a chiral component.

Example 25

A liquid crystal display device was manufactured by the same procedure described in Example 22 except for the material of the liquid crystal layer.

The liquid crystal layer was manufactured by mixing about 90 wt % of MLC 6608 (Δn=0.084, Δ∈=−4.3) of Merck Co. and about 10 wt % of KFLC 10 (Δn=0.18) of Kingston Chemical Co. at about 100° C. The about 10 wt % of the KFLC included about 9.0 wt % of an achiral component and about 1.0 wt % of a chiral component.

Example 26

A liquid crystal display device was manufactured by the same procedure described in Example 22 except for the material of the liquid crystal layer.

The liquid crystal layer was manufactured by mixing about 85 wt % of MLC 6608 (Δn=0.084, Δ∈=−4.3) of Merck Co. and about 15 wt % of KFLC 5 (Δn=0.18) of Kingston Chemical Co. at about 100° C. The about 15 wt % of the KFLC 5 included about 14.3 wt % of an achiral component and about 0.7 wt % of a chiral component.

Example 27

A liquid crystal display device was manufactured by the same procedure described in Example 22 except for the material of the liquid crystal layer.

The liquid crystal layer was manufactured by mixing about 80 wt % of MLC 6608 (Δn=0.084, Δ∈=−4.3) of Merck Co. and about 20 wt % of KFLC 7 (Δn=0.18) of Kingston Chemical Co. at about 100° C. The about 20 wt % of the KFLC 7 included about 18.6 wt % of an achiral component and about 1.6 wt % of a chiral component.

Example 28

A liquid crystal display device was manufactured by the same procedure described in Example 22 except for the material of the liquid crystal layer.

The liquid crystal layer was manufactured by mixing about 70 wt % of MLC 6608 (Δn=0.084, Δ∈=−4.3) of Merck Co. and about 30 wt % of KFLC 3 (Δn=0.18) of Kingston Chemical Co. at about 100° C. The about 30 wt % of the KFLC 3 included about 29.1 wt % of an achiral component and about 0.9 wt % of a chiral component.

The constituting components and the thickness of the liquid crystal layer in Comparative Example 4 and Examples 22 to 28 are illustrated in the following Table 4.

TABLE 4

| | Nematic liquid crystal | Smectic liquid crystal | | Thickness of liquid crystal layer |
| --- | --- | --- | --- | --- |
| | | Achiral component | Chiral component | |
| Comparative Example 4 | 100 wt % | 0 | 0 | 4.5 μm |
| Example 22 | 97 wt % | 2.8 wt % | 0.2 wt % | 4.5 μm |
| Example 23 | 95 wt % | 4.5 wt % | 0.5 wt % | 4.5 μm |
| Example 24 | 90 wt % | 9.7 wt % | 0.3 wt % | 4.5 μm |
| Example 25 | 90 wt % | 9.0 wt % | 1.0 wt % | 4.5 μm |
| Example 26 | 85 wt % | 14.3 wt % | 0.7 wt % | 4.5 μm |
| Example 27 | 80 wt % | 18.6 wt % | 1.6 wt % | 4.5 μm |
| Example 28 | 70 wt % | 29.1 wt % | 0.9 wt % | 4.5 μm |

Evaluation of Transmittance

Figure 36:
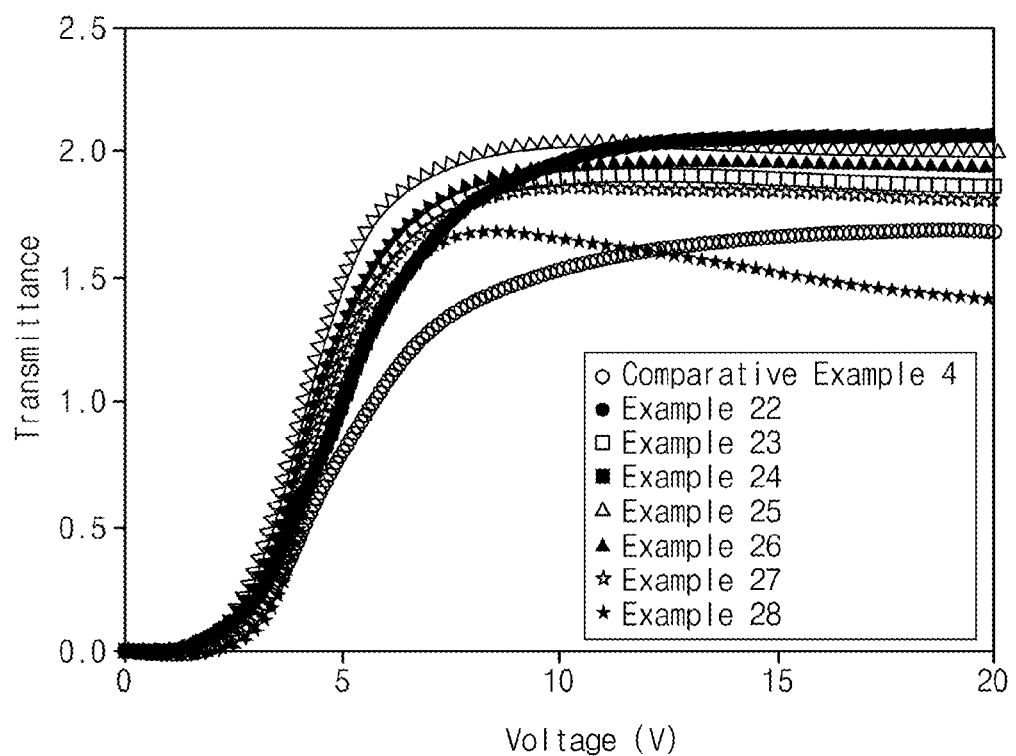
FIG. 36 is a graph for comparing the transmittance of the liquid crystal display devices of Comparative Example 4 and Examples 22 to 28 according to an applied voltage.

FIG. 36 is a graph for comparing the transmittance of the liquid crystal display devices according to Comparative Example 4 and Examples 22 to 28. In FIG. 36, the graph illustrates the transmittance according to an applied voltage. In FIG. 36, x-axis represents an applied voltage, and the unit thereof is [V], and y-axis represents transmittance.

Referring to FIG. 36, the transmittance of the liquid crystal display devices according to Examples 22 to 28 is good in general when compared to that of a liquid crystal display device according to Comparative Example 4. However, the transmittance of the liquid crystal display device of Example 28 is increased very slightly when compared to that of Comparative Example 4.

Through the above evaluation, the achiral smectic liquid crystal in the liquid crystal layer of Examples 22 to 27 is expected to induce the alignment of the liquid crystal molecules uniformly and stably. Thus, the transmittance of the liquid crystal display devices of Examples 22 to 27 is better than that of the liquid crystal display device of Comparative Example 4.

Figure 37A:
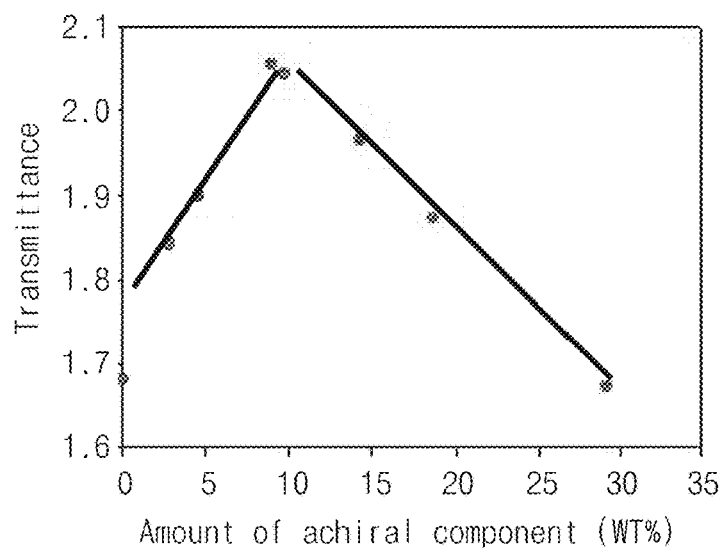
FIG. 37A is a graph illustrating the transmittance of the liquid crystal display device of Comparative Example 4 and the transmittance of the liquid crystal display devices of Examples 22 to 28 according to the amount of an achiral component in a liquid crystal layer.
Figure 37B:
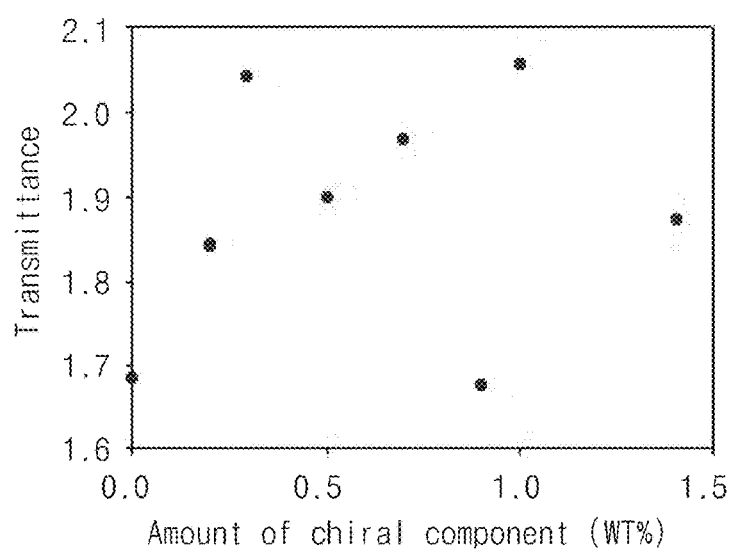
FIG. 37B is a graph illustrating the transmittance of the liquid crystal display device of Comparative Example 4 and the transmittance of the liquid crystal display devices of Examples 22 to 28 according to the amount of a chiral component in a liquid crystal layer.

FIG. 37A is a graph illustrating the transmittance of the liquid crystal display device of Comparative Example 4 and the transmittance the liquid crystal display devices of Examples 22 to 28 according to the amount of an achiral component in a liquid crystal layer, and FIG. 37B is a graph illustrating the transmittance of the liquid crystal display device of Comparative Example 4 and the transmittance the liquid crystal display devices of Examples 22 to 28 according to the amount of a chiral component in a liquid crystal layer. In FIGS. 37A and 37B, x-axes represent the amounts of the achiral component and the chiral component, and the unit thereof is [wt %], and y-axes represent transmittance.

Referring to FIG. 37A, when the amount of the achiral component in the liquid crystal layer is about 10 wt %, the highest transmittance is shown. The transmittance is somewhat low when the amount of the achiral component increases above 10 wt %, however is higher than that when the achiral component is not included. However, the transmittance is lower than that of Comparative Example 4 only when the achiral component is about 30 wt %.

Referring to FIG. 37B, when the chiral component is in the liquid crystal layer even though irregular, the transmittance is higher in general when compared to that when the chiral component is not included. However, the transmittance is lower than that of Comparative Example 3 only when the chiral component is about 0.7 wt %.

Evaluation of Response Time

Figure 38A:
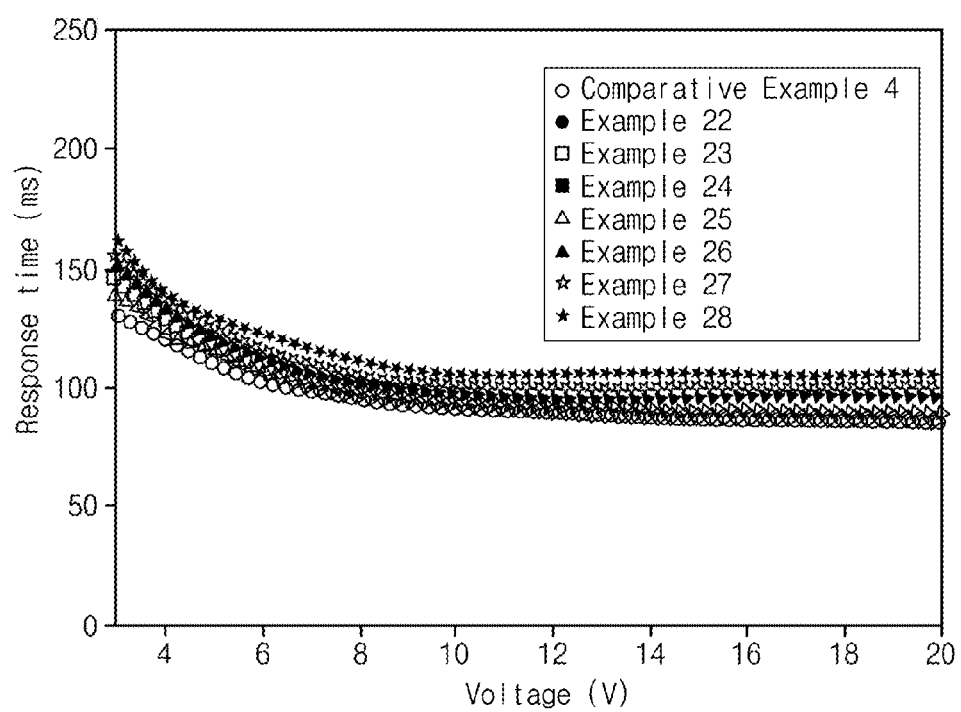
FIG. 38A is a graph for comparing the response time of the liquid crystal display devices of Comparative Example 4 and Examples 22 to 28.

FIG. 38A is a graph for comparing the response time of the liquid crystal display devices of Comparative Example 4 and Examples 22 to 28. In FIG. 38A, x-axis represents an applied voltage, and the unit thereof is [V], and y-axis represents response time, and the unit thereof is [ms].

Referring to FIG. 38A, the response time of the liquid crystal display devices of Examples 22 to 28 is increased to a certain degree when compared to that of the liquid crystal display device of Comparative Example 4. Meanwhile, the response time of the liquid crystal display device including the liquid crystal layers of Examples 22 and 2 is substantially similar to that of Comparative Example 4. The response time increased to a certain degree is expected to decrease by changing the amount or the kind of the nematic liquid crystal. In addition, the increased response time is expected to decrease by additionally adding a reactive mesogen material in the liquid crystal layer.

Figure 38B:
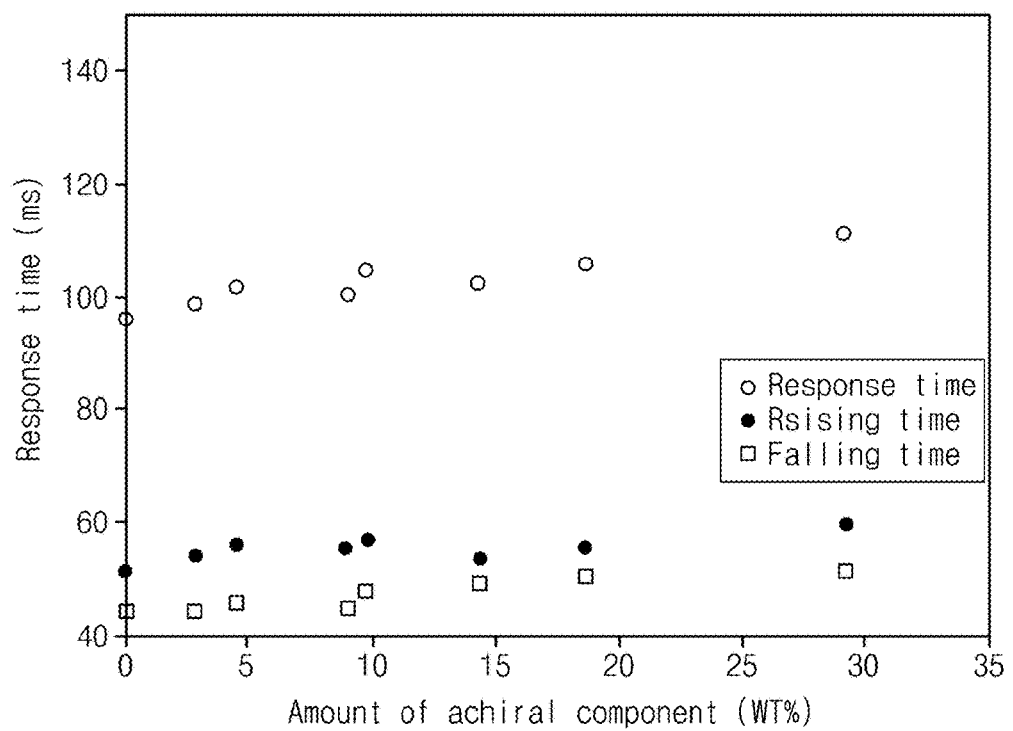
FIG. 38B is a graph illustrating the rising time and the falling time of the liquid crystal display device of Comparative Example 4 and the rising time and the falling time of the liquid crystal display devices of Examples 22 to 28 according to the amount of an achiral component.

FIG. 38B is a graph illustrating the rising time and the falling time of the liquid crystal display device of Comparative Example 4 and the rising time and the falling time of the liquid crystal display devices of Examples 22 to 28 according to the amount of an achiral component. In FIG. 38B, x-axis represents the amount of an achiral component, and the unit thereof is [wt %], and y-axis represents time, and the unit thereof is [ms].

When the target transmittance of a liquid crystal display device is set to 100%, it takes time to exhibit the transmittance of 100% when the liquid crystal display device is turned on. The rising time means the time necessary for exhibiting the transmittance from about 10% to about 90% after turning on the liquid crystal display device. On the contrary, it takes time to exhibit the transmittance of 0% when the liquid crystal display device is turned off. The falling time means the time necessary for exhibiting the transmittance from about 90% to about 10% after turning off the liquid crystal display device. The response time is the sum of the rising time and the falling time.

The rising time is about 50 ms, the falling time is about 30 ms and the response time is about 90 ms for the liquid crystal display device of Comparative Example 4. Referring to the data of Examples 22 to 28, the rising time and the falling time increase to a certain degree, and so, the response time increases to a certain degree when compared to that of Comparative Example 4.

Figure 38C:
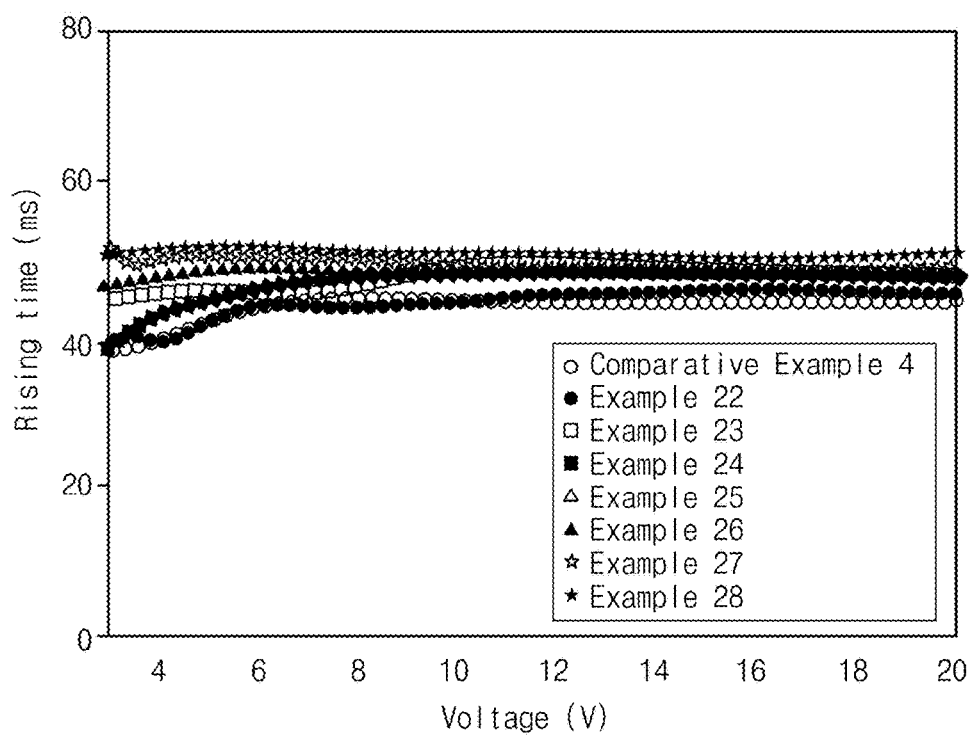
FIG. 38C is a graph illustrating the rising time of the liquid crystal display devices of Comparative Example 4 and Examples 22 to 28.
Figure 38D:
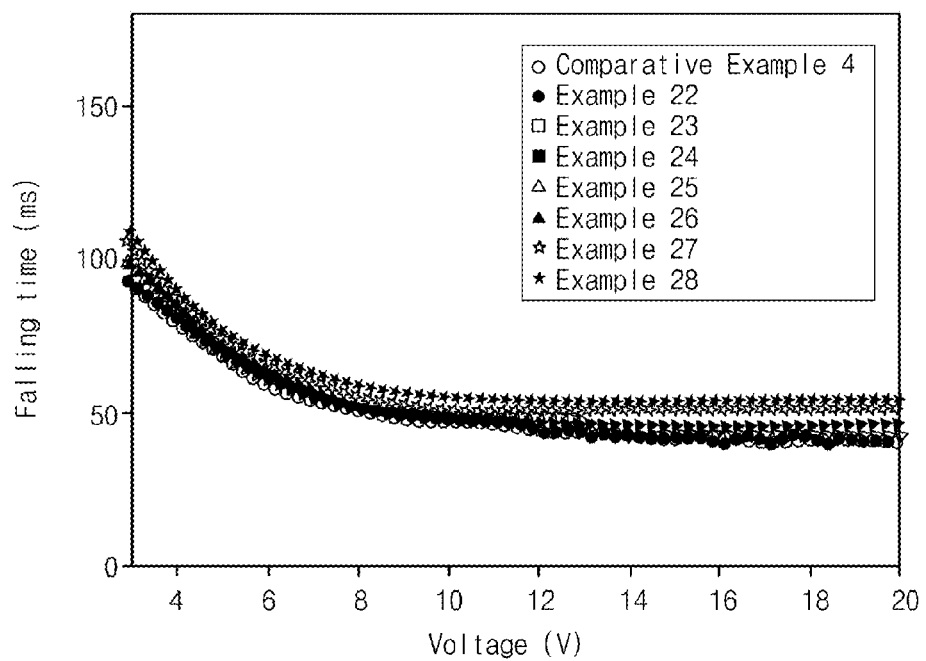
FIG. 38D is a graph illustrating the falling time of the liquid crystal display devices of Comparative Example 4 and Examples 22 to 28 according to an applied voltage.

FIG. 38C is a graph illustrating the rising time of the liquid crystal display devices of Comparative Example 4 and Examples 22 to 28, and FIG. 38D is a graph illustrating the falling time of the liquid crystal display devices of Comparative Example 4 and Examples 22 to 28. In FIGS. 38C and 38D, x-axes represent an applied voltage, and the unit thereof is [V], and y-axes represent time, and the unit thereof is [ms].

Referring to FIG. 38C, the rising rate of the liquid crystal display devices of Examples 22 to 28 is slightly increased when compared to that of Comparative Example 4.

Referring to FIG. 38D, the falling rate of the liquid crystal display devices of Examples 22 to 28 is increased to a certain degree when compared to that of Comparative Example 4. Meanwhile, the falling rate of the liquid crystal display devices including the liquid crystal layers of Examples 25 and 26 is substantially similar to that of Comparative Example 4.

The somewhat increased rising rate and falling rate may be expected to decrease by changing the amount or the kind of the nematic liquid crystal. Alternatively, the rising rate and the falling rate may be lowered by additionally adding a reactive mesogen material in the liquid crystal layer.

Evaluation of Textures

FIGS. 39A to 39H and FIGS. 40A to 40H are textures of the liquid crystal display devices of Comparative Example 4 and Examples 22 to 28.

Figure 39A:
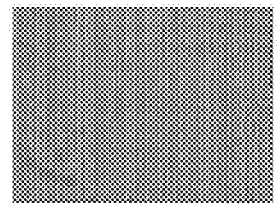
FIGS. 39A to 39H and 40A to 40H are textures of the liquid crystal display devices of Comparative Example 4 and Examples 22 to 28.
Figure 39C:
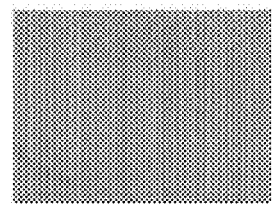
Figure 39B:
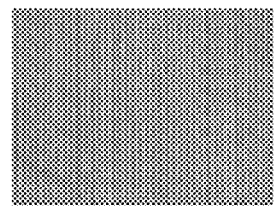
Figure 39D:
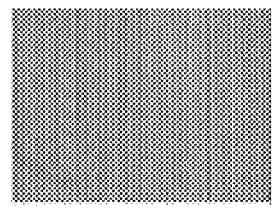
Figure 39E:
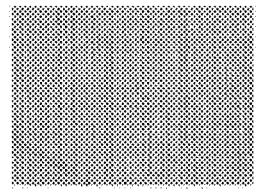
Figure 39G:
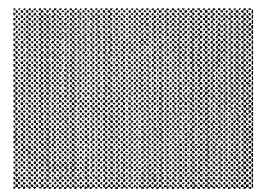
Figure 39F:
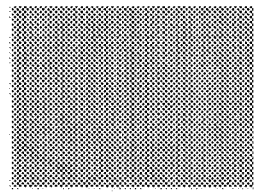
Figure 39H:
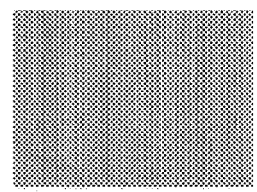
Figure 40A:
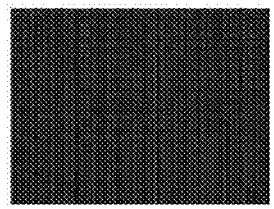
Figure 40C:
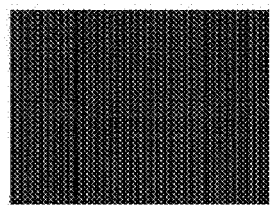
Figure 40B:
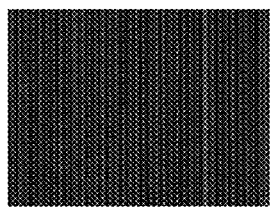
Figure 40D:
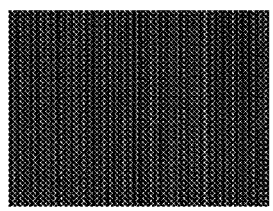
Figure 40E:
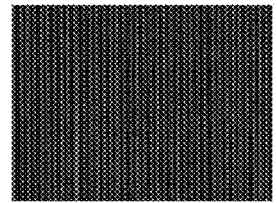
Figure 40G:
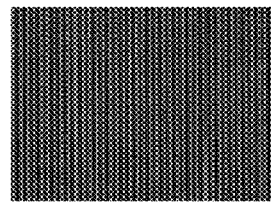
Figure 40F:
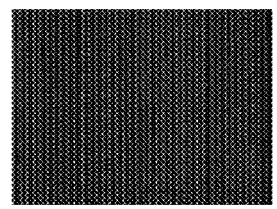
Figure 40H:
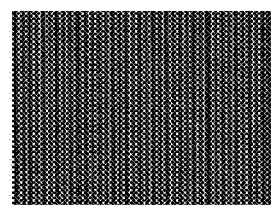

A voltage of about 7 V was applied in the liquid crystal display devices of Comparative Example 4 and Examples 22 to 28, and a cross polarization plate was rotated to obtain white images in FIGS. 39A to 39H. Referring to FIG. 39A, defects appearing black are shown at the edge portions of the slit or at the border of the slits. Referring to FIGS. 39B to 39G, the images are brighten overall when compared to that of FIG. 39A. In addition, the defects appearing at the border of the slits as well as at the edge portions of the slit are removed from the images of FIGS. 39D to 39F.

In the liquid crystal display devices of Comparative Example 4 and Examples 22 to 28, a voltage of about 7 V was applied, and a cross polarization plate was rotated to obtain black images in FIGS. 40A to 40H. When comparing the images of FIGS. 40A and 40B, the light leakage phenomena are relaxed in the image of FIG. 40B.

When inspecting the textures, the alignment of the liquid crystal molecules in the liquid crystal layer including the smectic material is uniform and stable when compared to that of a liquid crystal layer not including a ferroelectric material, thereby improving the luminance of a liquid crystal display device.

Figure 41A:
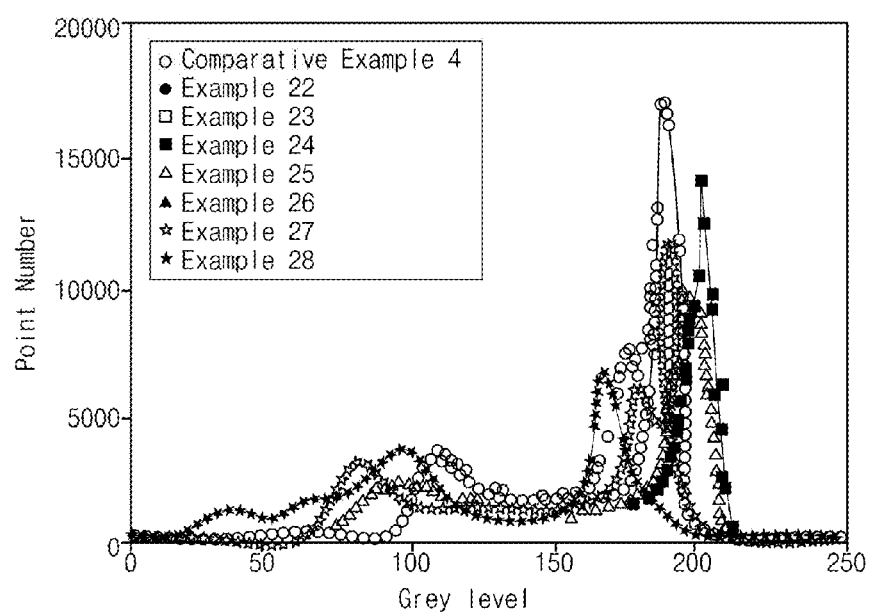
FIGS. 41A and 41B are graphs illustrating the transmittance of the textures of Comparative Example 4 and Examples 22 to 28 according to distance.
Figure 41B:
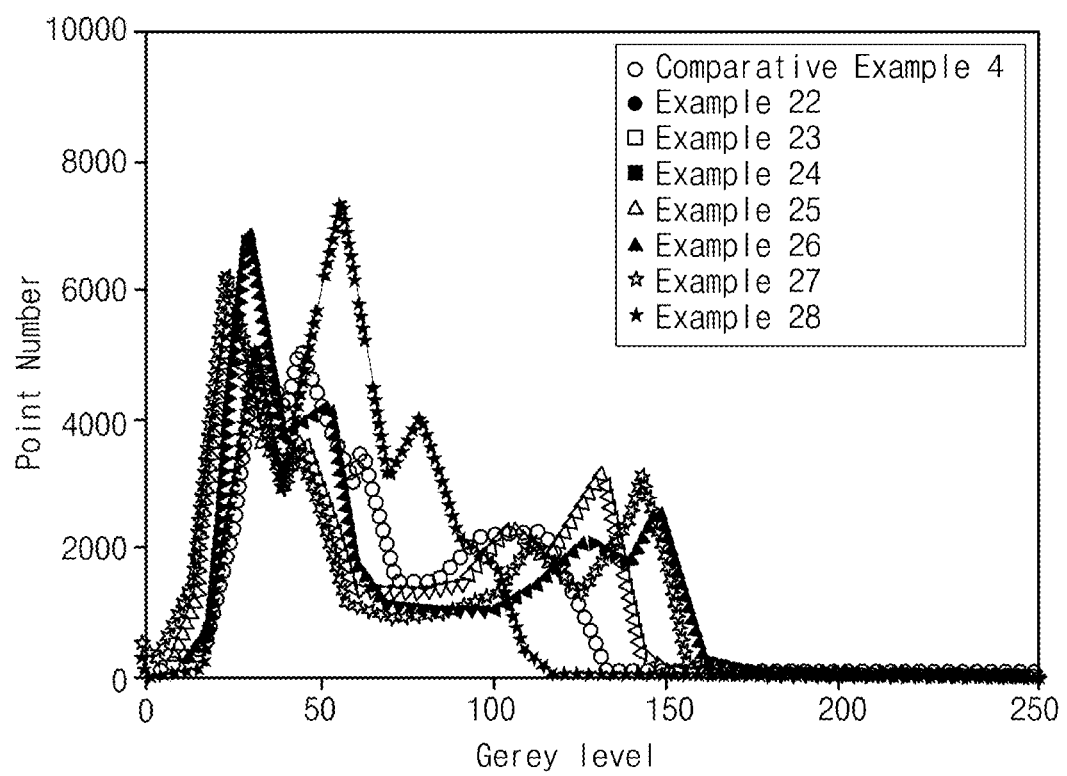

FIGS. 41A and 41B are graphs illustrating the transmittance of the textures of Comparative Example 4 and Examples 22 to 28 according to the distance of the texture. FIGS. 41A and 41B are evaluated by 256 ($2^8$) grey levels. As the grey level approaches to 0, grey closes to black, and the concentration of the grey is represented by the levels from 0 to 255.

FIG. 41A illustrates the grey level of the textures in FIGS. 39A to 39H, and the white images are found around the grey level from about 150 to about 230. The white images are found a lot at about 150 of the grey level for Examples 27 and 7 when compared to that of Comparative Example 4 in FIG. 41A. However, the white images of Examples 22 to 5 are found a lot at a higher grey level when compared to that of Comparative Example 4.

FIG. 41B represents the grey level of the textures in FIGS. 40A to 40H, and the black images are found from about 0 to about 50 of the grey level. The black image of Example 28 is found a lot at the grey level higher than that of Comparative Example 3. However, the black images of Examples 22 to 27 are found a lot at the grey level lower than that of Comparative Example 4.

When inspecting the graphs in FIGS. 41A and 41B, the effects are somewhat slight when compared to those of Comparative Example 4 in general, however, the liquid crystal display devices of Examples 24 and 5 exhibit good grey level. The alignment of the liquid crystal molecules in the liquid crystal layer including the smectic material is uniform and stable when compared to that of a liquid crystal layer not including a ferroelectric material, thereby improving the luminance of a liquid crystal display device.

Figure 42A:
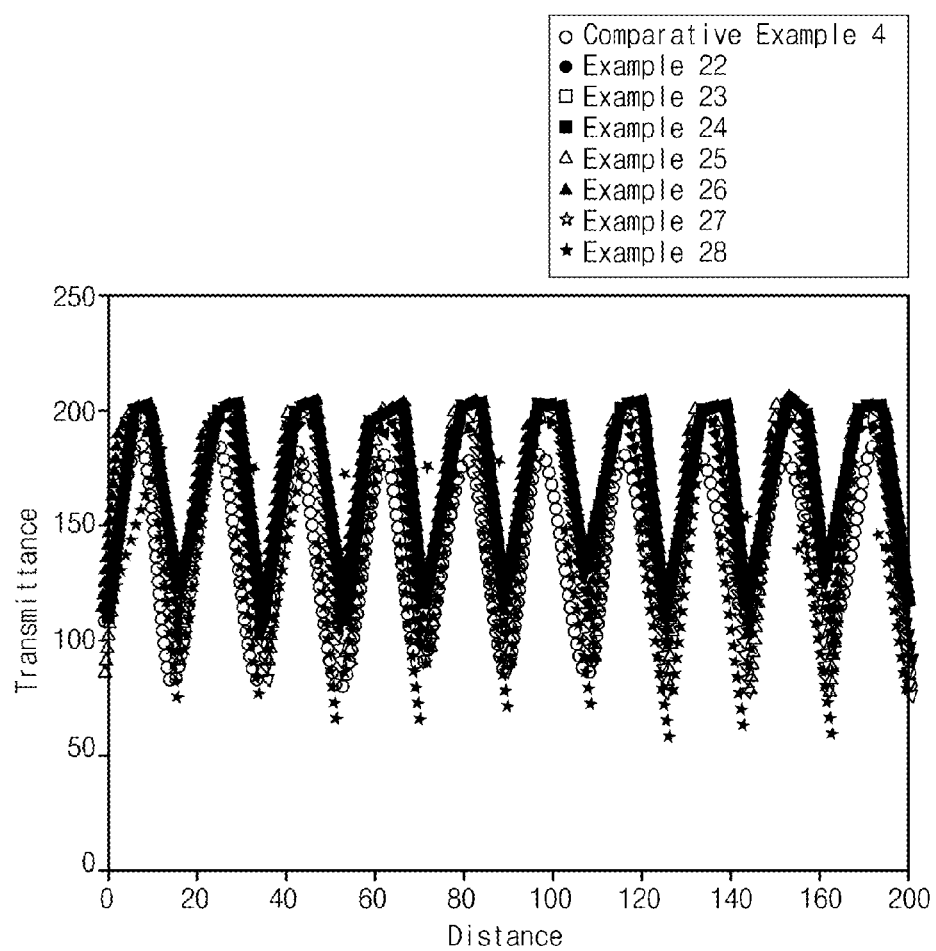
FIGS. 42A and 42B are graphs illustrating the transmittance of the textures of Comparative Example 4 and Examples 22 to 28 according to distance.
Figure 42B:
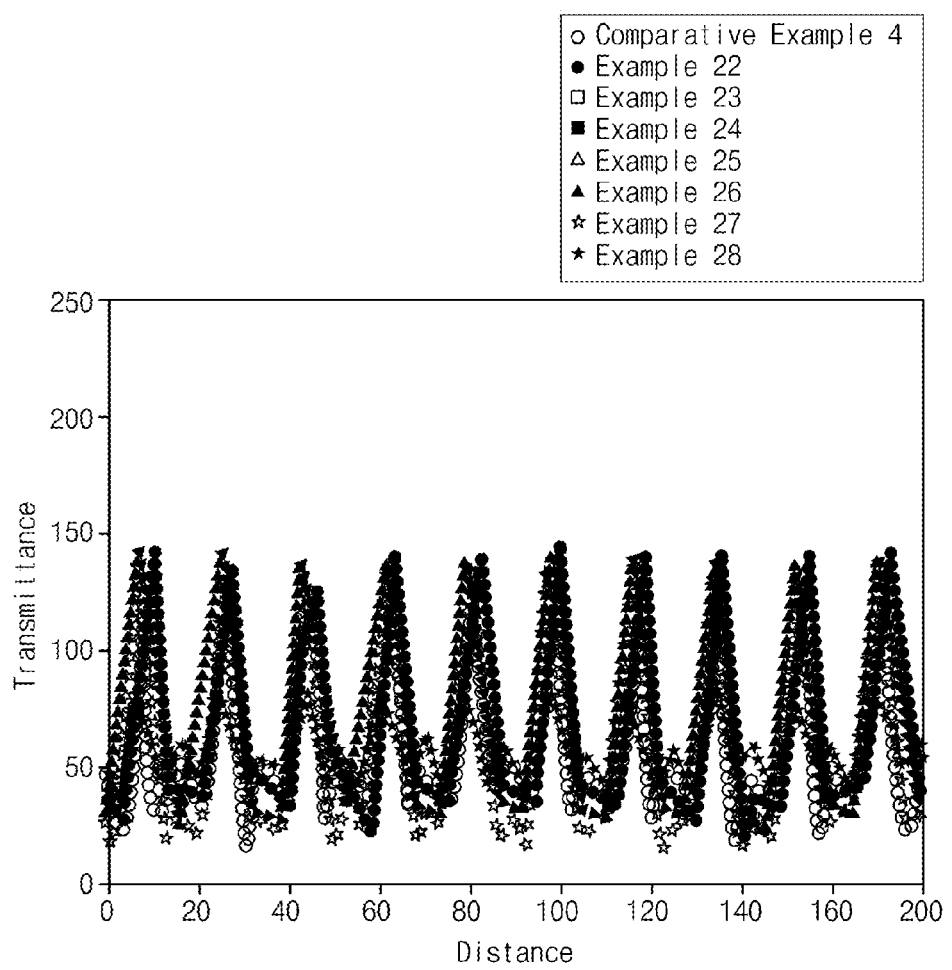

FIGS. 42A and 42B are graphs illustrating the transmittance of Comparative Example 4 and Examples 22 to 28 according to the distance of the textures.

FIG. 42A illustrates transmittance change according to the distance of the slit after cutting the textures of FIGS. 39A to 39H in one direction. Referring to FIG. 41A, the transmittance around the slit is lower for Example 28 when compared to that of Comparative Example 4. However, the transmittance is found higher for Examples 22 to 3 when compared to that of Comparative Example 4.

FIG. 42B illustrates transmittance change according to the distance of the slit after cutting the textures of FIGS. 40A to 40H in one direction. Referring to FIG. 41B, the transmittance around the slit for Example 28 is markedly lower than that of Comparative Example 4, and the light leakage defects are found to be solved to a certain degree.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A liquid crystal display device, comprising:
a first substrate;
a second substrate separated from and opposing the first substrate;
a liquid crystal layer between the first and second substrates;
wherein the liquid crystal layer comprises from about 3 to about 50 wt % of a smectic liquid crystal; and a remainder of the liquid crystal layer comprises a nematic liquid crystal, and
the smectic liquid crystal comprises from about 70 to about 97 wt % of an achiral smectic liquid crystal; and from about 3 to about 30 wt % of a chiral smectic liquid crystal.

2. The liquid crystal display device of claim 1, further comprising:
a common electrode between the first substrate and the liquid crystal layer and having a plate shape; and
a pixel electrode between the common electrode and the liquid crystal layer and having a pattern for defining an opening part.

3. The liquid crystal display device of claim 2, wherein the liquid crystal layer further comprises a chiral dopant.

4. The liquid crystal display device of claim 3, wherein the chiral smectic liquid crystal has spontaneous polarization higher than the chiral dopant.

5. The liquid crystal display device of claim 2, wherein the nematic liquid crystal comprises a negative nematic liquid crystal.

6. The liquid crystal display device of claim 2, wherein the nematic liquid crystal comprises a positive nematic liquid crystal.

7. The liquid crystal display device of claim 2, wherein the liquid crystal layer further comprises a reactive mesogen material.

8. The liquid crystal display device of claim 2, further comprising an alignment layer adjacent to the liquid crystal layer, wherein the alignment layer comprises a reactive mesogen material.

9. The liquid crystal display device of claim 1, further comprising:
a first electrode between the first substrate and the liquid crystal layer and comprising a first slit; and
a second electrode between the liquid crystal layer and the second substrate and comprising a second slit.

10. The liquid crystal display device of claim 9, wherein the liquid crystal layer further comprises a chiral dopant.

11. The liquid crystal display device of claim 10, wherein the chiral smectic liquid crystal has greater spontaneous polarization than the chiral dopant.

12. The liquid crystal display device of claim 9, wherein the nematic liquid crystal is a negative nematic liquid crystal.

13. The liquid crystal display device of claim 9, wherein the liquid crystal layer further comprises a reactive mesogen material.

14. The liquid crystal display device of claim 1, further comprising: a common electrode between the first substrate and the liquid crystal layer and having a first pattern; and
a pixel electrode between the first substrate and the liquid crystal layer and having a second pattern not overlapping with the first pattern.

15. The liquid crystal display device of claim 14, wherein the liquid crystal layer further comprises a chiral dopant.

16. The liquid crystal display device of claim 15, wherein the chiral smectic liquid crystal has spontaneous polarization higher than the chiral dopant.

17. The liquid crystal display device of claim 14, wherein the nematic liquid crystal comprises a negative nematic liquid crystal.

18. The liquid crystal display device of claim 14, wherein the chiral liquid crystal is included at an amount ratio from about 0.01 wt % to about 10 wt % in the liquid crystal layer.

19. The liquid crystal display device of claim 14, wherein the nematic liquid crystal comprises a positive nematic liquid crystal.

20. The liquid crystal display device of claim 14, wherein the liquid crystal layer further comprises a reactive mesogen material.

21. The liquid crystal display device of claim 14, further comprising an alignment layer near the liquid crystal layer, wherein the alignment layer comprises a reactive mesogen material.

22. The liquid crystal display device of claim 1, further comprising:
a first electrode;
a second electrode,
wherein the liquid crystal layer filling up a space between the first and second electrodes and comprising a plurality of liquid crystal molecules having a first alignment direction perpendicular to the surface of the first or second electrode when no potential difference is present between the first and second electrodes,
the liquid crystal molecules in the liquid crystal layer filling up a space between the first and second electrodes perform changing operation to have a second alignment direction substantially in parallel to an extended direction of the first or second electrode when potential difference is generated between the first and second electrodes,
the changing operation of the liquid crystal molecules comprises a first alignment step and a second alignment step in order,
the liquid crystal molecules change to have a third alignment direction different from the first or second alignment direction in the first alignment step, and
the liquid crystal molecules of the third alignment direction change to have the second alignment direction in the second alignment step.

23. The liquid crystal display device of claim 22, wherein the liquid crystal layer further comprises a chiral dopant.

24. The liquid crystal display device of claim 23, wherein the chiral smectic liquid crystal has spontaneous polarization higher than the chiral dopant.

25. The liquid crystal display device of claim 22, wherein the nematic liquid crystal comprises a negative nematic liquid crystal.

26. The liquid crystal display device of claim 22, wherein the liquid crystal layer further comprises a reactive mesogen material.

27. The liquid crystal display device of claim 22, further comprising an alignment layer between at least one portion between the liquid crystal layer and the first electrode and between the liquid crystal layer and the second electrode, wherein at least one of the liquid crystal layer and the alignment layer comprises a reactive mesogen material, and the alignment direction of the plurality of the liquid crystal molecules of the first alignment direction change to have the second alignment direction when potential difference is generated between the first and second electrodes.

\* \* \* \* \*